United States Patent
Morino et al.

(10) Patent No.: US 10,168,195 B2
(45) Date of Patent: Jan. 1, 2019

(54) THERMAL FLOW METER CAPABLE OF MEASURING FLOW RATES IN FORWARD FLOW AND REVERSE FLOW DIRECTIONS

(71) Applicant: Hitachi Automotive Systems, Ltd., Hitachinaka-shi, Ibaraki (JP)

(72) Inventors: Takeshi Morino, Hitachinaka (JP); Shinobu Tashiro, Hitachinaka (JP); Noboru Tokuyasu, Hitachinaka (JP); Keiji Hanzawa, Hitachinaka (JP); Atsushi Inoue, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 311 days.

(21) Appl. No.: 14/406,870

(22) PCT Filed: May 29, 2013

(86) PCT No.: PCT/JP2013/064828
§ 371 (c)(1),
(2) Date: Dec. 10, 2014

(87) PCT Pub. No.: WO2013/187229
PCT Pub. Date: Dec. 19, 2013

(65) Prior Publication Data
US 2015/0168191 A1 Jun. 18, 2015

(30) Foreign Application Priority Data
Jun. 15, 2012 (JP) .................................. 2012-135301

(51) Int. Cl.
*G01F 1/684* (2006.01)
*G01F 5/00* (2006.01)
(Continued)

(52) U.S. Cl.
CPC ............ *G01F 1/684* (2013.01); *G01F 1/6842* (2013.01); *G01F 1/6845* (2013.01); *G01F 1/696* (2013.01);
(Continued)

(58) Field of Classification Search
CPC ............................... G01F 1/684; G01F 1/6842
See application file for complete search history.

(56) References Cited

U.S. PATENT DOCUMENTS 5,696,321 A * 12/1997 Igarashi .................. G01F 1/684
73/114.34
6,234,015 B1 * 5/2001 Hamada .................. G01F 1/684
73/202.5
(Continued)

FOREIGN PATENT DOCUMENTS

JP 3764860 B2 4/2006
JP 2011-99757 A 5/2011

OTHER PUBLICATIONS

International Search Report (PCT/ISA/210) dated Jul. 2, 2013, with English translation (Three (3) pages).

*Primary Examiner* — Daniel J Colilla
(74) *Attorney, Agent, or Firm* — Crowell & Moring LLP

(57) ABSTRACT

A thermal flow meter capable of measuring flow rates of a gas flowing in a forward direction and a backward direction with a high degree of accuracy is provided. A thermal flow meter 300 according to the present invention includes a bypass passage configured to retrieve and flow a measurement target gas 30 received from a main passage 124 and a flow rate measurement circuit 601 configured to measure a flow rate by performing heat transfer with the measurement target gas flowing in the bypass passage. In an outlet port side chamber 4216 provided at an upstream with respect to an outlet port 352 of the bypass passage which is formed to be open in a downstream direction in a flow direction of the (Continued)

measurement target gas, a guide 4217 is provided to oppose the outlet port to change a direction of a flow of the measurement target gas flowing in from the opposite side, and the outlet port and an inflow unit of the outlet port side chamber are arranged to be eccentric when they are seen in a direction along the flow direction of the measurement target gas flowing in the main passage.

20 Claims, 25 Drawing Sheets

(51) Int. Cl.
  *G01F 15/14* (2006.01)
  *G01F 1/696* (2006.01)
(52) U.S. Cl.
  CPC .............. *G01F 1/6965* (2013.01); *G01F 5/00* (2013.01); *G01F 15/14* (2013.01)

(56) References Cited

U.S. PATENT DOCUMENTS

| | | | |
|---|---|---|---|
| 6,526,822 B1* | 3/2003 | Maeda | G01F 1/6842 |
| | | | 73/204.21 |
| 7,032,446 B2* | 4/2006 | Nakada | G01F 1/684 |
| | | | 73/202.5 |
| 8,468,883 B2 | 6/2013 | Sakuma | |
| 9,091,577 B2* | 7/2015 | Speldrich | G01F 5/00 |
| 2001/0035054 A1* | 11/2001 | Maeda | G01F 1/44 |
| | | | 73/861.63 |
| 2010/0175468 A1* | 7/2010 | Anzai | G01F 1/6842 |
| | | | 73/202 |
| 2010/0242589 A1* | 9/2010 | Morino | G01F 1/6842 |
| | | | 73/202.5 |

* cited by examiner

FIG. 4
(A)
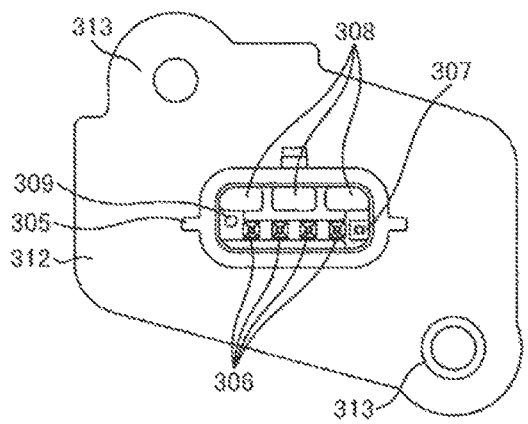
(B)
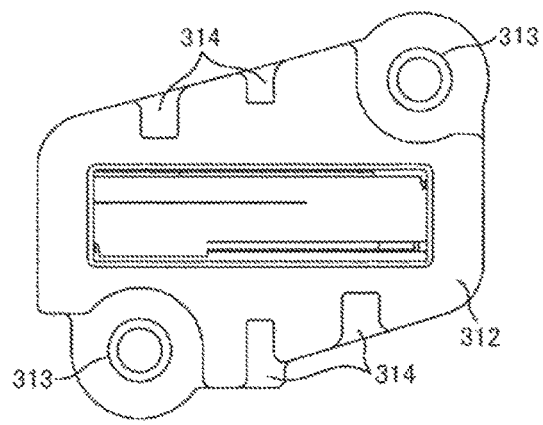

FIG. 5
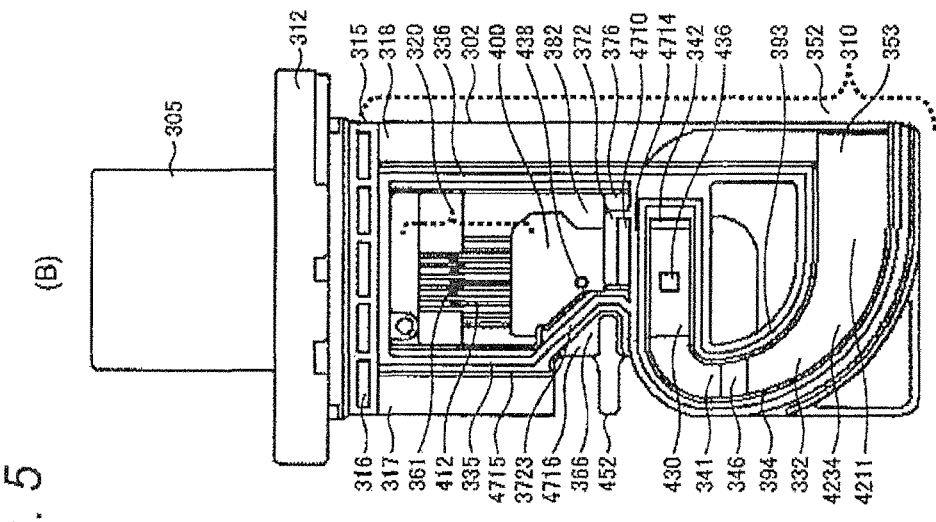
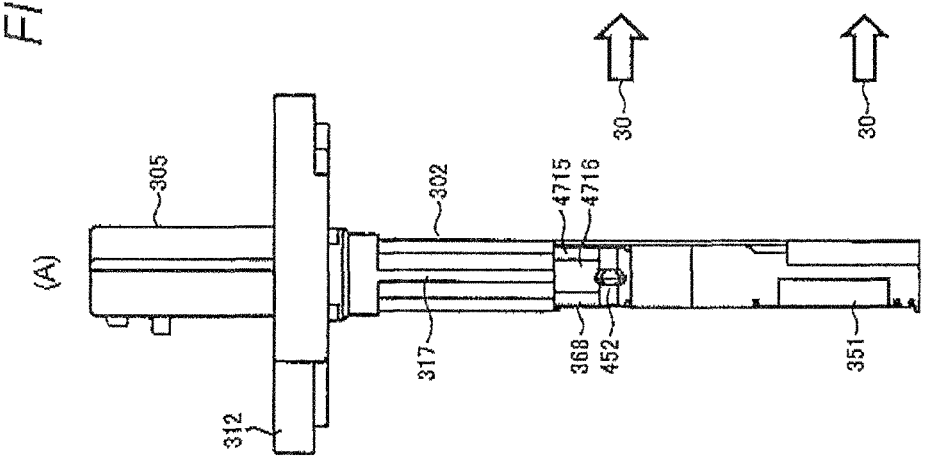

FIG. 7
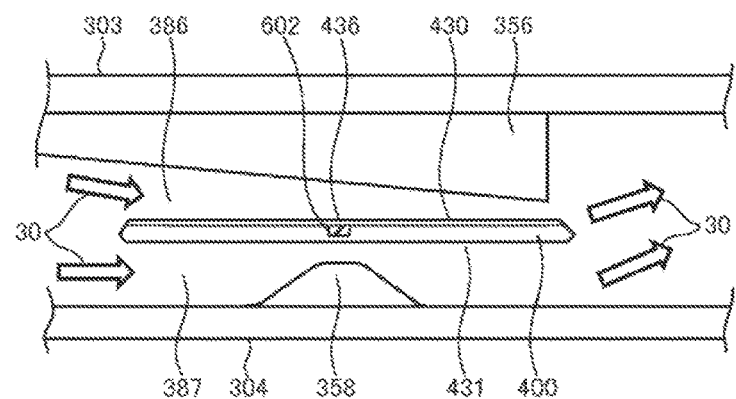
FIG. 8
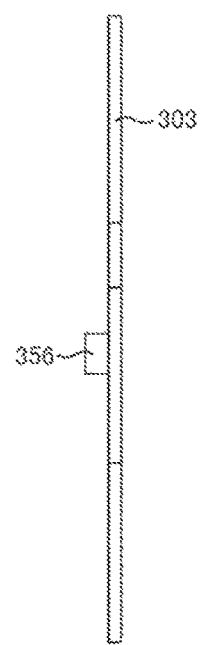
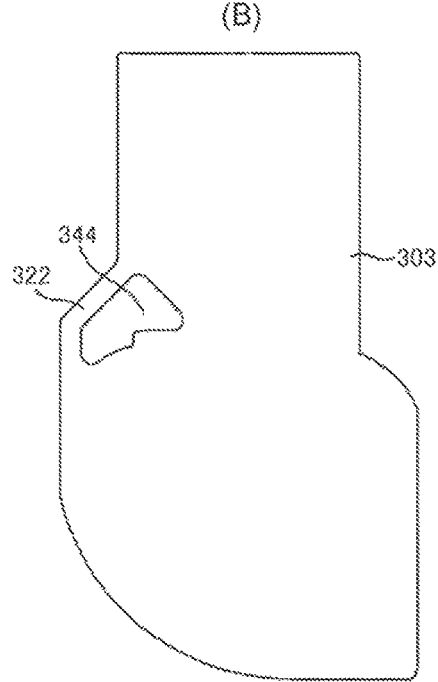

THERMAL FLOW METER CAPABLE OF MEASURING FLOW RATES IN FORWARD FLOW AND REVERSE FLOW DIRECTIONS

TECHNICAL FIELD

The present invention relates to a thermal flow meter for measuring a flow rate of a gas.

BACKGROUND ART

When a measurement target gas which is to be measured by a thermal flow meter flows in a state of a laminar flow only in a forward direction, it is easy to measure the flow rate of the measurement target gas. However, such case is rare. In many cases, not only a flow in the forward direction but also a flow in the backward direction may occur in the measurement target gas, and in addition, a vortex may be generated.

For example, when a thermal flow meter is provided in a vehicle to be used to measure the flow rate of intake air guided into an internal combustion engine, the intake air which is the measurement target gas flows in a state of pulsing motion based on the operation of the internal combustion engine, and further, in a particular operation range of the internal combustion engine, a backward flow phenomenon occurs in a mixed manner, in which the intake air flows not only in the forward direction but also in the backward direction. In order to measure the amount of the intake air acquired into the internal combustion engine in the intake process of the internal combustion engine, it is desired to accurately measure not only the flow rate of the intake air flowing in the forward direction but also the flow rate of the intake air flowing in the backward flow, and derive the amount of the intake air actually acquired into the internal combustion engine from the flow rate in the forward direction and the flow rate in the backward direction. For this reason, the thermal flow meter is desired to be able to measure not only the flow rate in the forward direction but also the flow rate in the backward direction. An example of such a thermal flow meter capable of measuring both of the flow rates in the forward direction and in the backward direction is described in PTL 1.

CITATION LIST

Patent Literature

PTL 1: JP 2011-99757 A

SUMMARY OF INVENTION

Technical Problem

The thermal flow meter disclosed in PTL 1 explained above can measure the flow rates of the gas flowing not only in the forward direction but also in the backward direction. However, in order to accurately measure the flow rates of the measurement target gas flowing not only in the forward direction but also in the backward direction, it is desired to further reduce the error caused by vortex of the measurement target gas. PTL 1 explained above discloses nothing about the error caused by the vortex and the like of the measurement target gas which is to be measured.

In order to measure the flow rate of the measurement target gas flowing in a main passage, the thermal flow meter uses a method of measuring the entire flow rate flowing through the main passage by retrieving a portion of the measurement target gas flowing in the main passage into a bypass passage and measuring the measurement target gas flowing in the bypass passage. In this case, for example, a relationship between the flow rate flowing through the bypass passage and the entire flow rate flowing through the main passage is measured in advance, and data representing this relationship are held in advance, and therefore, the flow rate of the measurement target gas in the main passage can be obtained on the basis of the held data from the measurement value of the flow rate flowing through the bypass passage.

In the thermal flow meter using the bypass passage retrieving the measurement target gas explained above, it is desired to accurately measure not only the flow rate in the forward direction but also the flow rate in the backward direction. In this case, it is desired to reduce the effect of vortex caused by the switching of the flows in the forward direction and in the backward direction. For example, when the thermal flow meter is used to measure the intake air of the internal combustion engine explained above, the flow of the measurement target gas in the forward direction suddenly changes to the flow in the backward direction on the basis of the operation of the internal combustion engine. More specifically, in the particular operation range of the internal combustion engine, the intake air guided to the internal combustion engine makes pulsing motion, and a backward flow repeatedly occurs.

A vortex occurs at a downstream side of the thermal flow meter on the basis of the flow of the intake air in the forward direction. When the flow of the measurement target gas in the forward direction changes to the flow in the backward direction on the basis of the operation of the internal combustion engine explained above, the vortex is acquired into the inside from the outlet port of the bypass passage according to the backward flow of the intake air. This disturbance of the vortex adversely affects the measurement of the flow rate in the bypass passage, and reduces the accuracy of the measurement.

It is an object of the present invention to provide a thermal flow meter capable of accurately measuring the flow rates of the gas flowing in the forward direction and the backward direction.

Solution to Problem

In order to solve the problem, a thermal flow meter according to the present invention includes a bypass passage configured to retrieve and flow a measurement target gas received from a main passage and a flow rate measurement circuit configured to measure a flow rate by performing heat transfer with the measurement target gas flowing in the bypass passage, wherein the bypass passage includes an inlet port which is formed to be open at an upstream side of the main passage, an outlet port configured to discharge the measurement target gas retrieved from the inlet port of the bypass passage to the main passage, a flow rate measurement passage unit provided between the inlet port and the outlet port and configured to measure a flow rate of the flow rate measurement circuit, and an outlet port side chamber provided at an upstream with respect to the outlet port of the bypass passage, wherein the measurement target gas retrieved from the inlet port of the bypass passage is measured by the flow rate measurement circuit at the flow rate measurement passage unit, and is thereafter guided to the outlet port side chamber, and is discharged to the main passage from the outlet port side chamber via the outlet port, and in the outlet port side chamber, the outlet port is provided to be open in a downstream direction of a flow direction of the measurement target gas in the main passage, and a guide is provided to oppose the outlet port to change a direction of a flow of the measurement target gas flowing backward from the outlet port to an upstream side of the outlet port, the outlet port and an inflow unit of the outlet port side chamber are arranged to be eccentric when they are seen in a direction along the flow direction of the measurement target gas flowing in the main passage.

Advantageous Effects of Invention

According to the present invention, a thermal flow meter capable of accurately measuring the flow rates of the gas flowing in the forward direction and the backward direction can be provided.

BRIEF DESCRIPTION OF DRAWINGS

FIGS. 2(A) and 2(B) are diagrams illustrating an appearance of the thermal flow meter, in which FIG. 2(A) is a left side view, and FIG. 2(B) is a front view.

FIGS. 3(A) and 3(B) are diagrams illustrating an appearance of the thermal flow meter, in which FIG. 3(A) is a right side view, and FIG. 3(B) is a rear view.

FIGS. 4(A) and 4(B) are diagrams illustrating an appearance of the thermal flow meter, in which FIG. 4(A) is a plan view, and FIG. 4(B) is a bottom view.

FIGS. 5(A) and 5(B) are diagrams illustrating a housing of the thermal flow meter, in which FIG. 5(A) is a left side view of the housing, and FIG. 5(B) is a front view of the housing.

FIGS. 6(A) and 6(B) are diagrams illustrating a housing of the thermal flow meter, in which FIG. 6(A) is a right side view of the housing, and FIG. 6(B) is a rear view of the housing.

FIG. 7 is a partially enlarged view illustrating a state where a flow path surface of a thermal flow meter is provided inside of a bypass passage trench.

FIGS. 8(A) to 8(C) are diagrams illustrating an appearance of a front cover, in which FIG. 8(A) is a left side view, FIG. 8(B) is a front view, and FIG. 8(C) is a plan view.

FIGS. 9(A) to 9(C) are diagrams illustrating an appearance of a rear cover 304, in which FIG. 9(A) is a left side view, FIG. 9(B) is a front view, and FIG. 9(C) is a plan view.

FIGS. 12(A) to 12(C) are exterior views illustrating a circuit package, in which FIG. 12(A) is a left side view, FIG. 12(B) is a front view, and FIG. 12(C) is a rear view.

FIG. 16(A) is a front view illustrating the circuit package, and FIG. 16(B) is a rear view illustrating the circuit package.

FIG. 22(A) is a front view, and FIG. 22(B) is a rear view.

FIG. 23(A) is a perspective view of FIG. 22(A), and FIG. 23(B) is a perspective view of FIG. 22(B).

FIG. 24(A) is a front view, and FIG. 24(B) is a rear view.

FIG. 25(A) is a perspective view of FIG. 24(A), and FIG. 25(B) is a perspective view of FIG. 24(B).

FIG. 26 is a cross sectional view taken along line B-B of FIG. 22(A), and is a cross sectional view taken along line B-B of FIG. 22(A), and is an explanatory diagram of.

FIG. 30(A) is a partially enlarged view, and FIG. 30(B) is a cross sectional view taken along line E-E of FIG. 30(A).

DESCRIPTION OF EMBODIMENTS

Figure 1:
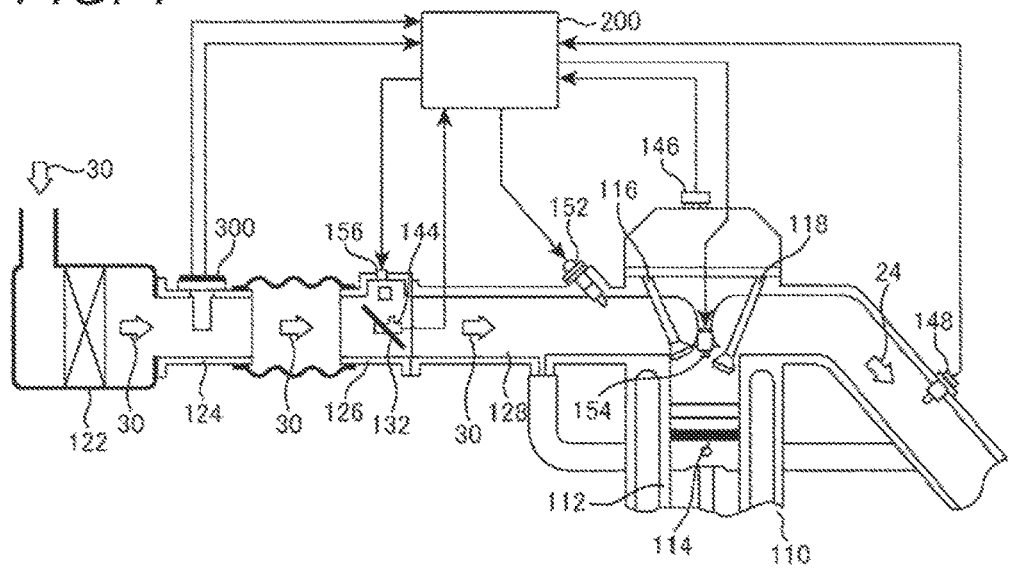
FIG. 1 is a system diagram illustrating an internal combustion engine control system where a thermal flow meter according to an embodiment of the invention is used.

A thermal flow meter described in modes for carrying out the invention (hereinafter referred to as embodiments) explained below can maintain a high measurement accuracy in a flow rate measurement of a measurement target gas. This point will be hereinafter explained in details in the embodiments described below, but the overview thereof will be subsequently explained.

In the embodiments described below, a thermal flow meter includes a bypass passage receiving a portion of the measurement target gas flowing in the main passage and passing the measurement target gas. The bypass passage has an inlet port and an exit, and a flow rate measurement passage unit for measuring the flow rate of the measurement target gas is provided in the bypass passage between the inlet port and the exit. In the flow rate measurement passage unit, heat transfer is performed between the flow rate measurement circuit and the measurement target gas in the bypass passage, so that the flow rates of the measurement target gas flowing in the forward direction and the backward direction in the main passage are measured.

Because of the measurement target gas flowing in the forward direction, a vortex is generated at downstream of the exit. If the vortex at the downstream of the exist is acquired into the bypass passage from the outlet port when the flow direction of the measurement target gas changes from the forward direction to the backward direction, this adversely affects the flow rate measurement passage unit, and reduces the measurement accuracy. In the embodiments below, a vortex inflow suppression unit for suppressing acquiring of the vortex is provided on a bypass passage axis of the bypass passage at the outlet port side which is connected from the flow rate measurement passage unit to the exit. On the other hand, the outlet port is disposed at a position away from the bypass passage axis of the bypass passage at the outlet port side, and a guide for changing the flow, e.g., a wall for changing the direction of the flow, is provided at the deeper side of the exit. When the measurement target gas flowing backward from the outlet port flows in, the vortex as well as the measurement target gas flowing backward flow into the bypass passage from the exit. The course of the vortex flowing into the bypass passage is changed by the guide for changing the direction of the flow, e.g., the wall, and the vortex flows into the bypass passage at the outlet port side, and therefore, the vortex is attenuated, so that this greatly reduces the effect of the vortex affecting the measurement with the flow rate measurement passage unit.

In the embodiments explained below, the measurement target gas flowing backward from the outlet port flows into the bypass passage, and the dynamic pressure of the measurement target gas flowing backward affects even the inside of the exit, and much measurement target gas flowing backward can be taken into the bypass passage, and the flow rate of the measurement target gas flowing backward can be measured accurately.

In the embodiments explained below, the outlet port is formed to be open in a direction crossing the flow which flows backward in the main passage, and therefore, much measurement target gas flowing backward can be retrieved. For this reason, not only the flow rate of the measurement target gas flowing in the forward direction but also the flow rate of the measurement target gas flowing in the backward direction can be measured accurately.

Although the embodiments described below will be explained in details later, the embodiments solve various problems which are desired as actual products. In particular, when a thermal flow meter according to the embodiments below is used as a measurement apparatus for measuring the amount of the intake air of a vehicle, various problems are taken into consideration and are solved, which are desired for the thermal flow meter. In addition, the thermal flow meter according to the embodiments achieve various kinds of advantages. One of various problems addressed by the following embodiments is described in the "Problems to Be Solved by the Invention" described above, and one of various effects obtained by the following embodiments is described in the "Effects of the Invention."

Various problems solved by the following embodiments and various effects obtained in the following embodiments will be further described in the "Description of Embodiments." Therefore, it would be appreciated that the problems and effects solved by the embodiments explained in the embodiments below also include the contents other than the contents described in the field in the "Problems to Be Solved by the Invention" and the field in the "Effects of the Invention."

In the following embodiments, the same reference numerals denote the same elements even when they are indicated in different drawings, and they have substantially the same functions and effects. The components that have been described in previous paragraphs may be only denoted reference numerals in the drawings, and explanation thereabout may be omitted.

1. Embodiment when Thermal Flow Meter According to the Present Invention is Used for Internal Combustion Engine Control System 1.1 Configuration of Internal Combustion Engine Control System FIG. 1 is a system diagram illustrating an electronic fuel injection type internal combustion engine control system having a thermal flow meter according to one embodiment of the invention. Based on the operation of an internal combustion engine 110 having an engine cylinder 112 and an engine piston 114, an intake air as a measurement target gas 30 is inhaled from an air cleaner 122 and is guided to a combustion chamber of the engine cylinder 112 through a main passage 124 including, for example, an intake body, a throttle body 126, and an intake manifold 128. A flow rate of the measurement target gas 30 as an intake air guided to the combustion chamber is measured by a thermal flow meter 300 according to the invention. A fuel is supplied from a fuel injection valve 152 based on the measured flow rate and is mixed with the measurement target gas 30 as an intake air, so that the mixed gas is guided to the combustion chamber. It is noted that, in this embodiment, the fuel injection valve 152 is provided in an intake port of the internal combustion engine, and the fuel injected to the intake port is mixed with the measurement target gas 30 as an intake air to form a mixed gas, so that the mixed gas is guided to the combustion chamber through an inlet valve 116 to generate mechanical energy by burning.

In recent years, in many vehicles, a direct fuel injection method having excellent effects in exhaust gas purification or fuel efficiency improvement is employed, in which a fuel injection valve 152 is installed in a cylinder head of the internal combustion engine, and fuel is directly injected into each combustion chamber from the fuel injection valve 152. The thermal flow meter 300 may be similarly used in a type in which fuel is directly injected into each combustion chamber as well as a type in which fuel is injected into the intake port of the internal combustion engine of FIG. 1. A method of measuring control parameters, including a method of using the thermal flow meter 300, and a method of controlling the internal combustion engine, including a fuel supply amount or an ignition timing, are similar in basic concept between both types. A representative example of both types, a type in which fuel is injected into the intake port is illustrated in FIG. 1.

The fuel and the air guided to the combustion chamber have a fuel/air mixed state and are explosively combusted by spark ignition of the ignition plug 154 to generate mechanical energy. The combusted gas is guided to an exhaust pipe from the exhaust valve 118 and is discharged to the outside of the vehicle from the exhaust pipe as an exhaust gas 24. The flow rate of the measurement target gas 30 as an intake air guided to the combustion chamber is controlled by the throttle valve 132 of which opening level changes in response to manipulation of an accelerator pedal. The fuel supply amount is controlled based on the flow rate of the intake air guided to the combustion chamber, and a driver controls an opening level of the throttle valve 132, so that the flow rate of the intake air guided to the combustion chamber is controlled. As a result, it is possible to control mechanical energy generated by the internal combustion engine.

1.2 Overview of Control of Internal Combustion Engine Control System and Operation of Thermal Flow Meter 300

The flow rate and the temperature of the measurement target gas 30 as an intake air that is received from the air cleaner 122 and flows through the main passage 124 are measured by the thermal flow meter 300, and an electric signal representing the flow rate and the temperature of the intake air is input to the control device 200 from the thermal flow meter 300. In addition, an output of the throttle angle sensor 144 that measures an opening level of the throttle valve 132 is input to the control device 200, and an output of a rotation angle sensor 146 is input to the control device 200 to measure a position or a condition of the engine piston 114, the inlet valve 116, or the exhaust valve 118 of the internal combustion engine and a rotational speed of the internal combustion engine. An oxygen sensor 148 is provided in the exhaust pipe of the internal combustion engine in order to measure a mixed ratio state between the fuel amount and the air amount from the condition of exhaust gas 24, and the output of an oxygen sensor 148 is input to the control device 200.

The intake air guided to the internal combustion engine which is referred to as the measurement target gas 30 is measured by the thermal flow meter 300. The driving state of the internal combustion engine changes over a wide range from the idle driving state to the high-speed rotation state. In a particular operation state, the measurement target gas 30 guided to the internal combustion engine makes a pulsing motion, and further a backward flow is generated. This pulsing current and backward flow of the measurement target gas 30 are considered to be caused by operation of the engine piston 114, the inlet valve 116, and the like of the internal combustion engine. In order to accurately derive the flow rate of the measurement target gas 30 guided to the internal combustion engine in an operation range in which the measurement target gas 30 guided to the internal combustion engine flows backward, it is desired to not only measure the flow rate of the measurement target gas 30 flowing in the forward direction but also accurately measure the flow rate flowing backward from the side of the internal combustion engine to the air cleaner 122. For example, based on the idea of subtracting the summation of the flow rates of the measurement target gas 30 flowing backward from the summation of the flow rates of the measurement target gas 30 flowing in the forward direction, the summation of the flow rates of the measurement target gas 30 actually provided to the internal combustion engine can be derived. The fuel supply amount and the ignition timing can be controlled on the basis of the summation flow rate of the measurement target gas 30 actually provided to the internal combustion engine.

The control device 200 computes a fuel injection amount or an ignition timing based on a flow rate of the intake air as an output of the thermal flow meter 300 and a rotational speed of the internal combustion engine measured from an output of the rotation angle sensor 146. Based on the computation result of them, a fuel amount supplied from the fuel injection valve 152 and an ignition timing for igniting the ignition plug 154 are controlled. In practice, the fuel supply amount or the ignition timing is further accurately controlled based on a change of the intake temperature or the throttle angle measured by the thermal flow meter 300, a change of the engine rotation speed, and an air-fuel ratio state measured by the oxygen sensor 148. In the idle driving state of the internal combustion engine, the control device 200 further controls the air amount bypassing the throttle valve 132 using an idle air control valve 156 and controls a rotation speed of the internal combustion engine under the idle driving state.

1.3 Improvement of Measurement Accuracy of Thermal Flow Meter and Environment for Mounting Thermal Flow Meter Both the fuel supply amount and the ignition timing as a main control amount of the internal combustion engine are computed by using an output of the thermal flow meter 300 as a main parameter. As necessary, control parameters are corrected on the basis of the temperature of the intake air, or the fuel supply amount provided to the internal combustion engine and the ignition timing thereof are corrected. Therefore, improvement of the measurement accuracy, suppression of aging, and improvement of reliability of the thermal flow meter 300 are important for improvement of control accuracy of a vehicle or obtainment of reliability. In particularly, in recent years, there are a lot of demands for fuel saving of vehicles and exhaust gas purification. In order to satisfy such demands, it is significantly important to improve the measurement accuracy of the flow rate of the measurement target gas 30 as an intake air measured by the thermal flow meter 300. In addition, it is also important to maintain high reliability of the thermal flow meter 300.

An internal combustion engine for a vehicle is used in a wide operation range, and in a particular operation range, the measurement target gas 30 which is the intake air guided to the internal combustion engine makes a great pulsing motion, and further, backward flow phenomenon occurs with the measurement target gas 30. In order to accurately measure the flow rate of the measurement target gas 30, the used thermal flow meter 300 preferably, accurately measure not only the flow rate of the flow in the forward direction of the measurement target gas 30 but also the flow rate in the state in which the measurement target gas 30 flows backward. In the flow rate measurement circuit according to the embodiment explained below, the heating body for heating the measurement target gas 30 is provided with resistors acting as heat sensing elements at both sides of the flow of measurement target gas 30. Therefore, the flow rate measurement circuit can measure not only the flow rate of the measurement target gas 30 flowing in the forward direction but also the flow rate of the measurement target gas 30 flowing backward.

Further, in order to improve the measurement accuracy of the flow rate of the measurement target gas 30 flowing backward, the flow rate measurement circuit according to the embodiment explained below has a structure for reducing the effect of the vortex generated at the downstream side of the thermal flow meter 300, which may cause a measurement error. These structure and action will be hereinafter explained in details.

The thermal flow meter 300 mounted on a vehicle is attached to the intake pipe in order to measure the flow rate of the measurement target gas 30 flowing in the main passage 124 which is the intake pipe affected by the heat generated from the internal combustion engine. Therefore, the heat generated by the internal combustion engine is transmitted to the thermal flow meter 300 via the intake pipe which is the main passage 124. The thermal flow meter 300 employs a method for measuring the flow rate of the measurement target gas by performing heat transfer with the measurement target gas, and it is important to suppress the effect of the heat given from the outside. In the embodiments explained below, the thermal flow meter 300 has a structure for reducing the effect of the heat given by the main passage 124 which is the intake pipe. This will be hereinafter explained.

The thermal flow meter 300 mounted on a vehicle solves the problems described in "Problems to Be Solved by the Invention" and provides the effects described in "Effects of the Invention" as described below. In addition, as described below, it solves various problems demanded as a product and provides various effects considering various problems described above. Specific problems or effects solved or provided by the thermal flow meter 300 will be described in the following description of embodiments.

2. Configuration of Thermal Flow Meter 300

2.1 Exterior Structure of Thermal Flow Meter 300

Figure 2:
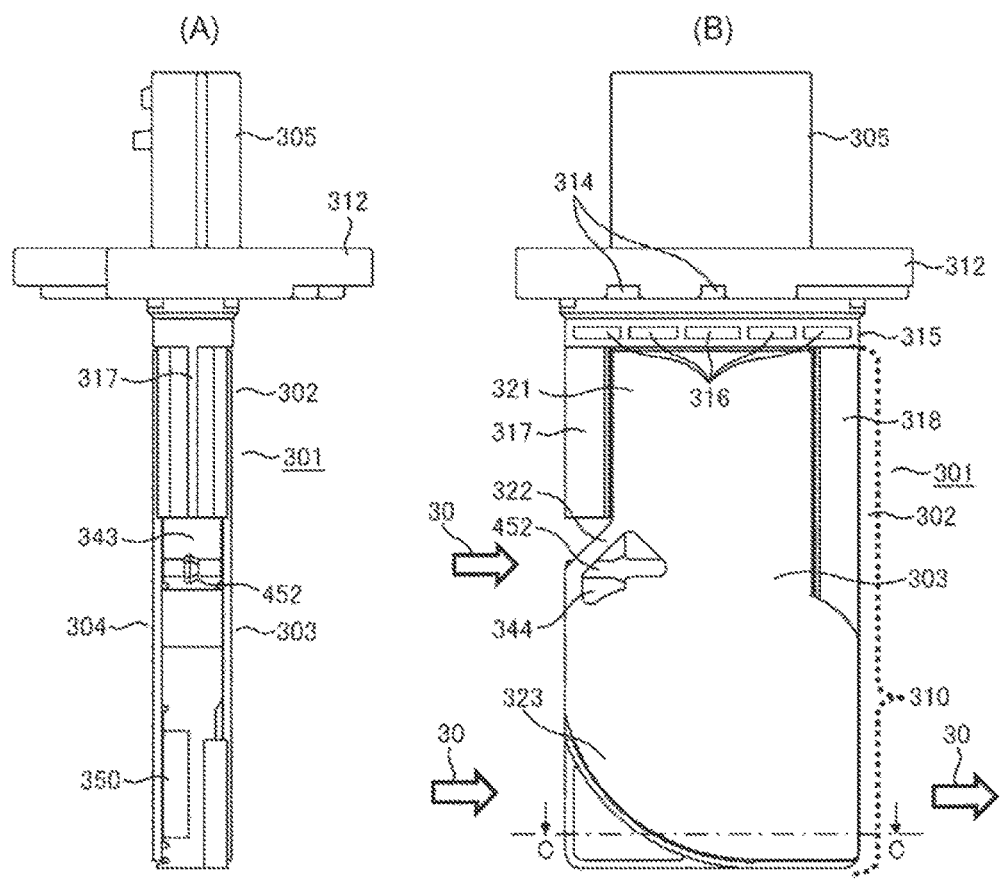
Figure 3:
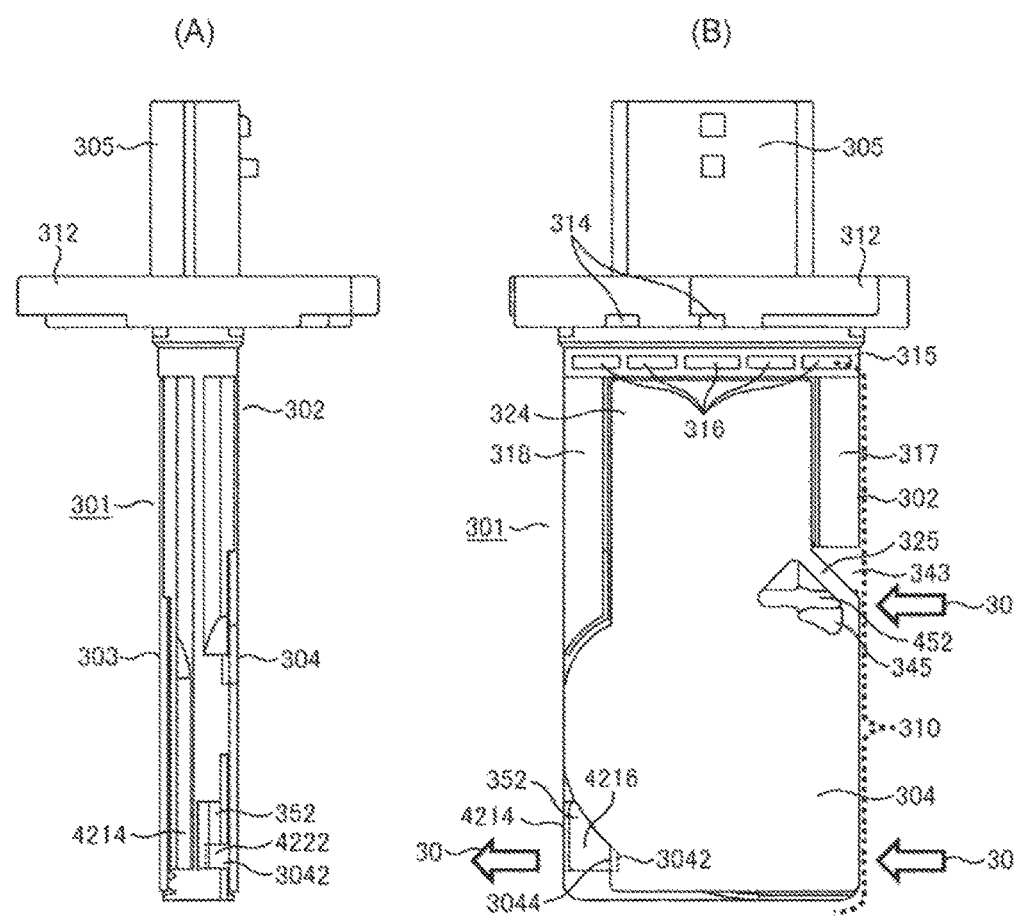

FIGS. 2(A), 2(B), 3(A), 3(B), 4(A), and 4(B) are diagrams illustrating the exterior of the thermal flow meter 300, in which FIG. 2(A) is left side view of the thermal flow meter 300, FIG. 2(B) is a front view, FIG. 3(A) is a right side view, FIG. 3(B) is a rear view, FIG. 4(A) is a plan view, and FIG. 4(B) is a bottom view. The thermal flow meter 300 includes a case 301, and the case 301 includes a housing 302, a front cover 303, and a rear cover 304. The housing 302 includes a flange 312 for fixing the thermal flow meter 300 to an intake body as a main passage 124, an external connector 305 having an external terminal 306 for electrical connection to external devices, and a measurement portion 310 for measuring a flow rate and the like. The measurement portion 310 is internally provided with a bypass passage trench for making a bypass passage. In addition, the measurement portion 310 is internally provided with a circuit package 400 having an air flow sensing portion 602 (refer to FIG. 20) for measuring a flow rate of the measurement target gas 30 flowing through the main passage 124 or a temperature detecting portion 452 for measuring a temperature of the measurement target gas 30 flowing through the main passage 124. This will be explained later.

The thermal flow meter 300 has the external connector 305 at one side and has the measurement portion 310 at the other side with the flange 312 interposed therebetween. The measurement portion 310 is substantially in a rectangular shape, and the inlet port 350 for receiving the measurement target gas 30 and the outlet port 352 for discharging the received measurement target gas 30 are provided at the leading end side of the measurement portion 310 at the opposite side to the flange 312 in the measurement portion 310.

The front surface of the thermal flow meter 300 described in the front view of FIG. 2(B) and the rear front surface of the thermal flow meter 300 described in the rear view of FIG. 3(B) have a substantially flat shape, and the thickness of the thermal flow meter 300 which is between the front surface and the rear surface of the thermal flow meter 300 is made to be thin as described in FIG. 2(A) and FIG. 3(A). Therefore, the hole formed in the intake pipe which is the main passage 124 is in an elongated rectangular shape. The portion of the measurement portion 310 of the thermal flow meter 300 is inserted through the hole provided in the intake pipe, and is fixed by the flange 312 to the intake pipe. The front surface and the rear surface of the measurement portion 310 of the thermal flow meter 300 are placed so as to be along the flow of the measurement target gas 30 of the main passage 124 which is the intake pipe, so that there is an effect of reducing the fluid resistance because the thickness of the thermal flow meter 300 is thin.

2.2 External Structure of Thermal Flow Meter 300 and Effects Based on External Structure of Thermal Flow Meter 300

In FIG. 1, FIGS. 2(A) and 2(B), and FIGS. 3(A) and 3(B), the inlet port 350 of the bypass passage of the thermal flow meter 300 for taking in some of the measurement target gas 30 flowing in the main passage 124 is provided at the leading end side of the measurement portion 310 extending from the flange 312 in the center direction of the main passage 124. Therefore, the measurement target gas 30 in proximity to the inner wall surface of the main passage 124 is not taken into the bypass passage, but the measurement target gas 30 in a portion close to the center portion away from the inner wall surface can be taken into the bypass passage. Therefore, the thermal flow meter 300 can measure the flow rate and the temperature of the measurement target gas 30 in a portion away from the inner wall surface of the main passage 124, and the reduction of the measurement accuracy due to the effect of the heat and the like can be suppressed. In the vicinity of the inner wall surface of the main passage 124, it is likely to be affected by the temperature of the main passage 124, and the temperature of the measurement target gas 30 is different from the original temperature of the gas, and is different from the average state of the measurement target gas 30 flowing through the main passage 124. In particular, when the main passage 124 is the intake body of the engine, the main passage 124 is likely to be affected by the heat of the engine, and the main passage 124 is likely to be maintained at a high temperature in many cases. Therefore, the gas in proximity to the inner wall surface of the main passage 124 is likely to be higher than the original temperature of the main passage 124. If the gas in proximity to the inner wall surface of the main passage 124 is measured, this may result in measuring the flow rate and the temperature of a gas different from the gas in the average state of the main passage 124, and this may be one of the factors for reducing the measurement accuracy.

In proximity to the inner wall surface of the main passage 124, the fluid resistance is high, and the flow velocity is lower than the average flow velocity of the main passage 124. Therefore, when the gas in proximity to the inner wall surface of the main passage 124 is taken into the bypass passage as the measurement target gas 30, the measurement target gas 30 of which flow velocity is slower than the average flow velocity of the main passage 124 is measured as an average gas, and this may cause a measurement error. In the thermal flow meter 300 illustrated in FIGS. 2(A), 2(B), 3(A), 3(B), 4(A) and 4(B), the inlet port 350 is provided in the leading end of the thin and long measurement portion 310 extending to the center of the main passage 124 from the flange 312, and therefore, it is possible to reduce a measurement error caused by retrieval of the measurement target gas 30 in the vicinity of the inner wall surface having a lower flow velocity. In the thermal flow meter 300 illustrated in FIGS. 2(A), 2(B), 3(A), 3(B), and 4(A) and 4(B), in addition to the inlet port 350 provided in the leading end of the measurement portion 310 extending to the center of the main passage 124 from the flange 312, an outlet port of the bypass passage is also provided in the leading end of the measurement portion 310. Therefore, it is possible to further reduce the measurement error.

The measurement portion 310 of the thermal flow meter 300 has a shape extending from the flange 312 to the center direction of the main passage 124, and its leading end is provided with the inlet port 350 for inputting a part of the measurement target gas 30 such as an intake air to the bypass passage and the outlet port 352 for returning the measurement target gas 30 from the bypass passage to the main passage 124. While the measurement portion 310 has a shape extending along an axis directed to the center from the outer wall of the main passage 124, its width has a narrow shape as illustrated in FIGS. 2(A) and 3(A). That is, the measurement portion 310 of the thermal flow meter 300 has a front surface having an approximately rectangular shape and a side surface having a thin width. As a result, the thermal flow meter 300 can have a bypass passage having a sufficient length, and it is possible to suppress a fluid resistance to a small value for the measurement target gas 30. For this reason, using the thermal flow meter 300 as described in the embodiment, it is possible to suppress the fluid resistance to a small value and measure the flow rate of the measurement target gas 30 with a high degree of accuracy.

2.3 Structures of Measurement Portion 310 and Effects Based on Structures of Measurement Portion 310

In a flow direction of the measurement target gas 30 flowing in the main passage 124, an upstream-side protrusion 317 and a downstream-side protrusion 318 are provided in the upstream-side side surface and the downstream-side side surface, respectively, of the measurement portion 310 constituting the thermal flow meter 300. The upstream-side protrusion 317 and the downstream-side protrusion 318 have a shape narrowed along the leading end to the base, so that it is possible to reduce a fluid resistance of the measurement target gas 30 flowing through the main passage 124. The upstream-side protrusion 317 is provided between the thermal insulation 315 and the inlet port 343. The upstream-side protrusion 317 has a large cross section and receives a large heat conduction from the flange 312 or the thermal insulation 315. However, the upstream-side protrusion 317 is cut before the inlet port 343, and a length of the temperature detecting portion 452 from the temperature detecting portion 452 of the upstream-side protrusion 317 increases due to the hollow of the upstream-side outer wall of the housing 302 as described below. For this reason, the heat conduction is suppressed from the thermal insulation 315 to the support portion of the temperature detecting portion 452. This contributes to maintaining a high measurement accuracy.

In order to measure the temperature of the measurement target gas 30, a portion of the measurement target gas 30 is retrieved through the inlet port 343, and the temperature detecting portion 452 measures the temperature of the retrieved measurement target gas 30, and the measurement target gas 30 flows through the temperature measurement flow path made by the outer wall hollow portion 366 of the housing 302 explained later (refer to FIG. 5), and is discharged to the main passage 124 from a front side outlet port 344 or a backside outlet port 345. Since the measurement target gas 30 introduced from the inlet port 343 is guided along the protrusion 424 having the temperature detecting portion 452 (refer to FIG. 11) by the cooling path trench, this performs action to make not only the temperature detecting portion 452 but also the protrusion 424 to have a temperature closer to the measurement target gas 30. Therefore, the effect of the heat transmitted from the other heat generation portion to the protrusion 424 can be reduced, and leads to the improvement of the temperature measurement accuracy of the measurement target gas 30.

A gap 382 including the terminal connector 320 and the terminal connector 320 described below is formed between the flange 312 or the thermal insulation 315 and the temperature detecting portion 452. For this reason, a distance between the flange 312 or the thermal insulation 315 and the temperature detecting portion 452 increases, and the front cover 303 or the rear cover 304 is provided in this long portion, so that this portion serves as a cooling surface. Therefore, it is possible to reduce influence of the temperature of the wall surface of the main passage 124 to the temperature detecting portion 452. In addition, as the distance between the flange 312 or the thermal insulation 315 and the temperature detecting portion 452 increases, it is possible to guide a part of the measurement target gas 30 input to the bypass passage to the vicinity of the center of the main passage 124. It is possible to suppress a decrease of the measurement accuracy related to the wall surface of the main passage 124.

As illustrated in FIG. 2(B) or 3(B), both side surfaces of the measurement portion 310 inserted into the main passage 124 have a very narrow shape, and a leading end of the downstream-side protrusion 318 or the upstream-side protrusion 317 has a narrow shape relative to the base where the air resistance is reduced. For this reason, it is possible to suppress an increase of the fluid resistance caused by insertion of the thermal flow meter 300 into the main passage 124. Furthermore, in the portion where the downstream-side protrusion 318 or the upstream-side protrusion 317 is provided, the upstream-side protrusion 317 or the downstream-side protrusion 318 protrudes toward both sides relative to both side portions of the front cover 303 or the rear cover 304. Since the upstream-side protrusion 317 or the downstream-side protrusion 318 is formed of a resin molding, they are easily formed in a shape having an insignificant air resistance. Meanwhile, the front cover 303 or the rear cover 304 is shaped to have a wide cooling surface. For this reason, the thermal flow meter 300 has a reduced air resistance and can be easily cooled by the measurement target gas flowing through the main passage 124.

2.4 Structure and Effects of Flange 312

The flange 312 is provided with a plurality of hollows 314 on its lower surface which is a portion facing the main passage 124, so as to reduce a heat transfer surface with the main passage 124 and make it difficult for the thermal flow meter 300 to receive influence of the heat. The screw hole 313 of the flange 312 is provided to fix the thermal flow meter 300 to the main passage 124, and a space is formed between a surface facing the main passage 124 around each screw hole 313 and the main passage 124 such that the surface facing the main passage 124 around the screw hole 313 recedes from the main passage 124. As a result, the flange 312 has a structure capable of reducing heat transfer from the main passage 124 to the thermal flow meter 300 and preventing degradation of the measurement accuracy caused by heat. Furthermore, in addition to the heat conduction reduction effect, the hollow 314 can reduce influence of contraction of the resin of the flange 312 during the formation of the housing 302.

The thermal insulation 315 is provided in the measurement portion 310 side of the flange 312. The measurement portion 310 of the thermal flow meter 300 is inserted into the inside from an installation hole provided in the main passage 124 so that the thermal insulation 315 faces the inner surface of the installation hole of the main passage 124. The main passage 124 serves as, for example, an intake body, and is maintained at a high temperature in many cases. Conversely, it is conceived that the main passage 124 is maintained at a significantly low temperature when the operation is activated in a cold district. If such a high or low temperature condition of the main passage 124 affects the temperature detecting portion 452 or the measurement of the flow rate described below, the measurement accuracy is degraded. For this reason, a plurality of hollows 316 are provided side by side in the thermal insulation 315 which makes contact with the hole inner surface of the main passage 124, and a width of the thermal insulation 315 adjacent to the hole inner surface between the adjoining hollows 316 is significantly thin, which is equal to or smaller than ⅓ of the width of the fluid flow direction of the hollow 316. As a result, it is possible to reduce influence of temperature. In addition, a portion of the thermal insulation 315 becomes thick. During a resin molding of the housing 302, when the resin is cooled from a high temperature to a low temperature and is solidified, volumetric shrinkage occurs so that a deformation is generated as a stress occurs. By forming the hollow 316 in the thermal insulation 315, it is possible to more uniformize the volumetric shrinkage and reduce stress concentration.

The measurement portion 310 of the thermal flow meter 300 is inserted into the inside from the installation hole provided in the main passage 124 and is fixed to the main passage 124 using the flange 312 of the thermal flow meter 300 with screws. The thermal flow meter 300 is preferably fixed to the installation hole provided in the main passage 124 with a predetermined positional relationship. The hollow 314 provided in the flange 312 may be used to determine a positional relationship between the main passage 124 and the thermal flow meter 300. By forming the convex portion in the main passage 124, it is possible to provide an insertion relationship between the convex portion and the hollow 314 and fix the thermal flow meter 300 to the main passage 124 in an accurate position.

2.5 Structures and Effects of External Connector 305 and Flange 312

FIG. 4(A) is a plan view illustrating the thermal flow meter 300. Four external terminal 306 and a calibration terminal 307 are provided inside the external connector 305. The external terminals 306 include terminals for outputting the flow rate and the temperature as a measurement result of the thermal flow meter 300 and a power terminal for supplying DC power for operating the thermal flow meter 300. The calibration terminal 307 is used to measures the produced thermal flow meter 300 to obtain a calibration value of each thermal flow meter 300 and store the calibration value in an internal memory of the thermal flow meter 300. In the subsequent measurement operation of the thermal flow meter 300, the calibration data representing the calibration value stored in the memory is used, and the calibration terminal 307 is not used. Therefore, in order to prevent the calibration terminal 307 from hindering connection between the external terminals 306 and other external devices, the calibration terminal 307 has a shape different from that of the external terminal 306. In this embodiment, since the calibration terminal 307 is shorter than the external terminal 306, the calibration terminal 307 does not hinder connection even when the connection terminal connected to the external terminal 306 for connection to external devices is inserted into the external connector 305. In addition, since a plurality of hollows 308 are provided along the external terminal 306 inside the external connector 305, the hollows 308 reduce stress concentration caused by shrinkage of resin when the resin as a material of the flange 312 is cooled and solidified.

Since the calibration terminal 307 is provided in addition to the external terminal 306 used during the measurement operation of the thermal flow meter 300, it is possible to measure characteristics of each thermal flow meter 300 before shipping to obtain a variation of the product and store a calibration value for reducing the variation in the internal memory of the thermal flow meter 300. The calibration terminal 307 is formed in a shape different from that of the external terminal 306 in order to prevent the calibration terminal 307 from hindering connection between the external terminal 306 and external devices after the calibration value setting process. In this manner, using the thermal flow meter 300, it is possible to reduce a variation of each thermal flow meter 300 before shipping and improve measurement accuracy.

2.6 Structures and Effects of Outlet Port 352 of Thermal Flow Meter 300

In FIG. 2(A) and FIG. 2(B), a portion of the measurement target gas 30 flowing from the inlet port 350 through the main passage 124 is retrieved, and the flow velocity of the measurement target gas 30 retrieved by the measurement portion 310 is measured, and on the basis of this, the flow rate of the measurement target gas 30 flowing through the main passage 124 is measured, and an electric signal representing the flow rate is output from the external terminal 306 as shown in FIG. 4(A). The retrieved measurement target gas 30 is discharged to the main passage 124 from the outlet port 352 as shown in FIG. 3(A) and FIG. 3(B). In order to reduce the fluid resistance, the thermal flow meter 300 is configured such that, as shown in FIG. 2(A) and FIG. 3(A), the thickness of the thermal flow meter 300, i.e., the length between the front cover 303 and the rear cover 304, is made to be thin. In addition, the downstream-side protrusion 318 is provided to reduce occurrence of the vortex at the downstream side of the thermal flow meter 300, but even with the downstream-side protrusion 318, the vortex is generated at the downstream side of the outlet port 352 by the measurement target gas 30 of the main passage 124 flowing along the front cover 303 and the rear cover 304 of the thermal flow meter 300.

In order to accurately measure the flow rate in the backward flow state of the measurement target gas 30 flowing in the main passage 124, when the backward flow occurs, a portion of the measurement target gas 30 flowing backward is retrieved from the outlet port 352 into the bypass passage, and the measurement portion 310 measures the flow rate, and after the measurement, the measurement target gas 30 is discharged from the inlet port 350 into the main passage 124. More specifically, a flow is generated which is opposite to the flow of the measurement target gas 30 in the thermal flow meter 300 in the forward direction state, and the flow rate of the measurement target gas 30 flowing backward is measured.

Although this will be explained with reference to FIG. 11 below, if the vortex generated at the downstream of the outlet port 352 when the measurement target gas 30 flows in the main passage 124 in the forward direction is retrieved into the bypass passage when the measurement target gas 30 flows backward in the main passage 124, then a measurement error occurs because of the retrieved vortex. In order to prevent the retrieved vortex from entering into the bypass passage, a vortex introduction suppression unit 4214 as shown in FIG. 3(A) is provided at a position opposite to the outlet port side of the bypass passage. In this embodiment, the vortex inflow suppression unit 4214 is a plate disposed at the position opposite to the outlet port side of the bypass passage, i.e., a position for closing the flow path axis of the bypass passage so as to eliminate an outlet port opening on the flow path axis of the bypass passage. This plate serves as a structure for preventing the vortex from entering into the bypass passage. On the other hand, retrieving as much measurement target gas 30 flowing backward as possible leads to improvement of the measurement accuracy, and therefore, an outlet port opening 4222 is provided at the downstream side of the inlet port-side bypass passage, and this makes a structure for retrieving the measurement target gas 30 flowing backward from the outlet port opening 4222. A vortex which may cause the measurement error is added to the measurement target gas 30 retrieved from the outlet port opening 4222, and therefore, the measurement target gas 30 retrieved from the outlet port opening 4222 is not guided to the bypass passage as it is, and, as explained again with reference to FIG. 10 below, the retrieved measurement target gas 30 is first guided to the outlet port side chamber 4216, and using a guide for changing the course direction of the measurement target gas 30 disposed at the deeper side of the outlet port side chamber 4216, the course of the introduced measurement target gas 30 is changed. In this embodiment, the guide is a protrusion 3042 provided on the rear cover 304. When the course of the introduced measurement target gas 30 is changed by the protrusion 3042, the vortex entering together with the measurement target gas 30 can be rapidly attenuated. Therefore, this can reduce the adverse effect caused by the vortex to the flow rate measurement. More specifically, this will be hereinafter explained below with reference to FIG. 10.

3. Entire Structure of Housing 302 and its Effects 3.1 Structures and Effects of Bypass Passage and Air Flow Sensing Portion FIGS. 5(A), 5(B), 6(A), and 6(B) illustrate a state of the housing 302 when the front and rear covers 303 and 304 are removed from the thermal flow meter 300. FIG. 5(A) is a left side view illustrating the housing 302, FIG. 5(B) is a front view illustrating the housing 302, FIG. 6(A) is a right side view illustrating the housing 302, and FIG. 6(B) is a rear view illustrating the housing 302. In the housing 302, the measurement portion 310 extends from the flange 312 to the center direction of the main passage 124, and a bypass passage trench for forming the bypass passage is provided in its leading end side. In this embodiment, the bypass passage trench is provided on both frontside and backside of the housing 302. FIG. 5(B) illustrates a bypass passage trench on frontside 332, and FIG. 6(B) illustrates a bypass passage trench on backside 334. Since an inlet trench 351 for forming the inlet port 350 of the bypass passage and an outlet trench 353 for forming the outlet port 352 are provided in the leading end of the housing 302, the gas distant from the inner wall surface of the main passage 124, that is, the gas flow through the vicinity of the center of the main passage 124 can be received as the measurement target gas 30 from the inlet port 350. The gas flowing through the vicinity of the inner wall surface of the main passage 124 is influenced by the temperature of the wall surface of the main passage 124 and has a temperature different from the average temperature of the gas flowing through the main passage 124 such as the measurement target gas 30 in many cases. In addition, the gas flowing through the vicinity of the inner wall surface of the main passage 124 has a flow velocity lower than the average flow velocity of the gas flowing through the main passage 124 in many cases. Since the thermal flow meter 300 according to the embodiment is resistant to such influence, it is possible to suppress a decrease of the measurement accuracy.

The bypass passage formed by the bypass passage trench on frontside 332 or the bypass passage trench on backside 334 described above is connected to the thermal insulation 315 of the flange 312 through the outer wall hollow portion 366, the upstream-side outer wall 335, or the downstream-side outer wall 336. In addition, the upstream-side outer wall 335 is provided with the upstream-side protrusion 317, and the downstream-side outer wall 336 is provided with the downstream-side protrusion 318. In this structure, since the thermal flow meter 300 is fixed to the main passage 124 using the flange 312, the measurement portion 310 having the circuit package 400 is fixed to the main passage 124 with high reliability.

In this embodiment, the housing 302 is provided with the bypass passage trench for forming the bypass passage, and the covers are installed on the frontside and backside of the housing 302, so that the bypass passage is formed by the bypass passage trench and the covers. In this structure, it is possible to form overall bypass passage trenches as a part of the housing 302 in the resin molding process of the housing 302. In addition, since the dies are provided in both surfaces of the housing 302 during formation of the housing 302, it is possible to form both the bypass passage trench on frontside 332 and bypass passage trench on backside 334 as a part of the housing 302 by using the dies for both the surfaces. Since the front and rear covers 303 and 304 are provided in both the surfaces of the housing 302, it is possible to obtain the bypass passages in both surfaces of the housing 302. Since the front and bypass passage trench on frontside 332 and bypass passage trenches on backside 334 are formed on both the surfaces of the housing 302 using the dies, it is possible to form the bypass passage with high accuracy and obtain high productivity.

As can be understood from FIGS. 2(A) and 2(B), FIGS. 3(A) and 3(B), FIGS. 5(A) and 5(B), and further FIGS. 6(A) and 6(B), the upstream-side outer wall 335 and the downstream-side outer wall 336 protruding in the front side direction and in the back side direction from the front side and the back side of the housing 302, further, portions where these upstream-side outer wall 335 and the downstream-side outer wall 336 are connected to the thermal insulation 315, and vertex portions of the inside wall of bypass passage on backside 391, the outside wall of bypass passage on backside 392, the inside wall of bypass passage on frontside 393, and the outside wall of bypass passage on frontside 394 are in close contact with the front cover 303 or the rear cover 304, and the bypass passage and a space closed by the housing 302 and the front cover 303 or the rear cover 304 are formed.

In the sealed space, as explained later in details, the circuit package 400 is provided, and a gap 382 is formed. The housing 302 and the front cover 303 or the rear cover 304 are adhered by laser welding and the like. However, when complete sealing is made by the housing 302 and the front cover 303 or the rear cover 304, there is a problem in that, e.g., expansion of a gas caused by change in the temperature, and therefore, a structure is provided to make sealing but still allowing for breathing. The breathable structure reduces the increase in the pressure difference from the outside based on the change in the temperature in the sealed space.

In FIG. 6(B), a portion of the measurement target gas 30 flowing through the main passage 124 is taken into the bypass passage trench on backside 334 from the inlet trench 351 forming the inlet port 350, and the measurement target gas 30 flows through the bypass passage trench on backside 334. The bypass passage trench on backside 334 gradually deepens as the gas flows, and the measurement target gas 30 slowly moves to the front direction as it flows along the trench. In particular, the bypass passage trench on backside 334 is provided with a steep slope portion 347 that steeply deepens immediately before the hole 342, so that a part of the air having a light mass moves along the steep slope portion 347 and then flows through the side of the measurement surface 430 illustrated in FIG. 5(B) from the hole 342. Meanwhile, since a foreign object having a heavy mass has difficulty in steeply changing its path due to an inertial force, it moves to the side of the backside of measurement surface 431 illustrated in FIG. 6(B). Then, the foreign object flows to the measurement surface 430 illustrated in FIG. 5(B) through the hole 341.

In the bypass passage trench on frontside 332 of FIG. 5(B), the air as a measurement target gas 30 moving from the hole 342 to the bypass passage trench on frontside 332 side flows along the measurement surface 430, and heat transfer is performed with the air flow sensing portion 602 for measuring a flow rate using the heat transfer surface exposing portion 436 provided in the measurement surface 430 in order to measure a flow rate. Both the measurement target gas 30 passing through the measurement surface 430 or the air flowing from the hole 341 to the bypass passage trench on frontside 332 flow along the bypass passage trench on frontside 332 and are discharged from the outlet trench 353 for forming the outlet port 352 to the main passage 124.

A substance having a heavy mass such as a contaminant mixed in the measurement target gas 30 has a high inertial force and has difficulty in steeply changing its path to the deep side of the trench along the surface of the steep slope portion 347 of FIG. 6(B) where a depth of the trench steeply deepens. For this reason, since a foreign object having a heavy mass moves through the side of the backside of measurement surface 431, it is possible to suppress the foreign object from passing through the vicinity of the heat transfer surface exposing portion 436. In this embodiment, since most of foreign objects having a heavy mass other than the gas pass through the backside of measurement surface 431 which is a rear surface of the measurement surface 430, it is possible to reduce influence of contamination caused by a foreign object such as an oil component, carbon, or a contaminant and suppress degradation of the measurement accuracy. That is, since the path of the measurement target gas 30 steeply changes along an axis across the flow axis of the main passage 124, it is possible to reduce influence of a foreign object mixed in the measurement target gas 30.

In this embodiment, the flow path including the bypass passage trench on backside 334 is directed to the flange from the leading end of the housing 302 along a curved line, and the gas flowing through the bypass passage in the side closest to the flange flows reversely to the flow of the main passage 124, so that the bypass passage in the rear surface side as one side of this reverse flow is connected to the bypass passage formed in the front surface side as the other side. As a result, it is possible to easily fix the heat transfer surface exposing portion 436 of the circuit package 400 to the bypass passage and easily receive the measurement target gas 30 in the position close to the center of the main passage 124.

In this embodiment, a hole 342 and a hole 341 are provided before and after the measurement surface 430 for measuring the flow rate in the flow direction in such a manner that they penetrate from the bypass passage trench on backside 334 to the bypass passage trench on frontside 332. Using the hole 342 and the hole 341 thus penetrating, the bypass passage is formed such that the measurement target gas 30 moves from the bypass passage trench on backside 334 formed in one surface of the housing 302 to the bypass passage trench on frontside 332 formed in the other surface of the housing 302. In this configuration, it is possible to form the bypass passage trench on both surfaces of the housing 302 through a single resin molding process and perform molding with a structure for matching the bypass passage trenches on both surfaces.

Since the hole 342 and the hole 341 are provided on both sides of the measurement surface 430 formed in the circuit package 400, the use of the die for forming the hole 342 and the hole 341 therethrough prevents the resin from flowing to the heat transfer surface exposing portion 436 formed in the measurement surface 430. Using the formation of the hole 342 and the hole 341 at the upstream side and the downstream side of the measurement surface 430, the die is arranged using these holes when the circuit package 400 is fixed to the housing 302 through resin molding, and the circuit package 400 can be positioned and fixed using this die.

In this embodiment, two holes, i.e., the hole 342 and the hole 341, are provided as holes penetrating from the bypass passage trench on backside 334 to the bypass passage trench on frontside 332. However, the two holes made up with the hole 342 and the hole 341 may not be provided, and a bypass passage shape in which any one of the holes connect the bypass passage trench on backside 334 the bypass passage trench on frontside 332 may be formed through a single resin molding process.

An inside wall of bypass passage on backside 391 and an outside wall of bypass passage on backside 392 are provided in both sides of the bypass passage trench on backside 334, and the inner side surface of the rear cover 304 abuts on the leading end portions of the height direction of each of the inside wall of bypass passage on backside 391 and the outside wall of bypass passage on backside 392, so that the bypass passage on backside is formed in the housing 302. In addition, an inside wall of bypass passage on frontside 393 and an outside wall of bypass passage on frontside 394 are provided in both sides of the bypass passage trench on frontside 332, and the inner side surface of the rear cover 304 abuts on the leading end portions of the height direction of the inside wall of bypass passage on frontside 393 and the outside wall of bypass passage on frontside 394, so that the bypass passage on frontside is formed in the housing 302.

In this embodiment, the measurement target gas 30 dividingly flows through the measurement surface 430 and its rear surface, and the heat transfer surface exposing portion 436 for measuring the flow rate is provided in one of them. However, the measurement target gas 30 may pass through only the surface side of the measurement surface 430 instead of dividing the measurement target gas 30 into two passages. By curving the bypass passage to follow a second axis across a first axis of the flow direction of the main passage 124, it is possible to gather a foreign object mixed in the measurement target gas 30 to the side where the curve of the second axis is insignificant. By providing the measurement surface 430 and the heat transfer surface exposing portion 436 in the side where the curve of the second axis is significant, it is possible to reduce influence of a foreign object.

In this embodiment, the measurement surface 430 and the heat transfer surface exposing portion 436 are provided in a link portion between the bypass passage trench on frontside 332 and the bypass passage trench on backside 334. However, the measurement surface 430 and the heat transfer surface exposing portion 436 may be provided in the bypass passage trench on frontside 332 or the bypass passage trench on backside 334 instead of the link portion between the bypass passage trench on frontside 332 and the bypass passage trench on backside 334.

An orifice shape is formed in a part of the heat transfer surface exposing portion 436 provided in the measurement surface 430 to measure a flow rate, so that the flow velocity increases due to the orifice effect, and the measurement accuracy is improved. In addition, even if a vortex is generated in a flow of the gas in the upstream side of the heat transfer surface exposing portion 436, it is possible to eliminate or reduce the vortex using the orifice and improve measurement accuracy.

Referring to FIGS. 5(A), 5(B), 6(A), and 6(B), an outer wall hollow portion 366 is provided, where the upstream-side outer wall 335 has a hollow shape hollowed to the downstream side in a neck portion of the temperature detecting portion 452. Due to this outer wall hollow portion 366, a distance between the temperature detecting portion 452 and the outer wall hollow portion 366 increases, so that it is possible to reduce influence of the heat transferred via the upstream-side outer wall 335.

Since the outer wall hollow portion 366 is provided in a neck portion of the temperature detecting portion 452, it is possible to reduce influence of the heat transferred from the flange 312 or the thermal insulation 315 through the upstream-side outer wall 335. Furthermore, a temperature measurement outer wall hollow portion 366 formed by a notch between the upstream-side protrusion 317 and the temperature detecting portion 452 is provided. Using the outer wall hollow portion 366, it is possible to reduce heat transfer to the temperature detecting portion 452 through the upstream-side protrusion 317. As a result, it is possible to improve detection accuracy of the temperature detecting portion 452. In particular, since the upstream-side protrusion 317 has a large cross section, it easily transfers heat, and a functionality of the outer wall hollow portion 366 that suppress heat transfer becomes important.

3.2 Structure of Bypass Passage and Flow Rate Measurement Passage Unit

As described above, the measurement surface 430 and the heat transfer surface exposing portion 436 are provided between the inlet port 350 for retrieving the measurement target gas 30 and the outlet port 352 for discharging the retrieved measurement target gas 30 to the main passage 124, so that heat transfer with the measurement target gas 30 in the bypass passage is performed at the heat transfer surface exposing portion 436 provided in the measurement surface 430, whereby the flow rate of the measurement target gas 30 flowing through the main passage 124 is measured.

In this embodiment, an inlet port-side bypass passage 4232 between the inlet port 350 and the measurement surface 430 in the bypass passage and an outlet port-side bypass passage 4234 between an outlet port side chamber 4216 in proximity to the outlet port 352 and the measurement surface 430 in the bypass passage are provided. The inlet port-side bypass passage 4232 is formed at the back side of the housing 302, and the outlet port-side bypass passage 4234 is formed at the front side of the housing 302. When the measurement target gas 30 is flowing in the main passage 124 in the forward direction, the measurement target gas 30 introduced from the inlet port 350 is guided from the inlet port-side bypass passage 4232 to the measurement surface 430, where the flow rate thereof is measured, and thereafter, the measurement target gas 30 passes through the outlet port-side bypass passage 4234 and the outlet port side chamber 4216, and the measurement target gas 30 is discharged from the main passage 124. In this state, the flow rate of the measurement target gas 30 in the forward direction flowing in the main passage 124 is measured.

On the other hand, when the measurement target gas 30 flows in the backward flow state through the main passage 124, a portion of the measurement target gas 30 in the backward flow state is retrieved through the outlet port 352 in order to measure the flow rate of the measurement target gas 30 flowing backward in the main passage 124, and the measurement target gas 30 is introduced via the outlet port side chamber 4216 to the outlet port-side bypass passage 4234, and is guided to the measurement surface 430. At the measurement surface 430, the measurement target gas 30 flowing backward is measured, so that the flow rate of the measurement target gas 30 flowing backward through the main passage 124 is measured. The measurement target gas 30 measured at the measurement surface 430 is discharged through the inlet port-side bypass passage 4232 to the main passage 124 from the inlet port 350.

The housing 302 is formed with the bypass passage trench on backside 334 for forming the inlet port-side bypass passage 4232 and the bypass passage trench on frontside 332 for forming the outlet port-side bypass passage 4234. Therefore, by fixing the front cover 303 and the rear cover 304 with the housing 302, the inlet port-side bypass passage 4232 and the outlet port-side bypass passage 4234 are formed.

The measurement surface 430 functions as a flow rate measurement passage unit for measuring the flow rate of the measurement target gas 30 in the forward direction and the backward direction.

Figure 6:
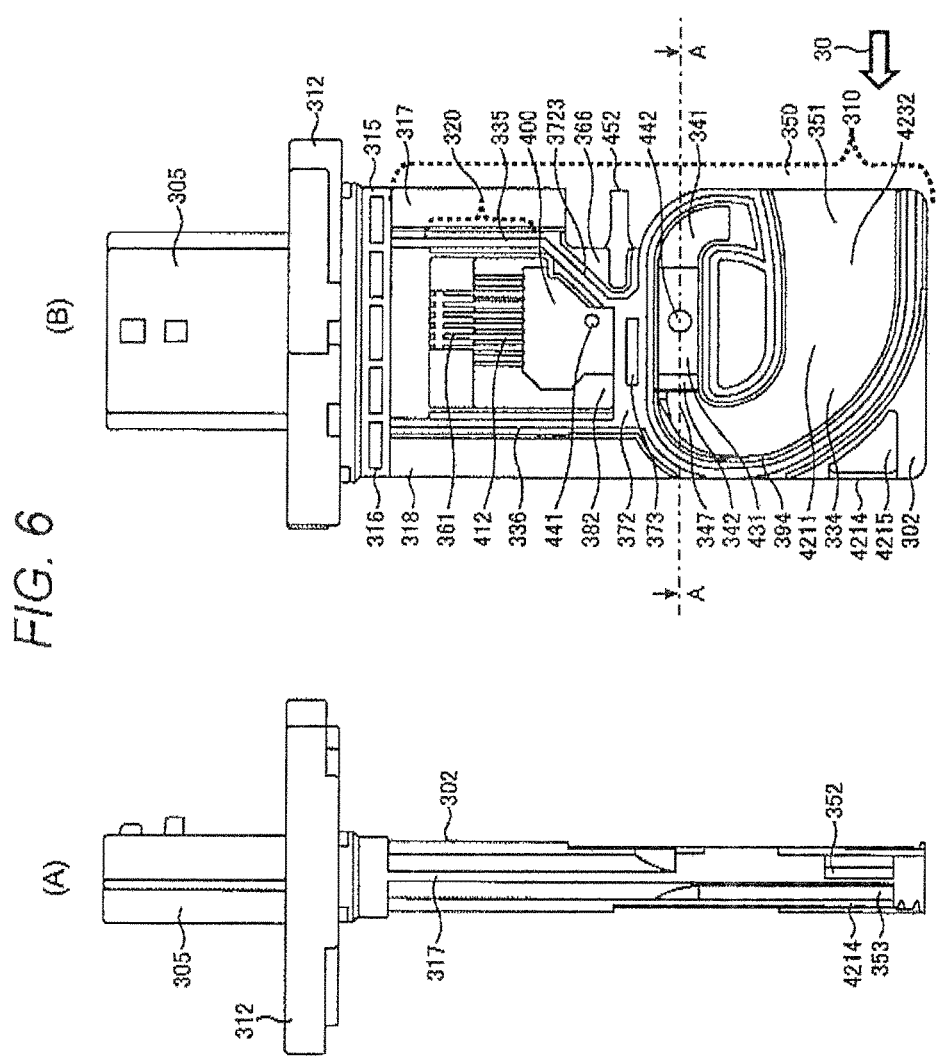

3.3 Structures of Flow Rate Measurement Passage Unit of Bypass Passage and Effects Based on Structures of Flow Rate Measurement Passage Unit of Bypass Passage FIG. 7 is a partially enlarged view illustrating a state in which the measurement surface 430 of the circuit package 400 is arranged inside of the bypass passage trench, and is a cross sectional view taken along line A-A of FIG. 6. This view is a conceptual view. The detailed shapes are shown in FIGS. 5 and 6, but in FIG. 7, the details are omitted and simplified, and the details are slightly deformed. In FIG. 7, the left side portion is a terminated end portion of the bypass passage trench on backside 334, and the right side portion is a starting end portion of the bypass passage trench on frontside 332. Although not illustrated clearly in FIG. 7, the hole 342 and the hole 341 are provided in both the left and right sides of the circuit package 400 having the measurement surface 430, and the bypass passage trench on backside 334 and the bypass passage trench on frontside 332 are connected to the left and right sides of the circuit package 400 having the measurement surface 430.

The measurement target gas 30 that is received from the inlet port 350 and flows through the bypass passage on backside including the bypass passage trench on backside 334 is guided from the left side of FIG. 7. A part of the measurement target gas 30 flows to a flow path 386 including the front side of the measurement surface 430 of the circuit package 400 and the protrusion 356 provided in the front cover 303 through the hole 342. The other measurement target gas 30 flows to a flow path 387 formed by the backside of measurement surface 431 and the rear cover 304. Then, the measurement target gas 30 flowing through the flow path 387 moves to the bypass passage trench on frontside 332 through the hole 341 and is combined with the measurement target gas 30 flowing through the flow path 386, so that it flows through the bypass passage trench on frontside 332 and is discharged from the outlet port 352 to the main passage 124. It is noted that the protrusion 358 provided in the rear cover 304 protrudes to the backside of measurement surface 431 in the flow path 387.

Because the bypass passage trench is formed such that the flow path of the measurement target gas 30 guided to the flow path 386 through the hole 342 from the bypass passage trench on backside 334 is curved wider than the flow path guided to the flow path 387, a substance having a heavy mass such as a contaminant contained in the measurement target gas 30 is gathered in the flow path 387 being less curved. For this reason, there is nearly no flow of a foreign object into the flow path 386.

The flow path 386 is structured to form an orifice such that the front cover 303 is provided successively to the leading end portion of the bypass passage trench on frontside 332, and the protrusion 356 smoothly protrudes to the measurement surface 430 side. The measurement surface 430 is arranged in one side of the orifice portion of the flow path 386 and is provided with the heat transfer surface exposing portion 436 for performing heat transfer between air flow sensing portion 602 and the measurement target gas 30. In order to perform measurement of the air flow sensing portion 602 with high accuracy, the measurement target gas 30 in the heat transfer surface exposing portion 436 preferably makes a laminar flow having a little vortex. In addition, with the flow velocity being faster, the measurement accuracy is more improved. For this reason, the orifice is formed such that the protrusion 356 provided in the front cover 303 to face the measurement surface 430 smoothly protrudes to the measurement surface 430. This orifice reduces a vortex in the measurement target gas 30 to approximate the flow to a laminar flow. Furthermore, since the flow velocity increases in the orifice portion, and the heat transfer surface exposing portion 436 for measuring the flow rate is arranged in the orifice portion, the measurement accuracy of the flow rate is improved.

Since the orifice is formed such that the protrusion 356 protrudes to the inside of the bypass passage trench to face the heat transfer surface exposing portion 436 provided on the measurement surface 430, it is possible to improve measurement accuracy. The protrusion 356 for forming the orifice is provided on the cover facing the heat transfer surface exposing portion 436 provided on the measurement surface 430. In FIG. 7, since the cover facing the heat transfer surface exposing portion 436 provided on the measurement surface 430 is the front cover 303, the heat transfer surface exposing portion 436 is provided in the front cover 303. Alternatively, the protrusion 356 may also be provided in the cover facing the heat transfer surface exposing portion 436 provided on the measurement surface 430 of the front or rear cover 303 or 304. Depending on which of the surfaces the measurement surface 430 and the heat transfer surface exposing portion 436 in the circuit package 400 are provided, the cover that faces the heat transfer surface exposing portion 436 is changed.

A distribution of the measurement target gas 30 between the flow paths 386 and 387 also relates to the high accuracy measurement. A distribution of the measurement target gas 30 between the flow paths 386 and 387 is adjusted by causing the protrusion 358 provided in the rear cover 304 to protrude to the flow path 387. In addition, since the orifice portion is provided in the flow path 387, it is possible to increase the flow velocity and guide a foreign object such as a contaminant to the flow path 387. In the Embodiment, the orifice formed by the protrusion 358 is used as one of means for adjustment between the flow paths 386 and 387. Alternatively, the aforementioned distribution of the flow rate between the flow paths 386 and 387 may be adjusted by adjusting a width between the backside of measurement surface 431 and the rear cover 304 and the like. In this case, the protrusion 358 provided in the rear cover 304 is not necessary.

Referring to FIGS. 5(A), 5(B), 6(A), and 6(B), a press imprint 442 of the die used in the resin molding process for the circuit package 400 remains on the backside of measurement surface 431 as a rear surface of the heat transfer surface exposing portion 436 provided on the measurement surface 430. The press imprint 442 does not particularly hinder the measurement of the flow rate and does not make any problem even when the press imprint 442 remains. In addition, as described below, it is important to protect a semiconductor diaphragm of the air flow sensing portion 602 when the circuit package 400 is formed through resin molding. For this reason, pressing of the rear surface of the heat transfer surface exposing portion 436 is important. Furthermore, it is important to prevent resin that covers the circuit package 400 from flowing to the heat transfer surface exposing portion 436. For this viewpoint, the inflow of the resin is suppressed by enveloping the measurement surface 430 including the heat transfer surface exposing portion 436 using a die and pressing the rear surface of the heat transfer surface exposing portion 436 using another die. Since the circuit package 400 is made through transfer molding, a pressure of the resin is high, and pressing from the rear surface of the heat transfer surface exposing portion 436 is important. In addition, since a semiconductor diaphragm is used in the air flow sensing portion 602, a ventilation passage for a gap created by the semiconductor diaphragm is preferably formed. In order to hold and fix a plate and the like for forming the ventilation passage, pressing from the rear surface of the heat transfer surface exposing portion 436 is important.

3.4 Shape of Cover of Thermal Flow Meter 300 and Effect Based on Shape of Cover of Thermal Flow Meter 300

Figure 9:
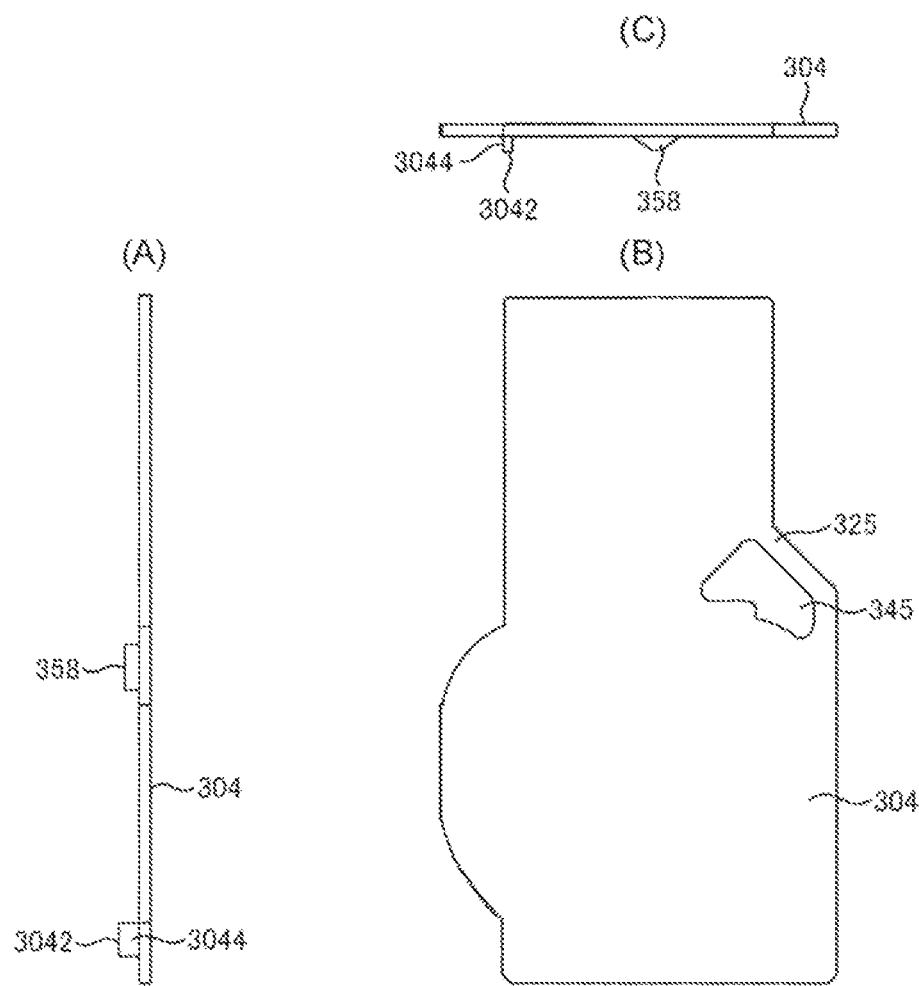

FIGS. 8(A) to 8(C) is a diagram illustrating an appearance of the front cover 303, in which FIG. 8(A) is a left side view, FIG. 8(B) is a front view, and FIG. 8(C) is a plan view. FIGS. 9(A) to 9(C) are diagrams illustrating an appearance of the rear cover 304, in which FIG. 9(A) is a left side view, FIG. 9(B) is a front view, and FIG. 9(C) is a plan view. In FIGS. 8(A) to 8(C) and FIGS. 9(A) to 9(C), the front cover 303 and the rear cover 304 are provided on the front surface and the rear surface of the housing 302, and as shown in FIG. 5(A), 5(B), 6(A), or 6(B), the front cover 303 and the rear cover 304 are in close contact with the top sides of the upstream-side outer wall 335 and the downstream-side outer wall 336 which are the outer walls of the housing 302, and more specifically, the front cover 303 and the rear cover 304 are in close contact with a leading end portion in the height direction which is the outermost side at the front side and the back side thereof, and are likewise in close contact with a leading end portion in the height direction which is the outermost side at the front side and the back side of the fixing portion 3721, and are further in close contact also at the side of the flange 312, so that a gap 382 is formed sealed inside. Further, the front cover 303 and the rear cover 304 are used to make the passage by sealing the bypass passage trench of the housing 302. In addition, the front cover 303 and the rear cover 304 are used to make an orifice with the protrusion 356. Therefore, the front cover 303 and the rear cover 304 are preferably made with high formation accuracy. The front cover 303 and the rear cover 304 are made with a resin molding process for injecting thermoplastic resin into a die, and therefore, the front cover 303 and the rear cover 304 can be made with high formation accuracy.

The front protection portion 322 or the rear protection portion 325 is formed in the front or rear cover 303 or 304 illustrated in FIG. 8(A) to 8(C) or 9(A) to 9(C). As illustrated in FIG. 2(A), 2(B), 3(A), or 3(B), the front protection portion 322 provided in the front cover 303 is arranged on the front side surface of the inlet port 343, and the rear protection portion 325 provided in the rear cover 304 is arranged in the rear side surface of the inlet port 343. The temperature detecting portion 452 arranged inside the inlet port 343 is protected by the front protection portion 322 and the rear protection portion 325, so that it is possible to prevent a mechanical damage of the temperature detecting portion 452 caused when the temperature detecting portion 452 collides with something during production or loading on a vehicle.

The inner side surface of the front cover 303 is provided with the protrusion 356. As illustrated in FIG. 7, the protrusion 356 is arranged to face the measurement surface 430 and has a shape extending along an axis of the flow path of the bypass passage. An orifice is formed in the flow path 386 described above using the measurement surface 430 and the protrusion 356 so as to reduce a vortex generated in the measurement target gas 30 and generate a laminar flow. In this embodiment, the bypass flow path having the orifice portion is divided into a trench portion and a lid portion that covers the trench to form a flow path having an orifice, and the trench portion is formed through a second resin molding process for forming the housing 302. Then, the front cover 303 having the protrusion 356 is formed through another resin molding process, and the trench is covered by using the front cover 303 as a lid of the trench to form the bypass passage. In the second resin molding process for forming the housing 302, the circuit package 400 having the measurement surface 430 is also fixed to the housing 302. Since formation of the trench having such a complicated shape is performed through a resin molding process, and a protrusion 356 for the orifice is provided in the front cover 303, it is possible to form the flow path 386 of FIG. 7 with high accuracy. In addition, since an arrangement relationship between the trench and the measurement surface 430 or the heat transfer surface exposing portion 436 can be maintained with high accuracy, it is possible to reduce a variation of the product and as a result obtain a high measurement result. Therefore, it is possible to improve productivity.

The flow path 387 made with the rear cover 304 and the backside of measurement surface 431 is also formed in the same manner. The flow path 386 is divided into a trench portion and a lid portion, and the trench portion is formed through a second resin molding process for forming the housing 302. Subsequently, the trench is covered with the rear cover 304 having the protrusion 358, so that the flow path 387 is formed. Since the flow path 387 is thus made, the flow path 386 can be made with a high degree of accuracy, and it is possible to improve productivity. In this embodiment, the orifice is provided in the flow path 387. Alternatively, the protrusion 358 may not be used, and it is also possible to use a flow path 387 without any orifice.

In FIG. 8(B), a notch 323 is provided at the leading end side of the front cover 303 so as to form an outlet port 352. As shown in FIG. 2(B), the outlet port 352 extends on the right side surface of the housing 302, and in addition, with this notch 323, the outlet port 352 extends on the front surface side of the housing 302. Accordingly, the fluid resistance of the entire bypass passage decreases, and the measurement target gas 30 guided into the bypass passage from the inlet port 350 increases. Therefore, the measurement accuracy of the flow rate is improved.

The rear cover 304 is provided with the protrusion 3042. This protrusion 3042 acts as a wall 3044 of the outlet port side chamber 4216 explained later. When the measurement target gas 30 flowing in the main passage 124 is flowing backward, there is a problem in that the vortex generated at the downstream side of the outlet port 352 is retrieved from the outlet port 352 when the measurement target gas 30 flows in the forward direction. The protrusion 3042 is configured to attenuate the retrieved vortex by changing the course of the measurement target gas 30 including the retrieved vortex in order to prevent the retrieved vortex from entering into the outlet port-side bypass passage 4234. This action will be subsequently explained with reference to FIGS. 10 and 11.

Figure 10:
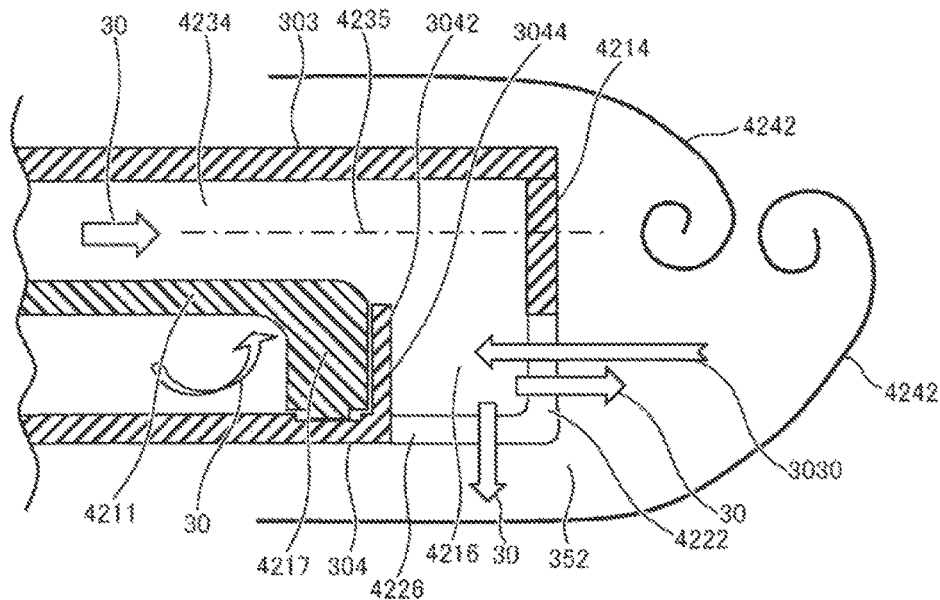
FIG. 10 is a cross sectional view taken along taken along C-C of FIG. 2(B).

4. Measurement of Measurement Target Gas 30 Flowing Backward and Cause of Measurement Error Thereof 4.1 Cause of Measurement Error FIG. 10 illustrates a cross section taken along line C-C of FIG. 2(B). The width of the thermal flow meter 300 which is the length between the front cover 303 and the rear cover 304 is made to be thin, but in the measurement target gas 30 flowing in the flowing direction in the main passage 124, vortexes 4242 is generated at the downstream side of the outlet port 352 of the thermal flow meter 300. FIG. 11 illustrates a change in the amount of the intake air in a particular operation range in a case where the thermal flow meter 300 is used to measure the amount of the intake air of the internal combustion engine. A changing waveform of an actual flow rate is represented by a waveform 4914. The flow rate of the amount of the intake air actually provided to the internal combustion engine in synchronization with operation of the internal combustion engine is changing as indicated by the waveform 4914. In the example as shown in FIG. 11, the intake air which is the measurement target gas 30 flows backward between a time t1 and a time t2. Not only the flow rate of the measurement target gas 30 flowing in the forward direction but also the flow rate of the measurement target gas 30 flowing backward between the time t1 and the time t2 is accurately measured, so that the amount of air actually retrieved into the internal combustion engine can be measured with a high degree of accuracy.

Unless otherwise specifically described in this specification, "upstream side and downstream side" are simply described on the basis of the flow in the state in which the measurement target gas 30 flows in the forward direction. Therefore, unless otherwise specifically described, the measurement target gas 30 flowing backward means the flow from the downstream side to the upstream side in the forward direction.

4.2 Solution to Cause of Measurement Error

As shown in FIG. 10, the vortexes 4242 are generated at the downstream side of the thermal flow meter 300 in the state of flow in the forward direction when the measurement target gas 30 is in the pulsing motion state. Thereafter, between the time t1 and the time t2, the measurement target gas 30 is in the backward flow state, the vortexes 4242 move in the upstream direction with the measurement target gas 30 flowing backward. If the vortex inflow suppression unit 4214 is not provided in the structure as shown in FIG. 10 and there is an opening formed in place of the vortex inflow suppression unit 4214, then the vortexes 4242 in the backward flow state of the measurement target gas 30 enter into the opening provided at the position of the vortex inflow suppression unit 4214 instead of the vortex inflow suppression unit 4214, and the vortexes 4242 flow backward through the outlet port-side bypass passage 4234, and the vortexes 4242 reach the measurement surface 430 shown in FIG. 5(B). At this occasion, the heat transfer surface exposing portion 436 is affected by the vortexes 4242, and a higher level of backward flow than the waveform 4913 indicating the change of the flow rate of the measurement target gas 30 is detected, and the change occurs as shown by the waveform 4916. Therefore, as compared with the optimum value C as shown in FIG. 11, the average value decreases, and the flow rate cannot be detected correctly (pulsing motion error A).

Figure 11:
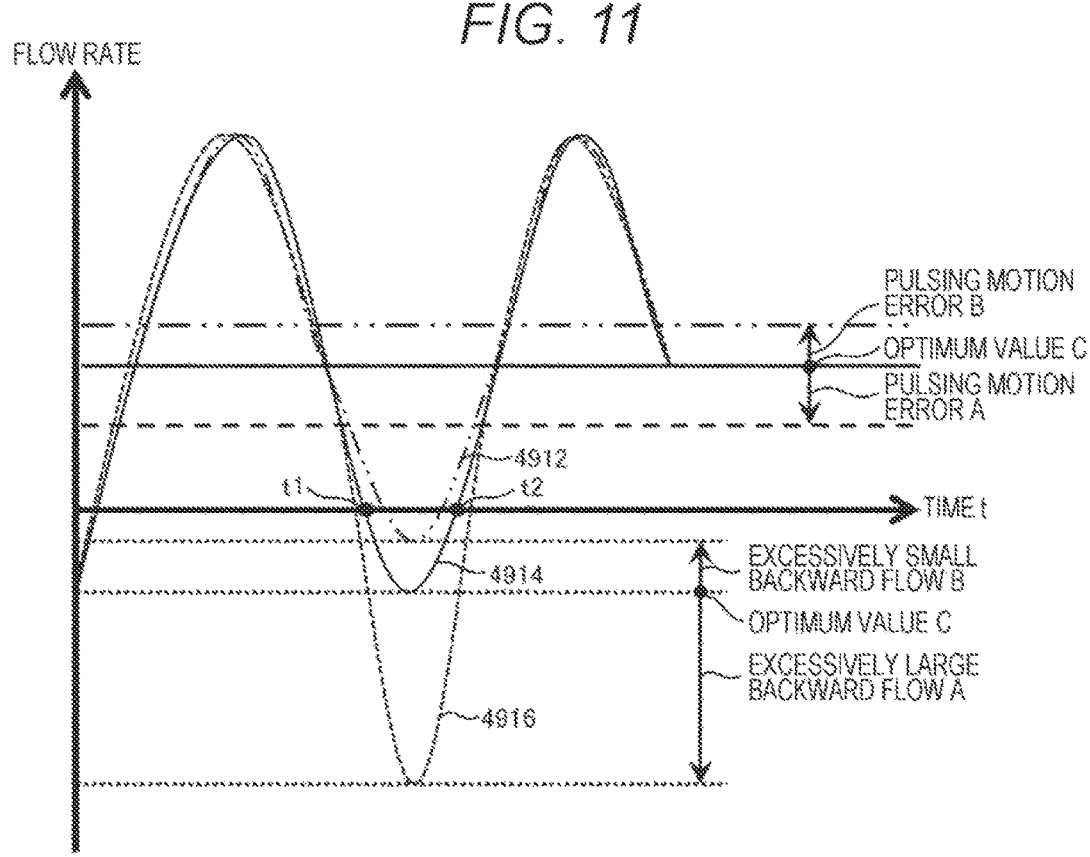
FIG. 11 is an explanatory diagram for explaining a flow rate measurement error that occurs in the backward flow state of the measurement target gas.

On the other hand, if the outlet port opening 4222 formed to be open at the downstream side is not provided in order to prevent the vortexes 4242 from entering and only the outlet port opening 4226 formed to be open in the flow direction of the measurement target gas 30 of the main passage 124 is provided, then, an output as shown in the waveform 4912 of FIG. 11 is obtained, and the measured backward flow rate is a value less than the actual flow rate. This is because when only the outlet port opening 4226 formed to be open in the direction crossing the flow of the measurement target gas 30 of the main passage 124 is provided, the dynamic pressure of the measurement target gas 30 flowing backward does not occur, and therefore, this reduces the measurement target gas 30 guided into the bypass passage during the backward flow occurring between the time t1 and the time t2, and accordingly, the flow velocity becomes slower at the flow rate measurement passage unit.

Therefore, while the backflow between t1 and t2 occurs, the flow velocity of the measurement target gas 30 at the flow rate measurement passage unit corresponding to the waveform 4912 is less than the flow velocity of the measurement target gas 30 at the flow rate measurement passage unit corresponding to the waveform 4914, and this causes the pulsing motion error.

Preferably, the dynamic pressure of the measurement target gas 30 flowing backward in the main passage 124 is configured to be taken in through the outlet port opening. The outlet port opening 4222 can retrieve the backward flow 3030 of the measurement target gas 30 which is the flow of the measurement target gas 30 flowing backward. However, the backward flow 3030 of the measurement target gas 30 involves the vortexes 4242, and the vortexes 4242 as well as the backward flow 3030 of the measurement target gas 30 are retrieved through the outlet port opening 4222. The backward flow 3030 retrieved together with the vortexes 4242 through the outlet port opening 4222 is blocked by the wall 3044, and the course thereof is changed. The course of the retrieved backward flow 3030 is changed by the wall 3044, and the retrieved vortexes 4242 are attenuated or eliminated, so that this reduces the adverse effect of the vortex is reduced.

In the structure of FIG. 10, the flow axis 4235 which is the axis of the flow of the outlet port-side bypass passage 4234 is blocked by the vortex inflow suppression unit 4214, so that the vortexes 4242 retrieved from the outlet port opening are prevented from directly entering into the outlet port-side bypass passage 4234. On the other hand, such structure is provided that the outlet port side chamber 4216 is formed at the outlet port-side of the outlet port-side bypass passage 4234, and the dynamic pressure of the backward flow 3030 retrieved from the outlet port opening 4222 is applied to the inside of the outlet port side chamber 4216. Therefore, the backward flow 3030 of the measurement target gas 30 strongly enters into the outlet port side chamber 4216, and this can suppress the error caused by insufficient retrieval of the measurement target gas 30 flowing backward as indicated by the waveform 4912 in FIG. 11.

The vortexes 4242 enter into the outlet port side chamber 4216 from the outlet port opening 4222, but the vortexes 4242 having entered into the outlet port side chamber 4216 collides with the wall 3044 that acts as a guide for changing the course, so that the course of the backward flow 3030 is greatly changed, and the vortexes 4242 having entered thereinto are greatly attenuated. In this manner, the error as indicated by the waveform 4916 in FIG. 11 can also be reduced.

As explained above, according to the configuration of FIG. 10, the two causes of the error can be solved, and the measurement accuracy is greatly improved. In this embodiment, the wall 3044 acting as the guide is provided on the rear cover 304. Instead of the wall 3044 provided on the rear cover 304, the wall 4217 of the inlet port-side bypass passage 4232 may be used. The wall 4211 of the inlet port-side bypass passage 4232 has a role of dividing the inlet port-side bypass passage 4232 and the outlet port-side bypass passage 4234.

Further, the outlet port opening 4226 is to reduce the fluid resistance of the measurement target gas 30 entering into and coming out of the outlet port-side bypass passage 4234.

5. Fixation of Circuit Package 400 with Housing 302

5.1 Fixation of Circuit Package 400 with Housing 302

A fixation structure for fixing the circuit package 400 with the housing 302 will be explained with reference to FIG. 5(A), 5(B), 6(A), or 6(B). The circuit package 400 having the flow rate measurement circuit 601 (refer to FIG. 20) for measuring the flow rate of the measurement target gas 30 flowing in the main passage 124 is fixed to the housing 302 having a bypass passage trench. In this embodiment, the flange 312 and the bypass passage trenches 332, 334 are connected by the upstream-side outer wall 335 and the downstream-side outer wall 336, and the portions for forming the bypass passage trench 332 and the bypass passage trench 334 are supported by the flange 312 with the upstream-side outer wall 335 and the downstream-side outer wall 336 interposed therebetween. It should be noted that the upstream-side outer wall 335 is located at the upstream side in the flow of the measurement target gas 30 flowing in the main passage 124, and the downstream-side outer wall 336 is located at the downstream side thereof. The fixing portion 3721 is provided to connect the upstream-side outer wall 335 and the downstream-side outer wall 336, and the fixing portion 3721 wraps the entire circumference of the circuit package 400, so that the circuit package 400 is fixed to the housing 302. Further, at the flange side of the fixing portion 3721, a gap 382 encircled by the upstream-side outer wall 335, the downstream-side outer wall 336, and the flange 312 is formed. At the bypass passage side opposite to the flange side of the fixing portion 3721, the bypass passage trenches 332, 334 are formed. The bypass passage trenches 332, 334 have such structure that the measurement target gas 30 flows therein. The fixing portion 3721 has a function of maintaining airtightness at the bypass passage side of the cavity portion.

By further using the outer wall hollow portion 366 provided in the upstream-side outer wall 335 as the fixing portion 3723, the circuit package 400 can be fixed more rigidly. In this embodiment, the fixing portion 3721 explained above embraces the circuit package 400 in a direction along the flow axis of the measurement target gas 30, i.e., a direction along the longitudinal axis of the measurement surface 430, so as to connect the upstream-side outer wall 335 and the downstream-side outer wall 336. On the other hand, the outer wall hollow portion 366 of the upstream-side outer wall 335 embraces the circuit package 400 in a direction crossing the flow axis of the measurement target gas 30. More specifically, the fixing portion 3723 embraces the circuit package 400 in such a manner that the direction in which the circuit package 400 is embraced is different from the fixing portion 3721. The fixing portion 3723 and the fixing portion 3721 fixes and embraces the circuit package 400 in the directions different from each other, and the circuit package 400 can be fixed to the housing 302 more rigidly.

In this embodiment, the outer wall hollow portion 366 is constituted by a portion of the upstream-side outer wall 335, but instead of the upstream-side outer wall 335, the downstream-side outer wall 336 may be provided with a fixing portion for embracing the circuit package 400 in a direction different from the fixing portion 3721, as long as it is to increase the force of fixation. For example, the downstream-side outer wall 336 may embrace the end portion of the circuit package 400, or a depression depressed in the upstream direction may be formed on the downstream-side outer wall 336, or a protrusion protruding in the upstream direction may be provided on the downstream-side outer wall 336, and the circuit package 400 may be embraced by this protrusion. In this embodiment, the reason why the outer wall hollow portion 366 is provided on the upstream-side outer wall 335 to embrace the circuit package 400 is to provide not only the fixation of the circuit package 400 but also the effect of increasing the thermal resistance between the temperature detecting portion 452 and the upstream-side outer wall 335. The base of the protrusion 424 (refer to FIGS. 12(A) to 12(C)) of the circuit package 400 having the temperature detecting portion 452 is embraced and supported by the outer wall hollow portion 366, and therefore, this also provides protection for the protrusion 424 (refer to FIGS. 12(A) to 12(C)) having the temperature detecting portion 452.

The fixing portion 3721 and the fixing portion 3723 have thick portions and thin portions in order to alleviate the stress applied to the circuit package 400. As shown in FIGS. 5(A) and 5(B), the fixing portion 3721 includes a thick portion 4714 and a thin portion 4710. In the thin portion 4710, a depression in the direction of the circuit package 400 is provided, so that the thickness of the resin embracing the circuit package 400 is formed to be thin, and thus the thin portion 4710 is formed. Further, a thin portion is formed at the flange side of the thin portion 4710, but this thin portion disposed at the flange side of the thin portion 4710 is formed so that the resin thickness embracing the circuit package 400 has a thinner shape than the thick portion 4714, but the resin thickness embracing the circuit package 400 is formed to be slightly thicker than the thin portion 4710. As described above, with respect to the thick portion 4714, the thin portion 4710 and the thin portion at the flange side thereof are provided, and this has the effect of ensuring a predetermined size of area for allowing the fixing portion 3721 to embrace the circuit package 400 and still reducing the stress applied to the circuit package 400 by the fixing portion 3721 with respect to the size of area thereof.

In FIG. 6(B) which is the rear side of FIG. 5(B), the fixing portion 3721 has the thick portion 4714 and the thin portion made of the depression 373. The thin portion is thus provided, and therefore, this has the effect of ensuring a predetermined size of area for allowing the fixing portion 3721 to embrace the circuit package 400 and still reducing the stress applied to the circuit package 400 with respect to the size of area thereof. With such structure in which the fixing portion 3721 is constituted by the thick portion and the thin portion, the reliability for fixing the circuit package 400 is improved. More specifically, this maintains the airtightness between the circuit package 400 and the fixing portion 3721. In addition, this can reduce the stress applied from the fixing portion 3721 to the circuit package 400 caused by shrinking of the volume when the fixing portion 3721 is cooled to be solidified in the resin molding process.

Since the thin portion is provided, the movement of the resin in the resin molding process is suppressed, and the temperature reduction of the resin becomes gentle, so that it takes a longer time for the resin to be cured. The resin of the fixing portion 3721 can easily flow into the unevennesses on the front surface of the circuit package 400, which has an effect of increasing the airtightness between the circuit package 400 and the fixing portion 3721.

At the bypass passage side of the fixing portion 3721, the measurement target gas 30 flows, and when the airtightness between the circuit package 400 and the fixing portion 3721 is lost, water content may penetrate into the gap 382 inside of the housing 302. Since the thin portion is provided, the size of area of contact between the resin of the circuit package 400 and the fixing portion 3721 can be increased, which has an effect of improving the airtightness and preventing water content and the like from penetrating into the gap 382 inside the housing 302.

In FIG. 5(B) and FIG. 6(B), the upstream-side outer wall 335 has the outer wall hollow portion 366. The outer wall hollow portion 366 acts as the fixing portion 3723 for fixing the circuit package 400 to the housing 302. The fixing portion 3723 includes a thick portion 4715 and a thin portion 4716. Like the fixing portion 3721, the fixing portion 3723 can ensure a large size of contact area with the circuit package 400. In addition, the thin portion 4716 applies less stress to the circuit package 400, and therefore, this can reduce the effect of the stress given by the fixing portion 3723 to the circuit package 400. At the upstream side of the fixing portion 3723, the measurement target gas 30 flows, and it is important to maintain the airtightness between the fixing portion 3723 and the circuit package 400, and the airtightness between the fixing portion 3723 and the circuit package 400 can be easily maintained by the thin portion 4716 and the thick portion 4715.

5.2 Structure of Housing 302 Formed by Resin Molding

Subsequently, the fixing of the circuit package 400 to the housing 302 through resin molding process will be explained with reference to FIG. 5(A), 5(B), 6(A), or 6(B) again. The circuit package 400 is arranged and fixed in the housing 302, so that the measurement surface 430 formed on the front surface of the circuit package 400 is arranged at a predetermined location of the bypass passage trench for forming the bypass passage, for example, at a connection portion of the bypass passage trench on frontside 332 and the bypass passage trench on backside 334 in the embodiment as shown in FIG. 5(A), 5(B), 6(A), or 6(B). A portion where the circuit package 400 is fixed and embedded in the housing 302 through resin mold is arranged slightly at the side of the flange 312 with respect to the bypass passage trench. The circuit package 400 is made by the first resin molding process, which will be explained later with reference to FIG. 17. With the circuit package 400 made by the first resin molding process, the fixing portion 3721 is formed when the housing 302 having the bypass passage is formed by the second resin molding process, and the fixing portion 3721 holds and fixes the circuit package 400 so as to cover the external periphery of the circuit package 400 formed by the first resin molding process.

As shown in FIG. 5(B), on the front side surface of the fixing portion 3721, the depression 376 and the thin portion 4710 in the depressed shape are provided. As shown in FIG. 6(B), on the rear side surface of the fixing portion 3721, the depression 373 acting as the thin portion is formed. With these depressions, the temperature of the resin is cooled when the fixing portion 3721 is formed, and the amount of shrinkage of the volume can be reduced. Therefore, the stress applied to the circuit package 400 can be reduced. By further limiting the flow of resin using the die for forming the depression as explained above, the speed of reduction of the resin temperature is alleviated, so that the resin constituting the fixing portion 3721 can easily get into the depth of the unevennesses provided on the front surface of the circuit package 400.

The entire surface of the circuit package 400 is not covered by a resin used to form the housing 302, but a portion where the outer wall of the circuit package 400 is exposed is provided in the flange 312 side of the fixing portion 3721. In the embodiment of FIGS. 5(A), 5(B), 6(A), and 6(B), the area of a portion exposed from the resin of the housing 302 but not enveloped by the housing 302 is larger than the area of a portion enveloped by the resin of the housing 302 out of the outer circumferential surface of the circuit package 400. Furthermore, a portion of the measurement surface 430 of the circuit package 400 is also exposed from the resin of the housing 302.

The depressions are formed on the front surface and the rear surface of the fixing portion 3721 covering the entire circumference of the outer wall of the circuit package 400 in a belt-like manner, this alleviates excessive concentration of stress caused by the shrinkage of the volume during the curing process of the fixing portion 3721 so as to embrace the circuit package 400 in the second resin molding process for forming the housing 302. The action of the excessive stress may also adversely affect the circuit package 400.

5.3 Improvement of Adherence Between Housing 302 and Circuit Package 400

In order to reduce the size of area in the portion of the external peripheral surface of the circuit package 400 that is embraced by the resin of the housing 302 and to fix the circuit package 400 more rigidly using a smaller size of area, it is desired to improve adherence to the outer wall of the circuit package 400 in the fixing portion 3721. When the thermoplastic resin is used for the purpose of forming the housing 302, the thermoplastic resin preferably get into small unevennesses on the front surface of the circuit package 400 while the viscosity of the thermoplastic resin is low, i.e., the temperature is high, and the thermoplastic resin preferably cures when the thermoplastic resin has penetrated into the small unevennesses on the front surface. In the resin molding process for forming the housing 302, the inlet port of the thermoplastic resin is preferably arranged on the fixing portion 3721 or in proximity thereto. As the temperature decreases, the viscosity of the thermoplastic resin increases, and the thermoplastic resin cures. Therefore, the thermoplastic resin in the high temperature state is poured into the fixing portion 3721 or from the vicinity thereof, so that the thermoplastic resin in the low viscosity state can be brought into close contact with the front surface of the circuit package 400, and can be cured. In the fixing portion 3721, the thin portion 4710 and the depression 373 which are the depression 376 and the depression are formed, and using the die for making these depressions, an obstacle portion for limiting the flow of the thermoplastic resin is formed to reduce the moving speed of the thermoplastic resin in the fixing portion 3721. Accordingly, the temperature reduction of the thermoplastic resin is suppressed, and the low viscosity state is extended, and this can improve the adherence between the circuit package 400 and the fixing portion 3721.

By roughening the front surface of the circuit package 400, the adherence between the circuit package 400 and the fixing portion 3721 can be improved. As a method of roughening the front surface of the circuit package 400, there is known a roughening method for forming fine unevennesses on the front surface of the circuit package 400, such as a satin-finish treatment, after forming the circuit package 400 through the first resin molding process. As the roughening method for forming fine unevennesses on the front surface of the circuit package 400, for example, the roughening may be achieved using sand blasting. Furthermore, the roughening may be achieved through a laser machining.

As another roughening method, an uneven sheet is attached on an inner surface of the die used in the first resin molding process, and the resin is pressed to the die having the sheet on the front surface. Even using this method, it is possible to form and roughen fine unevennesses on a front surface of the circuit package 400. Alternatively, unevennesses may be attached on an inner side of the die for forming the circuit package 400 to roughen the front surface of the circuit package 400. The front surface portion of the circuit package 400 for such roughening is at least a portion where the fixing portion 3721 is provided. In addition, the adherence is further strengthened by roughening a front surface portion of the circuit package 400 where the outer wall hollow portion 366 is provided.

When the unevenness machining is performed for the surface of the circuit package 400 using the aforementioned sheet, the depth of the trench depends on the thickness of the sheet. If the thickness of the sheet increases, the molding of the first resin molding process becomes difficult, so that the thickness of the sheet has a limitation. If the thickness of the sheet decreases, the depth of the unevenness provided on the sheet in advance has a limitation. For this reason, when the aforementioned sheet is used, it is preferable that the depth of the unevenness between the bottom and the top of the unevenness be set to 10 µm or larger and 20 µm or smaller. In the depth smaller than 10 µm, the adherence effect is degraded. The depth larger than 20 µm is difficult to obtain from the aforementioned thickness of the sheet.

In roughening methods other than the aforementioned method of using the sheet, it is preferable to set a thickness of the resin in the first resin molding process for forming the circuit package 400 to 2 mm or smaller. For this reason, it is difficult to increase the depth of the unevenness between the bottom and the top of the unevenness to 1 mm or larger. Conceptually, it is anticipated that adherence between the resin that covers the circuit package 400 and the resin used to form the housing 302 increases as the depth of the unevenness between the bottom and the top of the unevenness on the surface of the circuit package 400 increases. However, for the reason described above, the depth of the unevenness between the bottom and the top of the unevenness is preferably set to 1 mm or smaller. That is, if the unevenness having a thickness of 10 µm or larger and 1 mm or smaller is provided on the surface of the circuit package 400, it is preferable to increase adherence between the resin that covers the circuit package 400 and the resin used to form the housing 302.

A thermal expansion coefficient is different between the thermosetting resin used to form the circuit package 400 and the thermoplastic resin used to form the housing 302 having the fixing portion 3721. It is preferable to prevent an excessive stress generated from this difference of the thermal expansion coefficient from being applied to the circuit package 400. In addition, the thin portion 4710 and the depression 376 which are the depression 373 and the depression explained above are provided, so that the stress applied to the circuit package 400 can be alleviated.

By forming the fixing portion 3721 that envelops the outer circumference of the circuit package 400 in a band shape and narrowing the width of the band, it is possible to alleviate a stress caused by a difference of the thermal expansion coefficient applied to the circuit package 400. A width of the band of the fixing portion 3721 is set to 10 mm or smaller, and preferably 8 mm or smaller. In this embodiment, since the outer wall hollow portion 366 as a part of the upstream-side outer wall 335 of the housing 302 as well as the fixing portion 3721 envelops the circuit package 400 to fix the circuit package 400, it is possible to further reduce the width of the band of the fixing portion 3721. The circuit package 400 can be fixed, for example, if the width is set to 3 mm or larger.

In order to reduce a stress caused by the difference of the thermal expansion coefficient, a portion covered by the resin used to form the housing 302 and an exposed portion without covering are provided on the surface of the circuit package 400. A plurality of portions where the surface of the circuit package 400 is exposed from the resin of the housing 302 are provided, and one of them is to the measurement surface 430 having the heat transfer surface exposing portion 436 described above. In addition, a portion exposed to a part of the flange 312 side relative to the fixing portion 3721 is provided. Furthermore, the outer wall hollow portion 366 is formed to expose a portion of the upstream side relative to the outer wall hollow portion 366, and this exposed portion serves as a support portion that supports the temperature detecting portion 452. A gap is formed such that a portion of the outer surface of the circuit package 400 in the flange 312 side relative to the fixing portion 3721 surrounds the circuit package 400 across its outer circumference, particularly, the side facing the flange 312 from the downstream side of the circuit package 400 and further across the upstream side of the portion close to the terminal of the circuit package 400. Since the gap is formed around the portion where the surface of the circuit package 400 is exposed, it is possible to reduce the heat amount transferred to the circuit package 400 through the flange 312 from the main passage 124 and suppress degradation of measurement accuracy caused by the heat.

A gap is formed between the circuit package 400 and the flange 312, and this gap serves as a terminal connector 320. The connection terminal 412 of the circuit package 400 and the inner socket of external terminal 361 positioned in the housing 302 side of the external terminal 306 are electrically connected to each other using this terminal connector 320 through spot welding, laser welding, and the like. The gap of the terminal connector 320 can suppress heat transfer from the housing 302 to the circuit package 400 as described above and is provided a space that can be used to perform a connection work between the connection terminal 412 of the circuit package 400 and the inner socket of external terminal 361 of the external terminal 306.

5.4 Formation of Housing 302 Through Second Resin Molding Process and Improvement of Measurement Accuracy In the housing 302 illustrated in FIGS. 5(A), 5(B), 6(A), and 6(B) described above, the circuit package 400 having the air flow sensing portion 602 or the processing unit 604 is manufactured through the first resin molding process. Then, the housing 302 having, for example, the bypass passage trench on frontside 332 or the bypass passage trench on backside 334 for forming the bypass passage where the measurement target gas 30 flows are manufactured through the second resin molding process. Through this second resin molding process, the circuit package 400 is embedded into the resin of the housing 302 and is fixed to the inside of the housing 302 through resin molding. As a result, the air flow sensing portion 602 performs heat transfer with the measurement target gas 30, so that a configuration relationship such as a positional relationship or a directional relationship between the heat transfer surface exposing portion 436 for measuring the flow rate and the bypass passage including, for example, the bypass passage trench on frontside 332 or the bypass passage trench on backside 334 can be maintained with remarkably high degree of accuracy. In addition, it is possible to suppress an error or deviation generated in each circuit package 400 to a very small value. When the relationship between the circuit package 400 and the bypass passage for flowing the measurement target gas 30 is fixed in the second resin molding process, this relationship does not change thereafter. When an elastic adhesive agent is used for fixation as in the related art, the relationship therebetween slightly changes after the manufacturing. When the relationship between the circuit package 400 and the bypass passage for flowing the measurement target gas 30 does not change like this embodiment, and variation is corrected after the manufacturing, then an extremely high degree of accuracy can be maintained thereafter. As a result, it is possible to remarkably improve measurement accuracy of the circuit package 400. For example, compared to a conventional method in which fixation is performed using an adhesive, the measurement accuracy can be improved twice or more. The thermal flow meter 300 is often manufactured by mass production in many cases, and it is difficult to adhere with adhesive agent while performing strict measurement in each manufacturing process, and this imposes a limitation on the improvement of the measurement accuracy. However, if the circuit package 400 is manufactured through the first resin molding process as in this embodiment, and the bypass passage is then formed in the second resin molding process for forming the bypass passage where the measurement target gas 30 flows while the circuit package 400 and the bypass passage are fixed, it is possible to remarkably reduce a variation of the measurement accuracy and remarkably improve the measurement accuracy of each thermal flow meter 300. This similarly applies to not only the embodiment as shown in FIG. 5(A), 5(B), 6(A), or 6(B) but also the following embodiments such as the embodiment as shown in FIG. 7.

Further referring to the embodiment as shown in, for example, FIG. 5(A), 5(B), 6(A), or 6(B), it is possible to fix the circuit package 400 to the housing 302 such that a relationship between the bypass passage trench on frontside 332, the bypass passage trench on backside 334, and the heat transfer surface exposing portion 436 is set to a specific relationship. As a result, in each of the thermal flow meters 300 produced in large quantities, a positional relationship or a configuration relationship between the heat transfer surface exposing portion 436 of each circuit package 400 and the bypass passage can be maintained with remarkably high degree of accuracy. Since the bypass passage trench where the heat transfer surface exposing portion 436 of the circuit package 400 is fixed, for example, the bypass passage trench on frontside 332 and the bypass passage trench on backside 334 can be formed with remarkably high degree of accuracy, a work of forming the bypass passage in this bypass passage trench is a work for covering both sides of the housing 302 using the front or rear cover 303 or 304. This work is very simple and is a work process having a few factors of degrading the measurement accuracy. In addition, the front or rear cover 303 or 304 is produced through a resin molding process having high formation accuracy. Therefore, it is possible to form the bypass passage provided in a specific relationship with the heat transfer surface exposing portion 436 of the circuit package 400 with a high degree of accuracy. According to such method, it is possible to obtain high productivity in addition to improvement of measurement accuracy.

In comparison, in the related art, the thermal flow meter was produced by fabricating the bypass passage and then bonding the measuring portion for measuring the flow rate to the bypass passage using an adhesive. Such a method of using an adhesive is disadvantageous because a thickness of the adhesive is irregular, and a position or angle of the adhesive is different in each product. For this reason, there was a limitation in improvement of the measurement accuracy. If this work is performed in mass production, it is further difficult to improve the measurement accuracy.

In the embodiment according to the invention, first, the circuit package 400 having the air flow sensing portion 602 is produced through a first resin molding process, and the circuit package 400 is then fixed through resin molding while the bypass passage trench for forming the bypass passage through resin molding is formed through a second resin molding process. As a result, it is possible to form the shape of the bypass passage trench and fix the air flow sensing portion 602 (refer to FIG. 20) of the flow rate measurement circuit 601 to the bypass passage trench with significantly high degree of accuracy.

A portion relating to the measurement of the flow rate, such as the heat transfer surface exposing portion 436 of the air flow sensing portion 602 or the measurement surface 430 installed in the heat transfer surface exposing portion 436, is formed on the surface of the circuit package 400. Then, the measurement surface 430 and the heat transfer surface exposing portion 436 are exposed from the resin used to form the housing 302. That is, the heat transfer surface exposing portion 436 and the measurement surface 430 around the heat transfer surface exposing portion 436 are not covered by the resin used to form the housing 302. The measurement surface 430 formed through the resin molding of the circuit package 400, the heat transfer surface exposing portion 436 is directly used even after the resin molding of the housing 302 to measure a flow rate of the thermal flow meter 300 or a temperature. As a result, the measurement accuracy is improved.

In the embodiment according to the invention, the circuit package 400 is integratedly formed with the housing 302 to fix the circuit package 400 to the housing 302 having the bypass passage. Therefore, it is possible to fix the circuit package 400 to the housing 302 with a small fixation area. That is, it is possible to increase the surface area of the circuit package 400 that does not make contact with the housing 302. The surface of the circuit package 400 that does not make contact with the housing 302 is exposed to, for example, a gap. The heat of the intake pipe is transferred to the housing 302 and is then transferred from the housing 302 to the circuit package 400. Even if the contact area between the housing 302 and the circuit package 400 is reduced instead of enveloping the entire surface or most of the surface of the circuit package 400 with the housing 302, it is possible to maintain high reliability with a high degree of accuracy and fix the circuit package 400 to the housing 302. For this reason, it is possible to suppress heat transfer from the housing 302 to the circuit package 400 and suppress a decrease of the measurement accuracy because of the heat transfer.

In the embodiment illustrated in FIG. 5(A), 5(B), 6(A), or 6(B), the area A of the exposed surface of the circuit package 400 can be set to be equal to or larger than the area B covered by a molding material used to form the housing 302. In the embodiment, the area A is larger than the area B. As a result, it is possible to suppress heat transfer from the housing 302 to the circuit package 400. In addition, it is possible to reduce a stress generated by a difference between a thermal expansion coefficient of the thermosetting resin used to form the circuit package 400 and a thermal expansion coefficient of the thermoplastic resin used to form the housing 302.

5.5 Fixation of Circuit Package 400 Through Second Resin Molding Process and Effects Based Thereon It is noted that the hatching portion in FIGS. 12(A) to 12(C) indicates a fixation surface 432 and a fixation surface 434 for covering the circuit package 400 using the thermoplastic resin used in the second resin molding process to fix the circuit package 400 to the housing 302 in the second resin molding process. As described above in relation to FIG. 5(A), 5(B), 6(A), or 6(B), it is important to maintain high degree of accuracy to provide a specific relationship between the measurement surface 430, the heat transfer surface exposing portion 436 provided in the measurement surface 430, and the shape of the bypass passage. In the second resin molding process, the bypass passage is formed, and the circuit package 400 is fixed to the housing 302 that forms the bypass passage. Therefore, it is possible to maintain a relationship between the bypass passage, the measurement surface 430, and the heat transfer surface exposing portion 436 with significantly high degree of accuracy. That is, since the circuit package 400 is fixed to the housing 302 in the second resin molding process, it is possible to position and fix the circuit package 400 into the die used to form the housing 302 having the bypass passage with a high degree of accuracy. By injecting a thermoplastic resin having a high temperature into this die, the bypass passage is formed with a high degree of accuracy, and the circuit package 400 is fixed with the fixing portion 3721 and the fixing portion 3723 with a high degree of accuracy.

In this embodiment, the entire surface of the circuit package 400 is not a fixation surface 432 covered by the resin used to form the housing 302, but the front surface is exposed to the connection terminal 412 side of the circuit package 400. That is, a portion not covered by the resin used to form the housing 302 is provided. In the embodiment illustrated in FIGS. 12(A) to 12(C), out of the front surface of the circuit package 400, the area that is not enveloped by the resin used to form the housing 302 but is exposed from the resin used to form the housing 302 is larger than the area of the fixation surface 432 and the fixation surface 434 enveloped by the resin used to form the housing 302.

A thermal expansion coefficient is different between the thermosetting resin used to form the circuit package 400 and the thermoplastic resin used to form the housing 302 having the fixing portion 3721. It is preferable to prevent a stress caused by this difference of the thermal expansion coefficient from being applied to the circuit package 400 as long as possible. By reducing the front surface of the circuit package 400 and the fixation surface 432, it is possible to reduce influence based on the difference of the thermal expansion coefficient. For example, it is possible to reduce the fixation surface 432 on the front surface of the circuit package 400 by providing a band shape having a width L. As described above, the thick portion and the thin portion are provided on the fixing portion 3721 and the fixing portion 3723 covering the fixation surface 432, so that this can suppress stress exerted on the front surface of the circuit package 400 on the basis of this portion, and can alleviate a large stress applied to the circuit package 400. Even if the fixation surface 432 is configured to be relatively wider, and the airtightness between the fixing portion 3723 and the fixation surface 432 of the circuit package 400 is enhanced, the effect of the stress to the circuit package 400 can be reduced by suppressing the stress because of this portion. The circuit package 400 includes a flow rate measurement circuit 601, when a large stress is applied to the circuit package 400, the flow rate measurement circuit 601 is adversely affected, and there may be a failure in the operation itself depending on the reduction of the measurement accuracy of the flow rate. Such effects can be alleviated.

It is possible to increase a mechanical strength of the protrusion 424 by providing the fixation surface 432 in the base of the protrusion 424. It is possible to more robustly fix the circuit package 400 and the housing 302 to each other by providing, on the front surface of the circuit package 400, a band-shaped fixation surface along a flow axis of the measurement target gas 30 and a fixation surface across the flow axis of the measurement target gas 30. On the fixation surface 432, a portion surrounding the circuit package 400 in a band shape having a width L along the measurement surface 430 is the fixation surface along the flow axis of the measurement target gas 30 described above, and a portion that covers the base of the protrusion 424 is the fixation surface across the flow axis of the measurement target gas 30. These both of the fixation surfaces embraced by the fixing portion 3721 or the fixing portion 3723 having the thick portion and the thin portion and fixed to the housing 302.

In FIGS. 12(A) to 12(C), the circuit package 400 is made by the first resin molding process as explained above. The hatching portion in the appearance of the circuit package 400 indicates a fixation surface 432 and a fixation surface 434 where the circuit package 400 is covered by the resin used in the second resin molding process when the housing 302 is formed through the second resin molding process after the circuit package 400 is manufactured through the first resin molding process. FIG. 12(A) is a left side view illustrating the circuit package 400, FIG. 12(B) is a front view illustrating the circuit package 400, and the FIG. 12(C) is a rear view illustrating the circuit package 400. The circuit package 400 is embedded with the air flow sensing portion 602 or the processing unit 604 described below, and they are integratedly molded using a thermosetting resin. On the front surface of the circuit package 400 of FIG. 12(B), the measurement surface 430 serving as a plane for flowing the measurement target gas 30 is formed in a shape extending in a flow direction of the measurement target gas 30. In this embodiment, the measurement surface 430 has a rectangular shape extending in the flow direction of the measurement target gas 30. The measurement surface 430 is formed to be thinner than other portions as illustrated in FIG. 12(A), and a part thereof is provided with the heat transfer surface exposing portion 436. The embedded air flow sensing portion 602 performs heat transfer to the measurement target gas 30 through the heat transfer surface exposing portion 436 to measure a condition of the measurement target gas 30 such as a flow velocity of the measurement target gas 30 and output an electric signal representing the flow rate of the main passage 124.

In order to measure a condition of the measurement target gas 30 with a high degree of accuracy using the embedded air flow sensing portion 602 (refer to FIGS. 20 and 21), the gas flowing through the vicinity of the heat transfer surface exposing portion 436 preferably makes a laminar flow having a little vortex. For this reason, it is preferable that there be no height difference between the flow path side surface of the heat transfer surface exposing portion 436 and the plane of the measurement surface 430 that guides the gas. In this configuration, it is possible to suppress an irregular stress or a distortion from being applied to the air flow sensing portion 602 while maintaining high flow rate measurement accuracy. It is noted that the aforementioned height difference may be provided if it does not affect the flow rate measurement accuracy.

On the rear surface of the measurement surface 430 of the heat transfer surface exposing portion 436, a press imprint 442 of the die that supports an internal substrate or plate during the resin molding of the circuit package 400 remains as illustrated in FIG. 12(C). The heat transfer surface exposing portion 436 is used to perform heat exchange with the measurement target gas 30. In order to accurately measure a condition of the measurement target gas 30, it is preferable to appropriately perform heat transfer between the air flow sensing portion 602 and the measurement target gas 30. For this reason, it is necessary to avoid a part of the heat transfer surface exposing portion 436 from being covered by the resin in the first resin molding process. Dies are installed in both the heat transfer surface exposing portion 436 and the backside of measurement surface 431 as a rear surface thereof, and an inflow of the resin to the heat transfer surface exposing portion 436 is prevented using this die. A press imprint 442 having a concave shape is formed on the rear surface of the heat transfer surface exposing portion 436. In this portion, it is preferable to arrange a device serving as the air flow sensing portion 602 or the like in the vicinity to discharge the heat generated from the device to the outside as much as possible. The formed concave portion is less influenced by the resin and achieves the effect of easily discharging heat.

A semiconductor diaphragm constituting the air flow sensing portion 602 is provided in the heat transfer surface exposing portion 436, and a cavity portion is formed in the rear surface of the semiconductor diaphragm. When the cavity portion is sealed, the pressure inside the cavity portion changes because of the change in the temperature, so that the semiconductor diaphragm is deformed, and this reduces the measurement accuracy. For this reason, in this embodiment, an opening 438 communicating with the gap of the rear surface of the semiconductor diaphragm is provided on the front surface of the circuit package 400, and a link channel for linking the gap of the rear surface of the semiconductor diaphragm and the opening 438 is provided inside the circuit package 400. It is noted that the opening 438 is provided in the portion not hatched in FIGS. 12(A) to 12(C) in order to prevent the opening 438 from being covered by the resin through the second resin molding process.

The opening 438 is formed through the first resin molding process. An inflow of the resin to the portion of the opening 438 is suppressed by matching dies to both a portion of the opening 438 and a rear surface thereof and pressing the dies, so that the opening 438 is formed. Formation of the opening 438 and the link channel that connects the gap on the rear surface of the semiconductor diaphragm and the opening 438 will be described below.

In the circuit package 400, the press imprint 442 remains on the rear surface of the circuit package 400 where the heat transfer surface exposing portion 436 is formed. In the first resin molding process, in order to prevent an inflow of the resin to the heat transfer surface exposing portion 436, a die such as an insertion die is installed in a portion of the heat transfer surface exposing portion 436, and a die is installed in a portion of the press imprint 442 opposite thereto, so that an inflow of the resin to the heat transfer surface exposing portion 436 is suppressed. By forming a portion of the heat transfer surface exposing portion 436 in this manner, it is possible to measure the flow rate of the measurement target gas 30 with significantly high degree of accuracy. In the portion of the press imprint 442, there is no resin or hardly any resin in the second resin molding process, and therefore, the heat radiation effect is high. When a lead is used as a second plate 536, there is an effect of radiating heat generation of the adjacent circuit via the lead.

Figure 13:
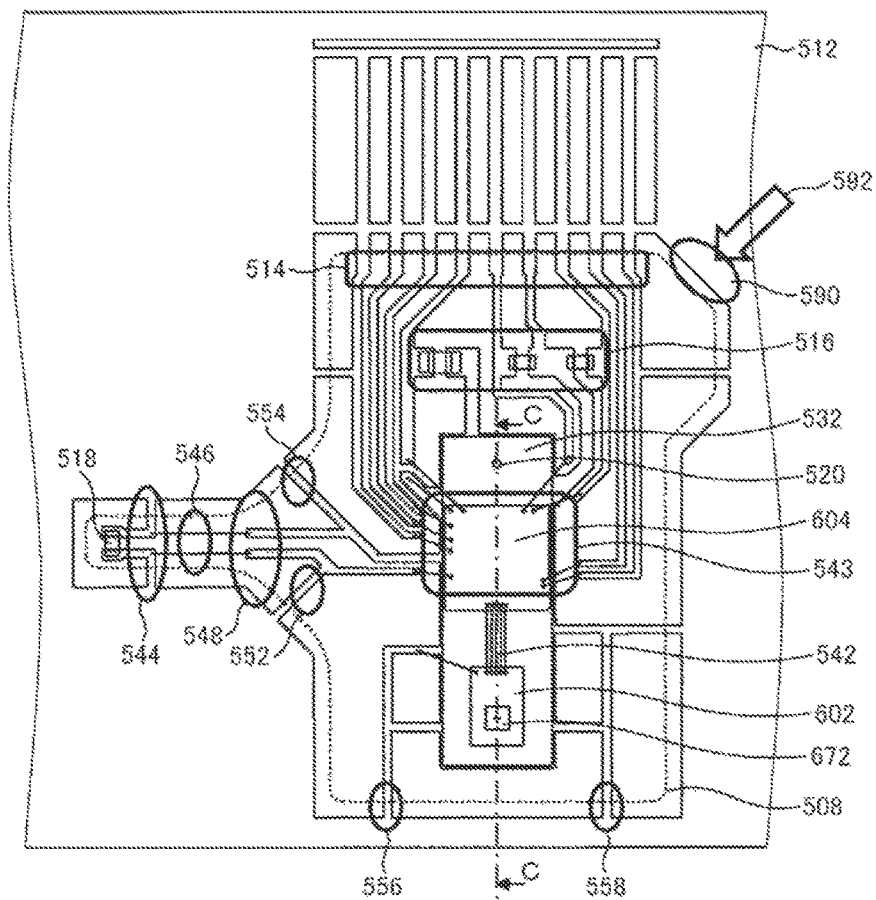
FIG. 13 is a diagram illustrating a state that circuit components are mounted on a frame of the circuit package.

6. Mounting of Circuit Components to Circuit Package 6.1 Frame of Circuit Package and Mounting of Circuit Components FIG. 13 illustrates a frame 512 of the circuit package 400 and a mounting state of a chip as a circuit component 516 mounted on the frame 512. It is noted that the dotted line 508 indicates a portion covered by the die used to mold the circuit package 400. A lead 514 is mechanically connected to the frame 512, and a plate 532 is mounted in the center of the frame 512. A chip-like air flow sensing portion 602 and a processing unit 604 as a larger scale integrated (LSI) circuit are mounted on the plate 532. A diaphragm 672 is provided in the air flow sensing portion 602, and each terminal of the air flow sensing portion 602 described below and the processing unit 604 are connected using a wire 542. Moreover, each terminal of the processing unit 604 and a corresponding lead 514 are connected using a wire 543. In addition, the lead 514 positioned between a portion corresponding to the connection terminal of the circuit package 400 and the plate 532 is connected to the chip-like circuit component 516 therebetween.

The air flow sensing portion 602 having the diaphragm 672 is arranged in the most leading end side when the circuit package 400 is obtained in this manner. The processing unit 604 is arranged in the side corresponding to the connection terminal for the air flow sensing portion 602 in an LSI state. In addition, a connection wire 543 is arranged in the terminal side of the processing unit 604. By sequentially arranging the air flow sensing portion 602, the processing unit 604, the wire 543, the circuit component 516, and the connection lead 514 in this order from the leading end side of the circuit package 400 to the connection terminal, the entire circuit package 400 becomes simple and concise.

A thick lead is provided to support the plate 532, and this lead is fixed to the frame 512 using the lead 556 or 558. It is noted that a lead surface having the same area as that of the plate 532 connected to the thick lead is provided on the lower surface of the plate 532, and the plate 532 is mounted on the lead surface. This lead surface is grounded. As a result, it is possible to suppress noise by commonly grounding the circuit of the air flow sensing portion 602 or the processing unit 604 using the lead surface, so that measurement accuracy of the measurement target gas 30 is improved. In addition, a lead 544 is provided in the upstream side of the flow path from the plate 532, that is, so as to protrude along an axis directed across the axis of the air flow sensing portion 602, the processing unit 604, or the circuit component 516 described above. A temperature detection element 518, for example, a chip-like thermistor is connected to this lead 544. In addition, a lead 548 is provided in the vicinity of the processing unit 604 which is a base of the protrusion, and the leads 544 and 548 are electrically connected using a thin connection line 546. As the leads 548 and 544 are directly connected, the heat is transferred to the temperature detection element 518 through the leads 548 and 544, so that it may be difficult to accurately measure a temperature of the measurement target gas 30. For this reason, by connecting a wire having a small cross-sectional area and a large thermal resistance, it is possible to increase a thermal resistance between the leads 548 and 544. As a result, it is possible to improve temperature measurement accuracy of the measurement target gas 30 so as to prevent influence of the heat from reaching the temperature detection element 518.

The lead 548 is fixed to the frame 512 through the lead 552 or 554. A connection portion between the lead 552 or 554 and the frame 512 is fixed to the frame 512 while it is inclined against the protruding direction of the protruding temperature detection element 518, and the die is also inclined in this area. As the molding resin flows along in this inclination in the first resin molding process, the molding resin of the first resin molding process smoothly flows to the leading end portion where the temperature detection element 518 is provided, so that reliability is improved.

In FIG. 13, an arrow 592 indicates a resin injection direction. The lead frame where a circuit component is mounted is covered by the die, and a pressure hole 590 for resin injection to the die is provided in a circled position, so that a thermosetting resin is injected into the die along the direction of the arrow 592. The circuit component 516 or the temperature detection element 518 and the lead 544 for holding the temperature detection element 518 are provided along the direction of the arrow 592 from the pressure hole 590. In addition, the plate 532, the processing unit 604, and the air flow sensing portion 602 are arranged in a direction close to the arrow 592. In this arrangement, the resin smoothly flows in the first resin molding process. In the first resin molding process, a thermosetting resin is used, so that it is important to widen the resin before solidification. For this reason, arrangement of a circuit component of the lead 514 or a wire and a relationship between the pressure hole 590 and the injection direction become important.

Figure 14:
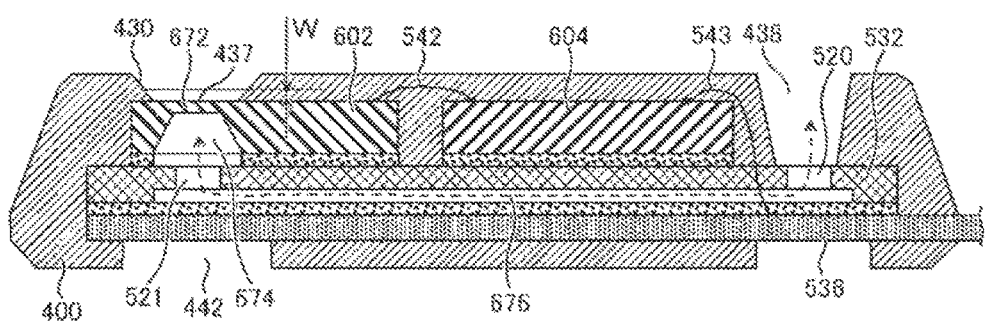
FIG. 14 is an explanatory diagram illustrating a diaphragm and a link channel that connects an opening and a gap inside the diaphragm.

6.2 Structure for Connecting Gap on Rear Surface of Diaphragm and Opening and Effects Based Thereon FIG. 14 is a diagram illustrating a part of the cross section taken along a line C-C of FIG. 13 and is an explanatory diagram for describing a communication hole 676 that connects a gap 674 provided inside the diaphragm 672 and the air flow sensing portion (flow rate detecting element) 602 and the hole 520. As described below, the air flow sensing portion 602 for measuring the flow rate of the measurement target gas 30 is provided with a diaphragm 672, and a gap 674 is provided on the rear surface of the diaphragm 672. Although not illustrated, the diaphragm 672 is provided with an element for exchanging heat with the measurement target gas 30 and measuring the flow rate thereby. If the heat is transferred to the elements formed in the diaphragm 672 through the diaphragm 672 separately from the heat exchange with the measurement target gas 30, it is difficult to accurately measure the flow rate. For this reason, it is necessary to increase a thermal resistance of the diaphragm 672 and form the diaphragm 672 as thin as possible.

The air flow sensing portion (flow rate detection element) 602 is embedded in the thermosetting resin of the circuit package 400 formed through the first resin molding process such that the heat transfer surface 437 of the diaphragm 672 is exposed. The front surface of the diaphragm 672 is provided with the elements (not illustrated), and the elements perform heat transfer with the measurement target gas 30 (not illustrated) through the heat transfer surface 437 on the front surface of the elements in the heat transfer surface exposing portion 436 corresponding to the diaphragm 672. The heat transfer surface 437 may be provided on the front surface of each element or may be provided with a thin protection film thereon. It is preferable that heat transfer between the elements and the measurement target gas 30 be smoothly performed, and direct heat transfers between the elements should be reduced as much as possible.

A portion of the air flow sensing portion (flow rate detection element) 602 where the elements are provided is arranged in the heat transfer surface exposing portion 436 of the measurement surface 430, and the heat transfer surface 437 is exposed from the resin used to form the measurement surface 430. The outer circumference of the air flow sensing portion (flow rate detection element) 602 is covered by the thermosetting resin used in the first resin molding process for forming the measurement surface 430. If only the side face of the air flow sensing portion (flow rate detection element) 602 is covered by the thermosetting resin, and the surface side of the outer circumference of the air flow sensing portion (flow rate detection element) 602 is not covered by the thermosetting resin, a stress generated in the resin used to form the measurement surface 430 is received only by the side face of the diaphragm 672, so that a distortion may generated in the diaphragm 672, and characteristics may be deteriorated. The distortion of the diaphragm 672 is reduced by covering the outer circumference portion of the air flow sensing portion (flow rate detection element) 602 with the thermosetting resin as illustrated in FIG. 14. Meanwhile, if a height difference between the heat transfer surface 437 and the measurement surface 430 where the measurement target gas 30 flows is large, the flow of the measurement target gas 30 is disturbed, so that measurement accuracy is degraded. Therefore, it is preferable that a height difference W between the heat transfer surface 437 and the measurement surface 430 where the measurement target gas 30 flows be small.

The diaphragm 672 is formed very thin in order to suppress heat transfer between each element, and a gap 674 is formed in the rear surface of the air flow sensing portion (flow rate detection element) 602. If this gap 674 is sealed, a pressure of the gap 674 formed on the rear surface of the diaphragm 672 changes depending on a temperature change. As a pressure difference between the gap 674 and the surface of the diaphragm 672 increases, the diaphragm 672 receives the pressure, and a distortion is generated, so that high degree of accuracy measurement becomes difficult. For this reason, a hole 520 connected to the opening 438 (FIGS. 12(A) to 12(C) and 16(A) and 16(B)) opened to the outside is provided in the plate 532, and a communication hole 676 that connects this hole 520 and the gap 674 is provided. This communication hole 676 consists of, for example, a pair of plates including a first plate 534 and a second plate 536. The first plate 534 is provided with a hole 520 and a hole 521 and a trench for forming the communication hole 676. The communication hole 676 is formed by covering the trench and the holes 520 and 521 with the second plate 536. Using the communication hole 676 and the hole 520, the pressures applied to the front and rear surfaces of the diaphragm 672 becomes approximately equal, so that the measurement accuracy is improved.

As described above, the communication hole 676 can be formed by covering the trench and the holes 520 and 521 with the second plate 536. Alternatively, the lead frame may be used as second plate 536. As described in relation to FIG. 13, the diaphragm 672 and the LSI circuit serving as the processing unit 604 are provided on the plate 532. A lead frame for supporting the plate 532 where the diaphragm 672 and the processing unit 604 are mounted is provided thereunder. Therefore, using the lead frame, the structure becomes simpler. In addition, the lead frame may be used as a ground electrode. If the lead frame serves as the second plate 536, and the communication hole 676 is formed by covering the holes 520 and 521 formed in the first plate 534 using the lead frame and covering the trench formed in the first plate 534 using the lead frame in this manner, it is possible to simplify the entire structure. In addition, it is possible to reduce influence of noise from the outside of the diaphragm 672 and the processing unit 604 because the lead frame serves as a ground electrode.

Figure 12:
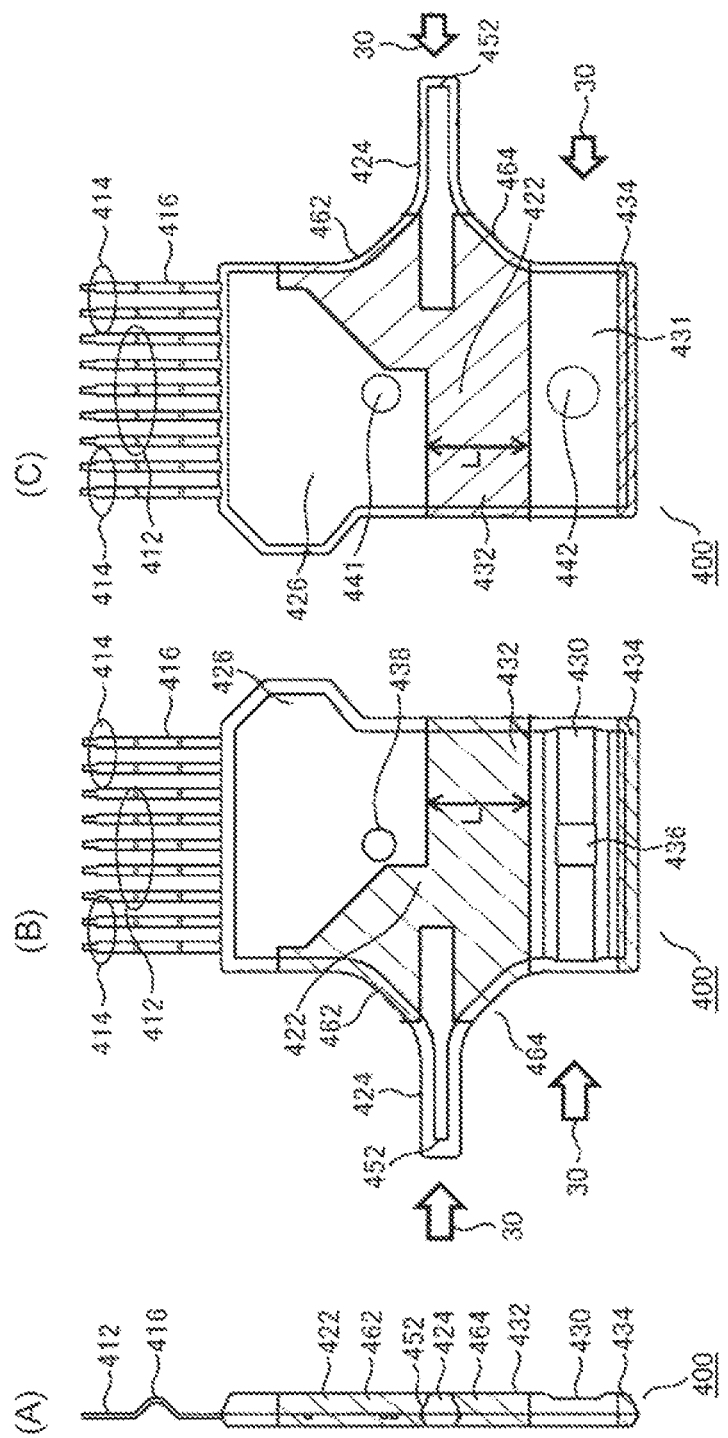

In the circuit package 400 of FIG. 12, the press imprint 442 remains on the rear surface of the circuit package 400 where the heat transfer surface exposing portion 436 is formed. In the first resin molding process, in order to prevent an inflow of the resin to the heat transfer surface exposing portion 436, a die such as an insertion die is installed in a portion of the heat transfer surface exposing portion 436, and a die is installed in a portion of the press imprint 442 opposite thereto, so that an inflow of the resin to the heat transfer surface exposing portion 436 is suppressed. By forming a portion of the heat transfer surface exposing portion 436 in this manner, it is possible to measure the flow rate of the measurement target gas 30 with significantly high accuracy.

Figure 15:
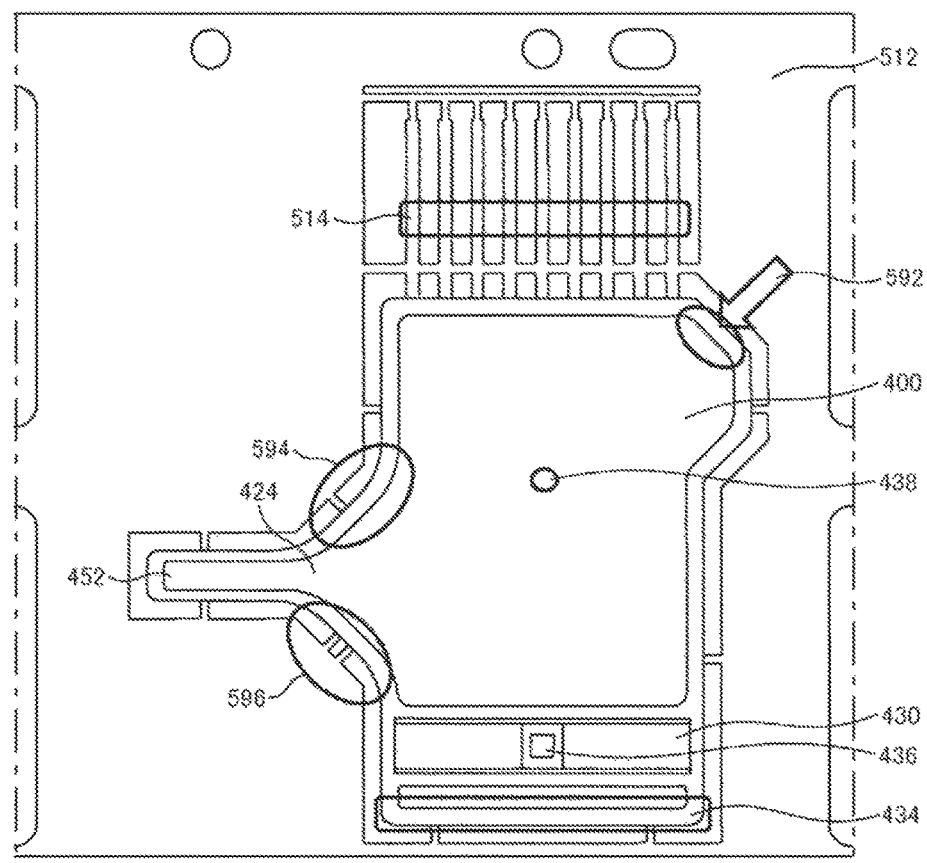
FIG. 15 is a diagram illustrating a condition of the circuit package after a first resin molding process.

FIG. 15 illustrates a state that the frame of FIG. 13 is molded with a thermosetting resin through the first resin molding process and is covered by the thermosetting resin. Through this molding, the measurement surface 430 is formed on the front surface of the circuit package 400, and the heat transfer surface exposing portion 436 is provided on the measurement surface 430. In addition, the gap 674 on the rear surface of the diaphragm 672 corresponding to the heat transfer surface exposing portion 436 is connected to the opening 438. The temperature detecting portion 452 for measuring a temperature of the measurement target gas 30 is provided in the leading end of the protrusion 424, and the temperature detection element 518 (refer to FIG. 13) is embedded inside. Inside the protrusion 424, in order to suppress heat transfer, a lead for extracting the electric signal of the temperature detection element 518 is segmented, and a connection line 546 having a large thermal resistance is arranged as shown in FIG. 13. As a result, it is possible to suppress heat transfer from the base of the protrusion 424 to the temperature detecting portion 452 and influence from the heat.

A slope portion 594 or 596 is formed in the base of the protrusion 424 in FIG. 15. A flow of the resin in the first resin molding process becomes smooth. In addition, the measurement target gas 30 measured by the temperature detecting portion 452 smoothly flows from the protrusion 424 to its base using the slope portion 594 or 596 while the temperature detecting portion 452 is installed and operated in a vehicle, so as to cool the base of the protrusion 424. Therefore, it is possible to reduce influence of the heat to the temperature detecting portion 452. After the state of FIG. 15, the lead 514 is separated from each terminal so as to be the connection terminal 412 or the terminal 414.

In the first resin molding process, it is necessary to prevent an inflow of the resin to the heat transfer surface exposing portion 436 or the opening 438. For this reason, in the first resin molding process, an inflow of the resin is suppressed in a position of the heat transfer surface exposing portion 436 or the opening 438. For example, an insertion die larger than the diaphragm 672 is installed, and a press is installed in the rear surface thereof, so that it is pressed from both surfaces. In FIG. 12(C), the press imprint 442 or 441 remains on the rear surface corresponding to the heat transfer surface exposing portion 436 or the opening 438 of FIG. 15 or the heat transfer surface exposing portion 436 or the opening 438 of FIG. 12(B).

In FIG. 15, a cutout surface of the lead separated from the frame 512 is exposed from the resin surface, so that moisture or the like may intrude into the inside on the cutout surface of the lead during the use. It is important to prevent such a problem from the improvement of the viewpoint of durability or reliability. For example, the portion of the fixation surface 434 of FIG. 15 is covered by the resin through the second resin molding process, and the cutout surface is not exposed. The lead cutout portion of the slope portion 594 or the slope portion 596 is covered by the resin through the second resin molding process, and the cutout surface between the lead 552 or 554 and the frame 512 illustrated in FIG. 13 is covered by the resin. As a result, it is possible to prevent erosion of the lead 552 or 554 or intrusion of water from the cutout portion. The cutout portion of the lead 552 or 554 adjoins an important lead portion that transmits the electric signal of the temperature detecting portion 452. Therefore, it is preferable that the cutout portion be covered in the second resin molding process.

6.3 Another Embodiment of Circuit Package 400 and Effects Thereof

Figure 16:
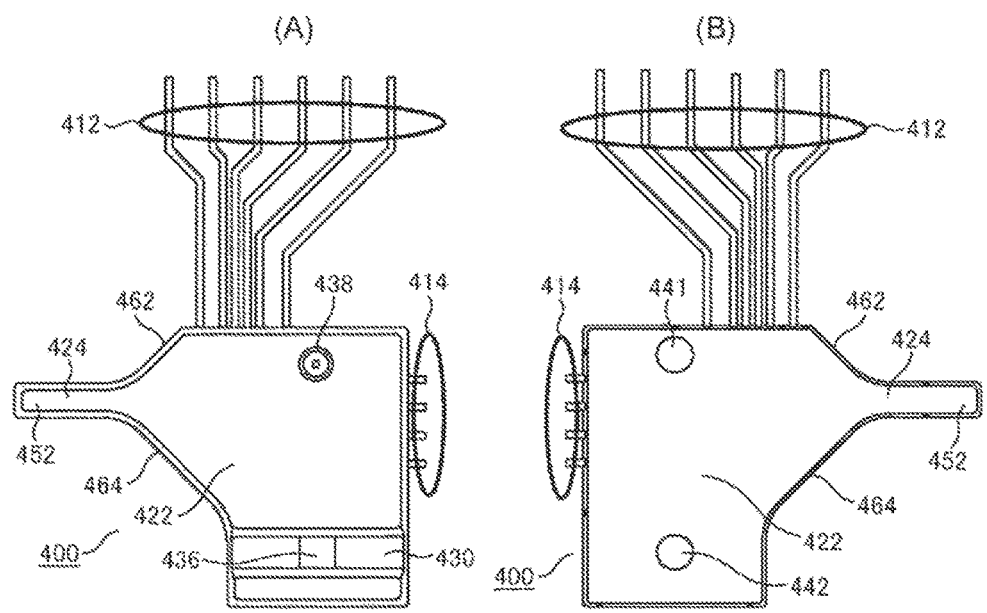
FIGS. 16(A) and 16(B) are figures illustrating another embodiment of the circuit package illustrated in FIGS. 12(A) to 12(C)

FIGS. 16(A) and 16(B) illustrate another embodiment of the circuit package 400, in which FIG. 16(A) is a front view of the circuit package 400, and FIG. 16(B) is a rear view. The same reference numerals as the reference numerals shown in other drawings denote elements performing the same actions, and only a part thereof will be explained in order to avoid cumbersomeness. In the embodiment described above in relation to FIGS. 12(A) to 12(C), the connection terminal 412 and the terminal 414 of the circuit package 400 are provided in the same side of the circuit package 400. In comparison, in the embodiment of FIGS. 16(A) and 16(B), the connection terminal 412 and the terminal 414 are provided in different sides. The terminal 414 is a terminal not connected to the connection terminal connected to the outside in the thermal flow meter 300. If the connection terminal 412 connected to the outside in the thermal flow meter 300 and the terminal 414 not connected to the outside are provided in different directions in this manner, it is possible to widen a distance between the connection terminal 412 and the terminal and improve workability. In addition, if the terminal 414 extends to a direction different from that of the connection terminal 412, it is possible to prevent the lead inside the frame 512 of FIG. 13 from being concentrated on a part and facilitate arrangement of the lead inside the frame 512. In particular, a chip capacitor as the circuit component 516 is connected to a portion of the lead corresponding to the connection terminal 412. A slightly large space is necessary to provide such a circuit component 516. In the embodiment of FIGS. 16(A) and 16(B), it is possible to easily obtain a space for the lead corresponding to the connection terminal 412.

Like the circuit package 400 as shown in FIGS. 12(A) to 12(C), the circuit package 400 as shown in FIGS. 16(A) and 16(B) has a slope portion 462 and a slope portion 464, of which thicknesses gradually change, in a neck portion of the protrusion 424 protruding from a package main body 422. The effects generated thereby are the same as those explained with reference to FIGS. 12(A) to 12(C). More specifically, in FIGS. 16(A) and 16(B), the protrusion 424 protrudes from the side surface of the package main body 422 in such shape as to extend in the upstream direction of the measurement target gas 30. The temperature detecting portion 452 is provided at the leading end portion of the protrusion 424, and the temperature detection element 518 is embedded inside of the temperature detecting portion 452. At the connection portion between the protrusion 424 and the package main body 422, the slope portions 462 and 464 are provided. With the slope portion 462 or the slope portion 464, the neck portion of the protrusion 424 is made to have such shape that the neck of the protrusion 424 is made to be thick, and the protrusion 424 becomes gradually thinner in the leading end direction. More specifically, where the protruding direction is adopted as the axis, the neck portion of the protrusion 424 is made to have a shape that the size of area in the cross section crossing the axis in the protruding direction gradually decreases toward the leading end of the protrusion 424.

When the circuit package 400 is formed through resin mold, such shape allows for the use of the method for flowing resin with a sheet applied to the inside of the die for the purpose of protection of the element, and the adhesiveness between the sheet and the surface in the die is improved, and in addition, the reliability of the obtained circuit package 400 is improved.

The mechanical rigidity of the protrusion 424 is weak, and it easily snaps at the neck. When the protrusion 424 has such shape that the neck of the protrusion 424 is made to be thicker and the protrusion 424 becomes gradually thinner in the leading end direction, the concentration of stress to the neck can be alleviated, and the protrusion 424 is advantageous in terms of mechanical strength. When the protrusion 424 is made through resin mold, warping and the like is likely to occur because of the effect of the change in the volume when the resin is cured. Such effect can be reduced. In order to measure the temperature of the measurement target gas 30 as accurately as possible, the protruding length is configured to be desirably longer. The heat transfer from the package main body 422 to the temperature detection element 518 provided in the temperature detecting portion 452 can be easily reduced by increasing the protruding length of the protrusion 424.

As shown in FIGS. 12(B) and 12(C), the neck of the protrusion 424 is made to be thick and the neck of the protrusion 424 is encircled by the housing 302, whereby the circuit package 400 is fixed to the housing 302 in another embodiment as shown in FIGS. 16(A) and 16(B). When the neck of the protrusion 424 is covered by the resin of the housing 302 in this manner, this can prevent the protrusion 424 from breaking because of a mechanical shock. In addition, various effects as explained in FIGS. 12(A) to 12(C) are achieved.

Descriptions for the opening 438, the heat transfer surface exposing portion 436, the measurement surface 430, the press imprint 441, and the press imprint 442 in FIGS. 16(A) and 16(B) are similar to those described above, and they have the same functional effects. Detailed descriptions will not be repeated for simplicity purposes.

7. Process of Producing Thermal Flow Meter 300

7.1 Process of Producing Circuit Package 400

Figure 17:
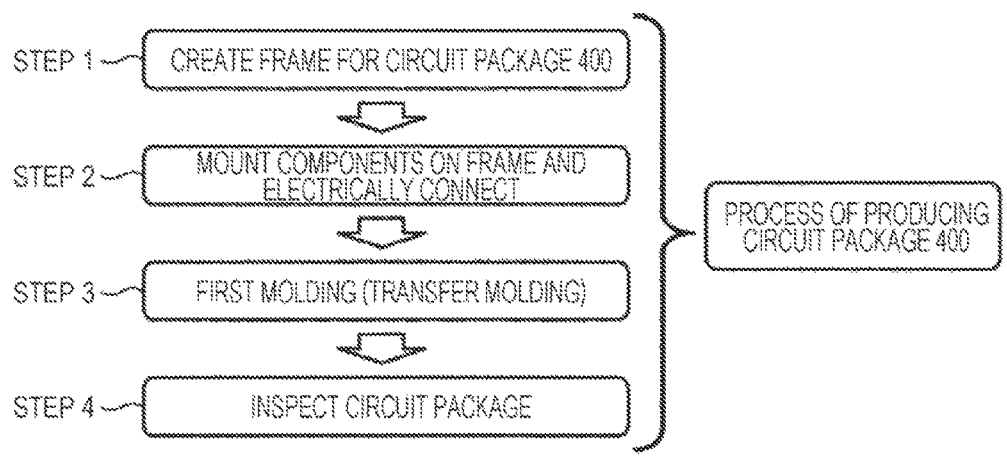
FIG. 17 is a figure illustrating a manufacturing process of the circuit package.
Figure 18:
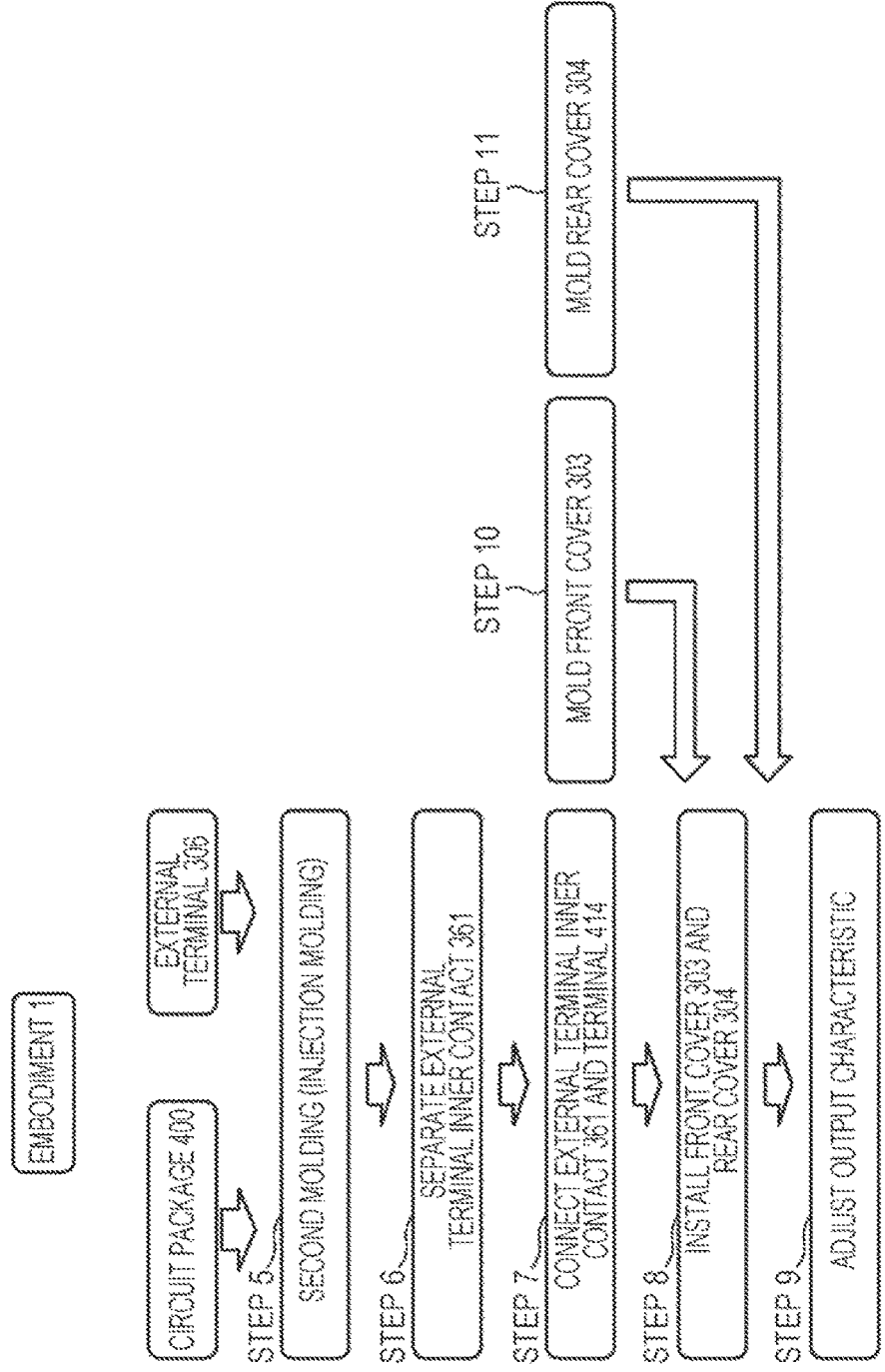
FIG. 18 is a figure illustrating a manufacturing process of the thermal flow meter.

FIG. 17 illustrates a process of producing the circuit package 400 in the process of producing the thermal flow meter 300. FIG. 17 illustrates the process of producing the thermal flow meter 300. FIG. 18 illustrates another embodiment of the process of producing the thermal flow meter 300. In FIG. 17, step 1 shows a process of producing a frame of FIG. 13. This frame is formed, for example, through press machining. In step 2, the plate 532 is first mounted on the frame obtained through the step 1, and the air flow sensing portion 602 or the processing unit 604 is further mounted on the plate 532. Then, the temperature detection element 518 and the circuit component such as a chip capacitor are mounted. In step 2, electrical wiring is performed between circuit components, between the circuit component and the lead, and between the leads. In step 2, the leads 544 and 548 are connected using a connection line 546 for increasing a thermal resistance. In step 2, the circuit component illustrated in FIG. 13 is mounted on the frame 512, and the electrical wiring is further performed, so that an electric circuit is formed.

Then, in step 3, through the first resin molding process, the electrical circuit of FIG. 13 in which circuit components are mounted and electrically connected is molded with thermosetting resin, and thus, the circuit package 400 is produced. The circuit package 400 in the molded state is illustrated in FIG. 15. In addition, in step 3, each of the connected leads is separated from the frame 512, and the leads are separated from each other, so that the circuit package 400 of FIGS. 12(A) to 12(C) and 16(A) and 16(B) is obtained. In this circuit package 400, as illustrated in FIGS. 12(A) to 12(C) and 16(A) and 16(B), the measurement surface 430 or the heat transfer surface exposing portion 436 is formed. In the another embodiment of the circuit package 400 as shown in FIGS. 16(A) and 16(B), the basic method for producing the circuit package 400 is the same.

In step 4, a visual inspection or an operational inspection is performed for the obtained circuit package 400. In the first resin molding process of step 3, the electric circuit obtained in step 2 is fixed to the inside of the die, and a high temperature resin is injected into the die with a high pressure. Therefore, it is preferable to inspect whether or not there is an abnormality in the electric component or the electric wiring. For this inspection, the terminal 414 is used in addition to the connection terminal 412 of FIGS. 12(A) to 12(C) and 16(A) and 16(B). It is noted that, because the terminal 414 is not used thereafter, it may be cut out from the base after this inspection. For example, referring to FIGS. 16(A) and 16(B), the terminal 414 is cut out from the base after the use.

7.2 Process of Producing Thermal Flow Meter 300 and Calibration of Characteristics In the process of FIG. 18, the circuit package 400 already produced as illustrated in FIG. 17 and the external terminal 306 already produced according to a method, not shown, are used. In step 5, the housing 302 is formed through the second resin molding process. In this housing 302, a bypass passage trench formed of resin, the flange 312, or the external connector 305 are formed, and the hatching portion of the circuit package 400 illustrated in FIGS. 12(A) to 12(C) is covered by the resin in the second resin molding process, so that the circuit package 400 is fixed to the housing 302. By combining the production (step 3) of the circuit package 400 through the first resin molding process and the formation of the housing 302 of the thermal flow meter 300 through the second resin molding process, the flow rate detection accuracy is remarkably improved. In step 6, each inner socket of external terminal 361 is separated. In step 7, the connection terminal 412 and the inner socket of external terminal 361 are connected.

As explained above with reference to FIGS. 5(B) and 6(B), the fixing portion 3721 and fixing portion 3723 for fixing the circuit package 400 to the housing 302 include not only the thick portion 4714 and the thick portion 4715 but also the thin portion 4710 or the thin portion 4716. When the fixing portion 3721 and the fixing portion 3723 embracing the circuit package 400 are all constituted by the thick portion, a large force is applied to the front surface of the circuit package 400 because of shrinking of the resin caused by the reduction of the temperature of the resin injected in the second resin molding process in step 5 of FIG. 18. When a large force is applied to the front surface of the circuit package 400 because of shrinking of the resin constituting the fixing portion 3721 or the fixing portion 3723, the electric circuit as shown in FIG. 13 included in the circuit package 400 may be damaged. In this embodiment, the fixing portion 3721 or the fixing portion 3723 are not constituted by only the thick portion, and a portion thereof may be in a thin shape, and the thickness of the resin layer made through the second resin molding process covering the front surface of the circuit package 400 is made to be thin in the thin portion. Therefore, the force exerted on the front surface of the circuit package 400 is reduced. The force exerted on a unit size of area of the circuit package 400 is reduced. Accordingly, the electric circuit of FIG. 13 contained in the circuit package 400 is less likely to be damaged.

In the housing 302 itself, when the portion of the fixing portion 3721 or the fixing portion 3723 of the housing 302 greatly shrinks, warping or distortion may occur in the housing 302. In particular, the fixing portion 3721 and the fixing portion 3723 are connected to the upstream-side outer wall 335 or the downstream-side outer wall 336 connecting the bypass passage and the flange 312, and the force caused by shrinking of the fixing portion 3721 and the fixing portion 3723 is applied to the upstream-side outer wall 335 and the downstream-side outer wall 336. Since the upstream-side outer wall 335 and the downstream-side outer wall 336 have an thin and long shape, they are likely to be distorted or warped. Since the thin portion is provided, the force applied to the upstream-side outer wall 335 and the downstream-side outer wall 336 can be reduced or distributed, and this can suppress warping and distortion in the upstream-side outer wall 335 and the downstream-side outer wall 336.

The housing 302 is obtained in step 7. Then, in step 8, the front and rear covers 303 and 304 are installed in the housing 302, so that the inside of the housing 302 is sealed with the front and rear covers 303 and 304, and the bypass passage for flowing the measurement target gas 30 is obtained, and the thermal flow meter 300 is obtained. In addition, an orifice structure described in relation to FIG. 7 is formed by the protrusion 356 or the protrusion 358 provided in the front or rear cover 303 or 304. It is noted that the front cover 303 is formed through the molding of step 10, and the rear cover 304 is formed through the molding of step 11. In addition, the front and rear covers 303 and 304 are formed through separate processes using different dies.

In step 9, flow rate measurement characteristic test of the measurement target gas 30 is performed by actually introducing an already known amount of gas to the bypass passage of the obtained thermal flow meter 300. Since a relationship between the bypass passage and the air flow sensing portion is maintained with a high degree of accuracy as described above, significantly high measurement accuracy is obtained by performing a measurement characteristic calibration so as to obtain accurate measurement characteristics based on the flow rate measurement characteristic test. In addition, since the molding is performed with a positioning or configuration relationship between the bypass passage and the air flow sensing portion is determined through the first resin molding process and the second resin molding process, the characteristic does not change much even in a long time use, and high reliability is obtained in addition to the high degree of accuracy.

7.3 Another Embodiment of Process of Producing Thermal Flow Meter 300

Figure 19:
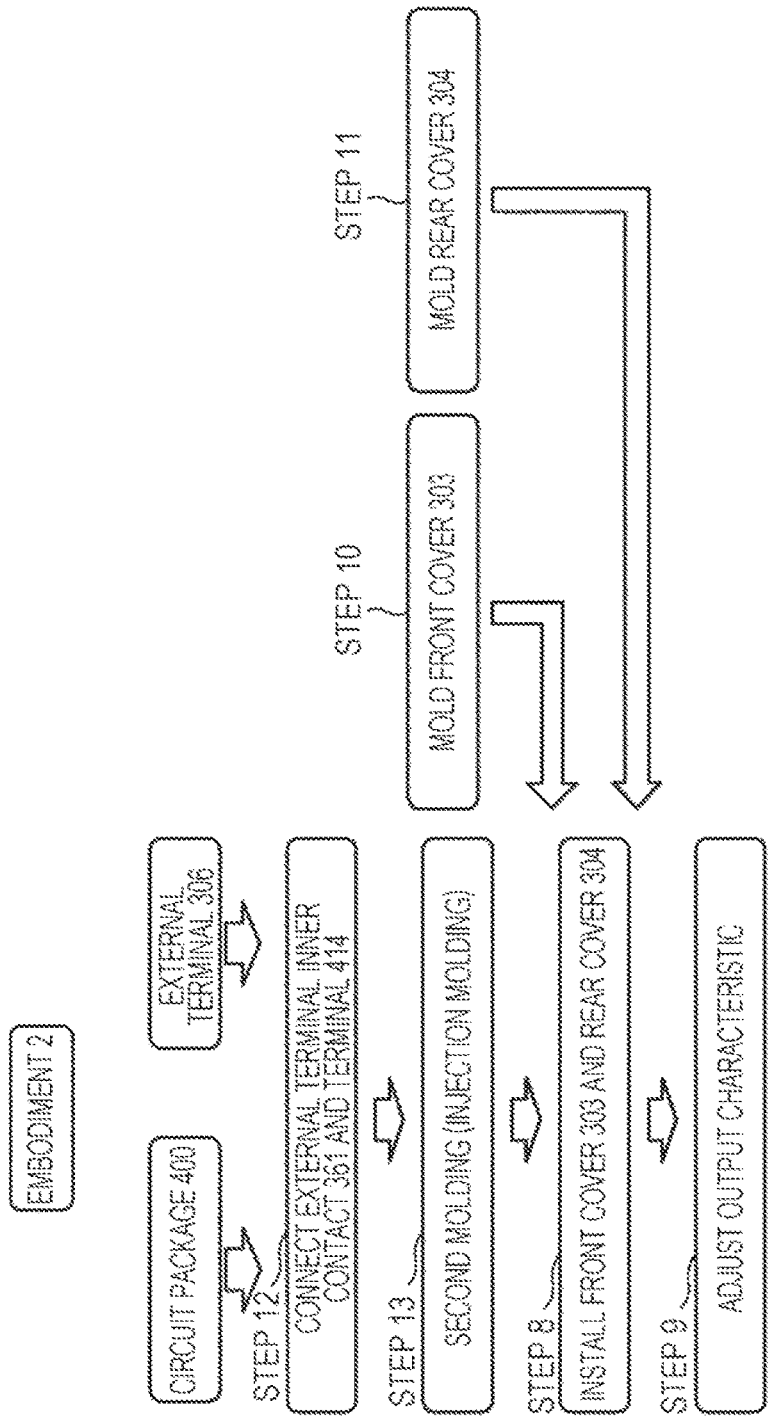
FIG. 19 is a production process of the thermal flow meter according to another embodiment.

FIG. 19 is another embodiment for producing the thermal flow meter 300. In FIG. 19, the circuit package 400 already produced as illustrated in FIG. 17 and the external terminal 306 already produced according to a method, not shown, are used, and before the second resin molding process, the inner socket of external terminal 361 and the connection terminal 412 of the circuit package 400 are connected in step 12. At this occasion, or in a process before step 12, each inner socket of external terminal 361 is separated. In step 13, the housing 302 is made through the second resin molding process. In this housing 302, a bypass passage trench formed of resin, the flange 312, or the external connector 305 are formed, and the hatching portion of the circuit package 400 illustrated in FIGS. 12(A) to 12(C) is covered by the resin in the second resin molding process, so that the circuit package 400 is fixed to the housing 302. By combining the production (step 3) of the circuit package 400 through the first resin molding process and the formation of the housing 302 of the thermal flow meter 300 through the second resin molding process, the flow rate detection accuracy is remarkably improved.

As the housing 302 is obtained in step 13, then, in step 8, the front and rear covers 303 and 304 are installed in the housing 302, and the inside of the housing 302 is sealed with the front and rear covers 303 and 304, so that the bypass passage for flowing the measurement target gas 30 is obtained. In addition, the orifice structure described in relation to FIG. 7 is formed by the protrusion 356 and the protrusion 358 provided in the front or rear cover 303 or 304. As described above, the front cover 303 is formed through the molding of step 10, and the rear cover 304 is formed through the molding of step 11. In addition, the front and rear covers 303 and 304 are formed through separate processes using different dies.

In step 9, characteristic test is performed by actually introducing a specific amount of gas to the bypass passage. Since a relationship between the bypass passage and the air flow sensing portion is maintained with a high degree of accuracy as described above, significantly high measurement accuracy is obtained by performing characteristic calibration based on the characteristic test. In addition, since the molding is performed with a positioning or configuration relationship between the bypass passage and the air flow sensing portion is determined through the first resin molding process and the second resin molding process, the characteristic does not change much even in a long time use, and high reliability is obtained in addition to the high degree of accuracy. Further, various effects explained above with reference to FIG. 18 are obtained.

8. Circuit Configuration of Thermal Flow Meter 300

8.1 Overview of Circuit Configuration of Thermal Flow Meter 300

Figure 20:
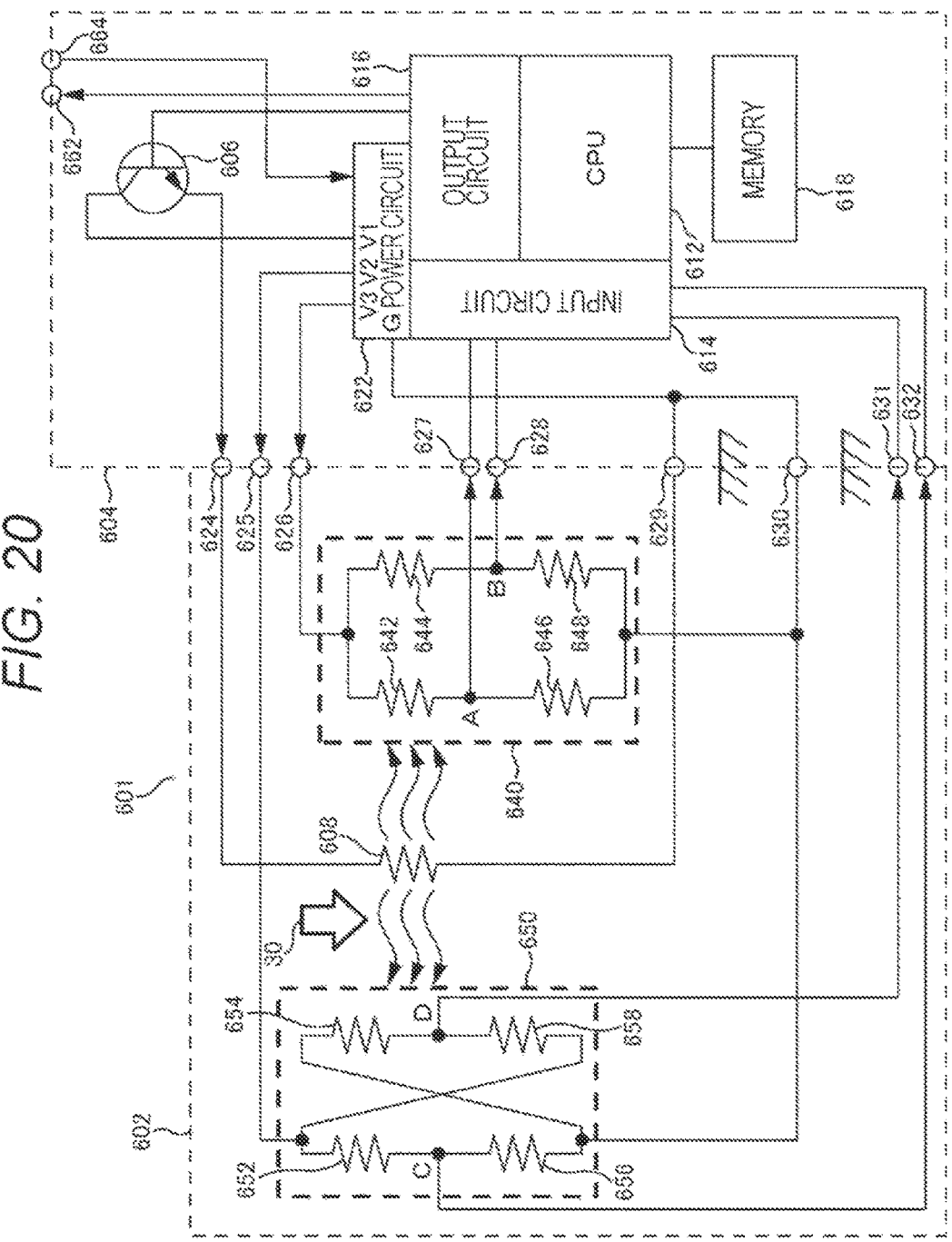
FIG. 20 is a circuit diagram illustrating a flow rate measurement circuit of the thermal flow meter.

FIG. 20 is a circuit diagram illustrating the flow rate measurement circuit 601 of the thermal flow meter 300. It is noted that the measurement circuit relating to the temperature detecting portion 452 described in the aforementioned embodiment is also provided in the thermal flow meter 300, but is not illustrated intentionally in FIG. 20. The flow rate measurement circuit 601 of the thermal flow meter 300 includes the air flow sensing portion 602 having the heat generator 608 and the processing unit 604. The processing unit 604 control a heat amount of the heat generator 608 of the air flow sensing portion 602 and outputs a signal representing the flow rate through the terminal 662 based on the output of the air flow sensing portion 602. For this processing, the processing unit 604 includes a central processing unit (hereinafter, referred to as "CPU") 612, an input circuit 614, an output circuit 616, a memory 618 for storing data representing a relationship between the calibration value or the measurement value and the flow rate, and a power circuit 622 for supplying a certain voltage to each necessary circuit. The power circuit 622 is supplied with DC power from an external power supply such as a vehicle-mount battery through a terminal 664 and a ground terminal (not illustrated).

The air flow sensing portion 602 is provided with a heat generator 608 for heating the measurement target gas 30. A voltage V1 is supplied from the power circuit 622 to a collector of a transistor 606 included in a current supply circuit of the heat generator 608, and a control signal is applied from the CPU 612 to a base of the transistor 606 through the output circuit 616. Based on this control signal, a current is supplied from the transistor 606 to the heat generator 608 through the terminal 624. The current amount supplied to the heat generator 608 is controlled by a control signal applied from the CPU 612 to the transistor 606 of the current supply circuit of the heat generator 608 through the output circuit 616. The processing unit 604 controls the heat amount of the heat generator 608 such that a temperature of the measurement target gas 30 increases by a predetermined temperature, for example, 100° C. from an initial temperature by heating using the heat generator 608.

The air flow sensing portion 602 includes a heating control bridge 640 for controlling a heat amount of the heat generator 608 and a bridge circuit of air flow sensing 650 for measuring a flow rate. A predetermined voltage V3 is supplied to one end of the heating control bridge 640 from the power circuit 622 through the terminal 626, and the other end of the heating control bridge 640 is connected to the ground terminal 630. In addition, a predetermined voltage V2 is applied to one end of the bridge circuit of air flow sensing 650 from the power circuit 622 through the terminal 625, and the other end of the bridge circuit of air flow sensing 650 is connected to the ground terminal 630.

The heating control bridge 640 has a resistor 642 which is a resistance temperature detector having a resistance value changing depending on the temperature of the heated measurement target gas 30, and the resistors 642, 644, 646, and 648 constitute a bridge circuit. A potential difference between a node A between the resistors 642 and 646 and a node B between the resistors 644 and 648 is input to the input circuit 614 through the terminals 627 and 628, and the CPU 612 controls the current supplied from the transistor 606 to control the heat amount of the heat generator 608 such that the potential difference between the nodes A and B is set to a predetermined value, for example, zero voltage in this embodiment. The flow rate measurement circuit 601 illustrated in FIG. 20 heats the measurement target gas 30 using the heat generator 608 such that a temperature increases by a predetermined temperature, for example, 100° C. from an initial temperature of the measurement target gas 30 at all times. In order to perform this heating control with high accuracy, resistance values of each resistor of the heating control bridge 640 are set such that the potential difference between the nodes A and B becomes zero when the temperature of the measurement target gas 30 heated by the heat generator 608 increases by a predetermined temperature, for example, 100° C. from an initial temperature at all times. Therefore, in the flow rate measurement circuit 601 of FIG. 20, the CPU 612 controls the electric current supplied to the heat generator 608 such that the potential difference between the nodes A and B becomes zero.

The bridge circuit of air flow sensing 650 includes four resistance temperature detectors of resistors 652, 654, 656, and 658. The four resistance temperature detectors are arranged along the flow of the measurement target gas 30 such that the resistors 652 and 654 are arranged in the upstream side in the flow path of the measurement target gas 30 with respect to the heat generator 608, and the resistors 656 and 658 are arranged in the downstream side in the flow path of the measurement target gas 30 with respect to the heat generator 608. In addition, in order to increase the measurement accuracy, the resistors 652 and 654 are arranged such that distances to the heat generator 608 are approximately equal, and the resistors 656 and 658 are arranged such that distances to the heat generator 608 are approximately equal.

A potential difference between a node C between the resistors 652 and 656 and a node D between the resistors 654 and 658 is input to the input circuit 614 through the terminals 631 and 632. In order to increase the measurement accuracy, each resistance of the bridge circuit of air flow sensing 650 is set, for example, such that a positional difference between the nodes C and D is set to zero while the flow of the measurement target gas 30 is set to zero. Therefore, while the potential difference between the nodes C and D is set to, for example, zero, the CPU 612 outputs, from the terminal 662, an electric signal indicating that the flow rate of the main passage 124 is zero based on the measurement result that the flow rate of the measurement target gas 30 is zero.

When the measurement target gas 30 flows along the arrow direction in FIG. 20, the resistor 652 or 654 arranged in the upstream side is cooled by the measurement target gas 30, and the resistors 656 and 658 arranged in the downstream side of the measurement target gas 30 are heated by the measurement target gas 30 heated by the heat generator 608, so that the temperature of the resistors 656 and 658 increases. For this reason, a potential difference is generated between the nodes C and D of the bridge circuit of air flow sensing 650, and this potential difference is input to the input circuit 614 through the terminals 631 and 632. The CPU 612 searches data indicating a relationship between the flow rate of the main passage 124 and the aforementioned potential difference stored in the memory 618 based on the potential difference between the nodes C and D of the bridge circuit of air flow sensing 650 to obtain the flow rate of the main passage 124. An electric signal indicating the flow rate of the main passage 124 obtained in this manner is output through the terminal 662. It is noted that, although the terminals 664 and 662 illustrated in FIG. 20 are denoted by new reference numerals, they are included in the connection terminal 412 of FIG. 5(A), 5(B), 6(A), or 6(B) described above.

As described in FIG. 1, the thermal flow meter 300 is provided in the intake pipe and is used to measure the intake air amount of the internal combustion engine. In a particular operation state of the internal combustion engine, the intake air flowing through the intake pipe makes a pulsing motion, and further, the intake air flows to the intake valve of the internal combustion engine, and in addition, there occurs a phenomenon that the intake air flows backward. In FIG. 20, in the backward flow state, a negative flow of the thermal flow meter 30 with respect to the direction indicated by the arrow occurs, i.e., the backward flow occurs. In this backflow, the resistors 652 and 654 are heated by the measurement target gas 30 heated by the heat generator 608, and on the other hand, the resistors 656 and 658 are cooled by the measurement target gas 30 flowing backward. As described above, this is an operation opposite to the operation where the flow of the measurement target gas 30 is in the forward direction, and a potential difference having a polarity opposite to the flow rate in the forward direction is generated between the nodes C and D. The direction of the flow of the measurement target gas 30 can be detected from the polarity of the voltage detected via the terminal 631 and the terminal 632, and the intake flow rate actually retrieved into the internal combustion engine can be calculated by subtracting the detected flow rate in the opposite direction from the detected flow rate in the forward direction.

The memory 618 stores the data indicating a relationship between the potential difference between the nodes C and D and the flow rate of the main passage 124, including the backward flow state. It is noted that the calibration data for reducing measurement error such as variation derived based on the actual measurement value of the gas after production of the thermal flow meter 300 are stored in the memory 618. It is noted that the actual measurement value of the gas after production of the thermal flow meter 300 and the calibration value based thereon are stored to the memory 618 using the external terminal 306 or the calibration terminal 307 illustrated in FIGS. 4(A) and 4(B). In this embodiment, the thermal flow meter 300 is produced while an arrangement relationship between the bypass passage for flowing the measurement target gas 30 and the measurement surface 430 or an arrangement relationship between the bypass passage for flowing the measurement target gas 30 and the heat transfer surface exposing portion 436 is maintained with a high degree of accuracy and a little variation. Therefore, it is possible to obtain a measurement result with remarkably high degree of accuracy through calibration using the calibration value.

8.2 Configuration of Flow Rate Measurement Circuit 601

Figure 21:
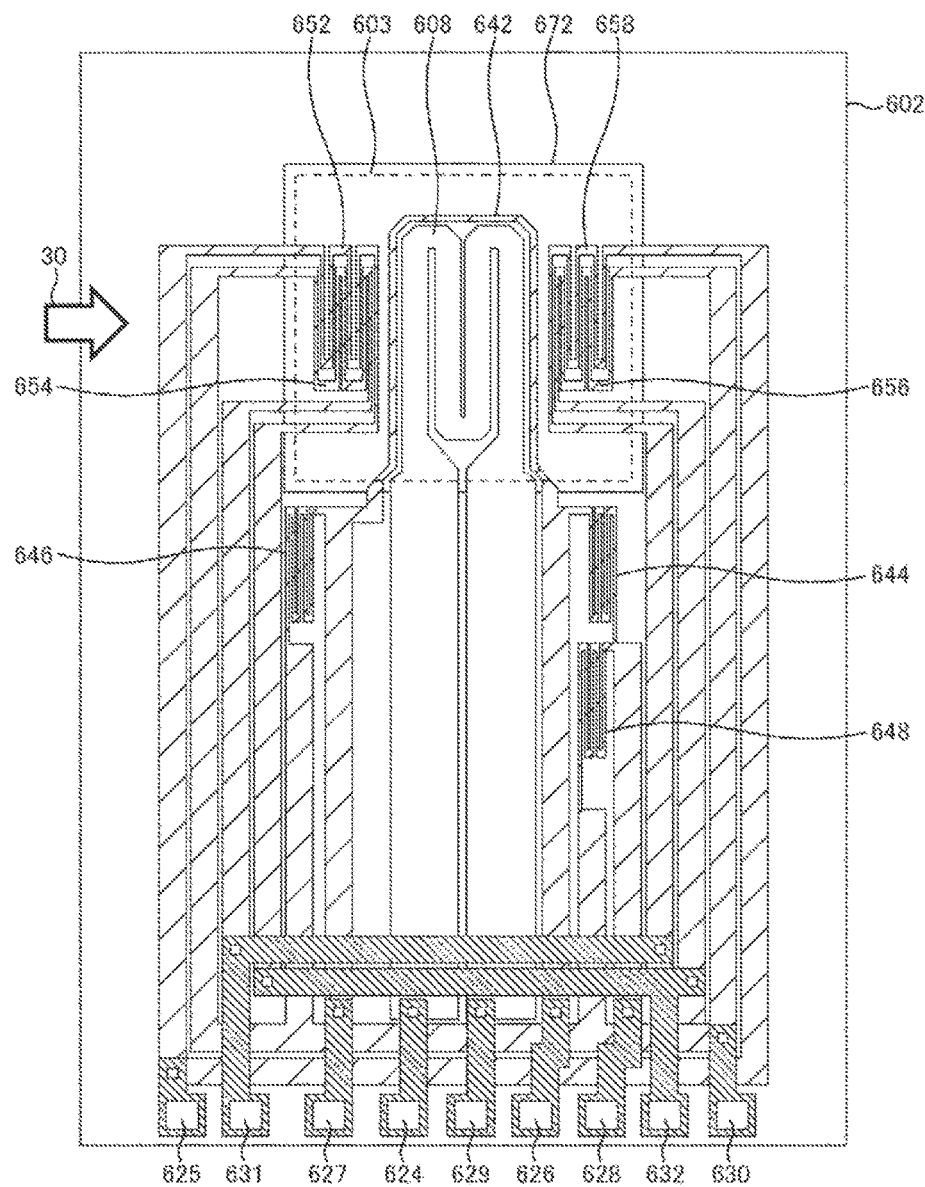
FIG. 21 is an explanatory diagram explaining an air flow sensing portion of a flow rate measurement circuit.

FIG. 21 is a circuit configuration diagram illustrating a circuit arrangement of the air flow sensing portion 602 of FIG. 20 described above. The air flow sensing portion 602 is manufactured from a semiconductor chip having a rectangular shape. The measurement target gas 30 flows along the arrow direction from the left side to the right side of the air flow sensing portion 602 illustrated in FIG. 21. However, when the backward flow occurs, a negative flow in the arrow direction is generated, which means that a flow in the opposite direction is generated. The air flow sensing portion 602 as shown in FIG. 21 performs heat transfer with the measurement target gas 30, so that not only the flow rate of the flow in the forward direction but also the flow rate of the state of the flow in the backward direction can be detected. A diaphragm 672 having a rectangular shape is formed in the air flow sensing portion 602. The diaphragm 672 is provided with a thin area 603 indicated by the dotted line obtained by making the thickness of the semiconductor chip thinner. The cavity portion is formed in the rear surface side of the thin area 603 and communicates with the opening 438 illustrated in FIG. 12(A) to 12(C) or 5, so that the gas pressure inside the cavity portion depends on the pressure of the gas guided from the opening 438.

By reducing the thickness of the thin area 603 of the diaphragm 672, the thermal conductivity is lowered, and heat transfer to the resistors 652, 654, 658, and 656 provided in the thin area 603 through the diaphragm 672 is suppressed, so that the temperatures of the resistors are approximately set through heat transfer with the measurement target gas 30.

The heat generator 608 is provided in the center of the thin area 603 of the diaphragm 672, and the resistor 642 of the heating control bridge 640 is provided around the heat generator 608. In addition, the resistors 644, 646, and 648 of the heating control bridge 640 are provided in the outer side of the thin area 603. The resistors 642, 644, 646, and 648 formed in this manner constitute the heating control bridge 640.

In addition, the resistors 652 and 654 as upstream resistance temperature detectors and the resistors 656 and 658 as downstream resistance temperature detectors are arranged to interpose the heat generator 608. The resistors 652 and 654 as upstream resistance temperature detectors are arranged in the upstream side in the arrow direction where the measurement target gas 30 flows with respect to the heat generator 608. The resistors 656 and 658 as downstream resistance temperature detectors are arranged in the downstream side in the arrow direction where the measurement target gas 30 flows with respect to the heat generator 608. In this manner, the bridge circuit of air flow sensing 650 is formed by the resistors 652, 654, 656, and 658 arranged in the thin area 603. The above explanation is based on the state where the measurement target gas 30 flows in the forward direction, and when the backward flow occurs, the actual flow of the measurement target gas 30 flows form the downstream to the upstream.

Both ends of the heat generator 608 are connected to each of the terminals 624 and 629 illustrated in the lower half of FIG. 21. Here, as illustrated in FIG. 20, the current supplied from the transistor 606 to the heat generator 608 is applied to the terminal 624, and the terminal 629 is grounded.

The resistors 642, 644, 646, and 648 of the heating control bridge 640 are connected to each other and are connected to the terminals 626 and 630. As illustrated in FIG. 20, the terminal 626 is supplied with a predetermined voltage V3 from the power circuit 622, and the terminal 630 is grounded. In addition, the node between the resistors 642 and 646 and the node between the resistors 646 and 648 are connected to the terminals 627 and 628, respectively. As illustrated in FIG. 21, the terminal 627 outputs an electric potential of the node A between the resistors 642 and 646, and the terminal 627 outputs an electric potential of the node B between the resistors 644 and 648. As illustrated in FIG. 20, the terminal 625 is supplied with a predetermined voltage V2 from the power circuit 622, and the terminal 630 is grounded as a ground terminal. In addition, a node between the resistors 654 and 658 is connected to the terminal 631, and the terminal 631 outputs an electric potential of the node B of FIG. 20. The node between the resistors 652 and 656 is connected to the terminal 632, and the terminal 632 outputs an electric potential of the node C illustrated in FIG. 20.

As illustrated in FIG. 21, since the resistor 642 of the heating control bridge 640 is formed in the vicinity of the heat generator 608, it is possible to measure the temperature of the gas heated by the heat from the heat generator 608 with high accuracy. Meanwhile, since the resistors 644, 646, and 648 of the heating control bridge 640 are arranged distant from the heat generator 608, they are not easily influenced by the heat generated from the heat generator 608. The resistor 642 is configured to respond sensitively to the temperature of the gas heated by the heat generator 608, and the resistors 644, 646, and 648 are configured not to be influenced by the heat generator 608. For this reason, the detection accuracy of the measurement target gas 30 using the heating control bridge 640 is high, and the control for heating the measurement target gas 30 by only a predetermined temperature from its initial temperature can be performed with high accuracy.

In this embodiment, a gap is formed in the rear surface side of the diaphragm 672 and communicates with the opening 438 illustrated in FIG. 12(A) to 12(C) or 5(A) and 5(B), so that a difference between the pressure of the gap in the rear side of the diaphragm 672 and the pressure in the front side of the diaphragm 672 does not increase. It is possible to suppress a distortion of the diaphragm 672 caused by this pressure difference. This contributes to improvement of the flow rate measurement accuracy.

As described above, the heat conduction through the diaphragm 672 is suppressed as small as possible by forming the thin area 603 and reducing the thickness of the thin area 603 in the diaphragm 672. Therefore, while influence of the heat conduction through the diaphragm 672 is suppressed, the bridge circuit of air flow sensing 650 or the heating control bridge 640 more strongly tends to operate depending on the temperature of the measurement target gas 30, so that the measurement operation is improved. For this reason, high measurement accuracy is obtained.

9. Temperature Measurement of Measurement Target Gas 30

9.1 Structure of Temperature Detecting Portion 452 and Effects Based Thereon

As shown in FIGS. 2(A) and 2(B) to 6(A) and 6(B), a temperature of the measurement target gas 30 is measured by the temperature detecting portion 452 provided in the thermal flow meter 300. The temperature detecting portion 452 protrudes from the housing 302 to the outside to, e.g., the upstream side, and has such structure as to be in direct contact with the measurement target gas 30. With such structure, the accuracy of the temperature measurement of the measurement target gas 30 is improved. Such structure is provided that the temperature of the gas flowing in to the inlet port 343 from the upstream side in the direction along the flow of the measurement target gas 30 is measured by the temperature detecting portion 452, and further the gas flows to the neck portion of the temperature detecting portion 452 which is the portion for supporting the temperature detecting portion 452, so that the temperature of the portion supporting the temperature detecting portion 452 cools to become closer to the temperature of the measurement target gas 30. With such structure, the measurement accuracy is improved.

The temperature of the intake pipe which is the main passage 124 is much higher than the normal temperature of the measurement target gas 30, and the heat is transferred to the portion for supporting the temperature detecting portion 452 through the upstream-side outer wall inside the measurement portion 310 from the flange 312 or the thermal insulation 315, so that the temperature measurement accuracy may be influenced. The aforementioned support portion is cooled as the measurement target gas 30 is measured by the temperature detecting portion 452 and then flows along the support portion of the temperature detecting portion 452. Therefore, it is possible to suppress the heat from being transferred to the portion for supporting the temperature detecting portion 452 through the upstream-side outer wall inside the measurement portion 310 from the flange 312 or the thermal insulation 315.

In particular, in the support portion of the temperature detecting portion 452, the upstream-side outer wall inside the measurement portion 310 has a shape concave to the downstream side. Therefore, it is possible to increase a length between the upstream-side outer wall inside the measurement portion 310 and the temperature detecting portion 452. While the heat conduction length increases, a length of the cooling portion using the measurement target gas 30 increases. Therefore, it is possible to also reduce influence of the heat from the flange 312 or the thermal insulation 315. Accordingly, the measurement accuracy is improved.

Since the upstream-side outer wall has a shape concaved to the downstream side, i.e., the inside of the housing 302, it is possible to provide fixation with the upstream-side outer wall 335 of the housing 302 and easily fix the circuit package 400 described below. In addition, this reinforces the protrusion 424 having the temperature detecting portion 452 (refer to FIG. 12).

As explained above with reference to FIGS. 2(A) and 2(B) and 3(A) and 3(B), the inlet port 343 is provided at the upstream side of the measurement target gas 30 in the case 301, and the measurement target gas 30 guided from the inlet port 343 passes around the temperature detecting portion 452, and is guided to the main passage 124 from the front side outlet port 344 and the backside outlet port 345. The temperature detecting portion 452 measures the temperature of the measurement target gas 30, and the external terminal 306 of the external connector 305 outputs an electric signal representing the temperature thus measured. The case 301 of the thermal flow meter 300 includes the front cover 303, the rear cover 304, and the housing 302, and the housing 302 has a depression for forming the inlet port 343. The depression is made by the outer wall hollow portion 366 (refer to FIG. 5 and FIG. 6). The front side outlet port 344 and the backside outlet port 345 are made of the holes provided in the front cover 303 and the rear cover 304. As explained blow, the temperature detecting portion 452 is provided at the leading end portion of the protrusion 424, and is mechanically weak. The front cover 303 and the rear cover 304 are provided to protect the protrusion 424 from mechanical shock.

The front protection portion 322 or the rear protection portion 325 is formed in the front or rear cover 303 or 304 illustrated in FIG. 8(A) to 8(C) or 9(A) to 9(C). As illustrated in FIG. 2(A), 2(B), 3(A), or 3(B), the front protection portion 322 provided in the front cover 303 is arranged on the front side surface of the inlet port 343, and the rear protection portion 325 provided in the rear cover 304 is arranged in the rear side surface of the inlet port 343. The temperature detecting portion 452 arranged inside the inlet port 343 is protected by the front protection portion 322 and the rear protection portion 325, so that it is possible to prevent a mechanical damage of the temperature detecting portion 452 caused when the temperature detecting portion 452 collides with something during production or loading on a vehicle.

As shown in FIGS. 12(A) to 12(C) and 16(A) and 16(B), the neck portion of the protrusion 424 supporting the temperature detecting portion 452 is configured such that the neck portion gradually becomes thicker to the leading end, and the measurement target gas 30 having entered from the inlet port 343 flows along the neck portion gradually becoming thicker, and therefore, the cooling effect increases. The neck portion of the protrusion 424 is close to the flow rate measurement circuit, and is likely to be affected by the heat of the flow rate measurement circuit. Further, a lead 548 for connecting the temperature detection element 518 provided at the temperature detecting portion 452 is embedded in the neck portion of the protrusion 424. Therefore, the heat may be transmitted via the lead 548. The neck portion of the protrusion 424 is made thicker, and the size of contact area with the measurement target gas 30 is increased, whereby the cooling effect can be enhanced.

9.2 Formation of Temperature Detecting Portion 452 and Protrusion 424 and Effects Thereof The circuit package 400 includes the protrusion 424 and the circuit package main body 422 including the processing unit 604 and the air flow sensing portion 602, explained later, for measuring the flow rate. As shown in FIGS. 2(A) and 2(B), the protrusion 424 protrudes in such a shape as to extend in the upstream direction of the measurement target gas 30 from the side surface of the circuit package main body 422. At the leading end portion of the protrusion 424, the temperature detecting portion 452 is provided, and temperature detection element 518 is embedded inside of the temperature detecting portion 452 as shown in FIGS. 12(A) to 12(C). The link portion between the protrusion 424 and the circuit package main body 422 is provided with the slope portions 462 and 464 as shown in FIGS. 12(A) to 12(C) and 16(A) and 16(B). With the slope portion 462 or the slope portion 464, the neck portion of the protrusion 424 is made to have such shape that the neck of the protrusion 424 is made to be thick, and the protrusion 424 becomes gradually thinner in the leading end direction. The neck portion of the protrusion 424 has such shape that the size of area of the cross section crossing the axis with respect to the axis of the axis in the protruding direction decreases in the leading end direction.

As described above, the connection is made to have such structure that gradually changes at the connection portion of the front surface of the protrusion 424 and the front surface of the circuit package 400, and therefore, when the circuit package 400 is formed through resin mold, such shape allows for the use of the method for flowing resin with a sheet applied to the inside of the die for the purpose of protection of the element, and the adhesiveness between the sheet and the surface in the die is improved, and in addition, the reliability is improved. When the front surface greatly changes, excessive force is applied to the sheet, which causes displacement at the contact portion between the sheet and the inner wall surface of the die, and there is a problem in that the resin formation cannot be done well. The mechanical rigidity of the protrusion 424 is weak, and it easily snaps at the neck. When the protrusion 424 has such shape that the neck of the protrusion 424 is made to be thicker and the protrusion 424 becomes gradually thinner in the leading end direction, the concentration of stress to the neck can be alleviated, and the protrusion 424 is advantageous in terms of mechanical strength. When the protrusion 424 is made through resin mold, warping and the like is likely to occur because of the effect of the change in the volume when the resin is cured. Such effect can be reduced. In order to measure the temperature of the measurement target gas 30 as accurately as possible, the protruding length is configured to be desirably longer. The heat transfer from the package main body 422 to the temperature detection element 518 provided in the temperature detecting portion 452 can be easily reduced by increasing the protruding length of the protrusion 424.

As shown in FIGS. 12(B) and 12(C), the neck of the protrusion 424 is made to be thick and the neck of the protrusion 424 is encircled by the housing 302, whereby the circuit package 400 is fixed to the housing 302. When the neck of the protrusion 424 is covered by the resin of the housing 302 in this manner, this can prevent the protrusion 424 from breaking because of a mechanical shock.

The heat transfer with those other than the measurement target gas 30 is to be reduced as much as possible, in order to detect the temperature of the measurement target gas 30 with a high degree of accuracy. The protrusion 424 supporting the temperature detecting portion 452 is configured to such that the leading end portion has a thin shape from its neck, and the leading end portion thereof is provided with the temperature detecting portion 452. Such shape reduces the effect of the heat from the neck portion of the protrusion 424 to the temperature detecting portion 452.

After the temperature detecting portion 452 detects the temperature of the measurement target gas 30, the measurement target gas 30 flows along the protrusion 424, and the temperature of the protrusion 424 is becomes closer to the temperature of the measurement target gas 30. Accordingly, the effect caused on the temperature detecting portion 452 by the temperature of the neck portion of the protrusion 424 is suppressed. In particular, in this embodiment, the vicinity of the protrusion 424 of the temperature detecting portion 452 is thin, and the protrusion becomes thicker toward the base of the protrusion 424. Therefore, the measurement target gas 30 flows along the shape of this protrusion 424, so that the protrusion 424 is effectively cooled.

In FIGS. 12(A) to 12(C), the hatching portion in the neck portion of the protrusion 424 indicates a fixation surface 432 covered by the resin forming the housing 302 in the second resin molding process. The hatching portion in the neck portion of the protrusion 424 is provided with a depression. This indicates that the portion in the depressed shape not covered by the resin of the housing 302 is provided. By making the portion in the depressed shape not covered by the resin of the housing 302 and the neck portion of the protrusion 424 as described above, the protrusion 424 can be more easily cooled by the measurement target gas 30. Although the hatched portion is not shown in FIGS. 16(A) and 16(B), it is like what is shown in FIGS. 12(A) to 12(C).

The circuit package 400 is provided with the connection terminal 412 in order to supply electric power for operating the embedded air flow sensing portion 602 or the processing unit 604 and output the flow rate measurement value or the temperature measurement value. In addition, a terminal 414 is provided in order to inspect whether or not the circuit package 400 is appropriately operated, or whether or not an abnormality is generated in a circuit component or connection thereof. In this embodiment, the circuit package 400 is formed by performing transfer molding for the air flow sensing portion 602 or the processing unit 604 using a thermosetting resin through the first resin molding process. By performing the transfer molding, it is possible to improve dimensional accuracy of the circuit package 400. However, in the transfer molding process, since a high pressure resin is pressed into the inside of the sealed die where the air flow sensing portion 602 or the processing unit 604 is embedded, it is preferable to inspect whether or not there is a defect in the air flow sensing portion 602 or the processing unit 604 and such a wiring relationship for the obtained circuit package 400. In this embodiment, an inspection terminal 414 is provided, and inspection is performed for each of the produced circuit packages 400. Since the inspection terminal 414 is not used for measurement, the terminal 414 is not connected to the inner socket of external terminal 361 as described above. In addition, each connection terminal 412 is provided with a curved portion 416 in order to increase a mechanical elastic force. If a mechanical elastic force is provided in each connection terminal 412, it is possible to absorb a stress caused by a difference of the thermal expansion coefficient between the resin of the first resin molding process and the resin of the second resin molding process. That is, each connection terminal 412 is influenced by thermal expansion caused by the first resin molding process, and the inner socket of external terminal 361 connected to each connection terminal 412 are influenced by the resin of the second resin molding process. Therefore, it is possible to absorb generation of a stress caused by the difference of the resin.

9.3 Actions of Slope Portions 462, 464 Formed at Neck Portion of Protrusion 424 and Effects Thereof As explained with reference to FIGS. 12(A) to 12(C), FIG. 15, and FIGS. 16(A) and 16(B), the slope portions 462 and 464 are provided at the neck portion of the protrusion 424. With the slope portion 462 or the slope portion 464, the neck portion of the protrusion 424 is made to have such shape that the neck of the protrusion 424 is made to be thick, and the protrusion 424 becomes gradually thinner in the leading end direction. More specifically, where the protruding direction is adopted as the axis, the neck portion of the protrusion 424 is made to have a shape that the size of area in the cross section crossing the axis in the protruding direction gradually decreases.

When the circuit package 400 is formed through resin mold, and the resin is flown with a sheet applied to the inside of the die for the purpose of protection of the element, and the adhesiveness between the sheet and the surface in the die is improved, and in addition, the reliability is improved. The mechanical rigidity of the protrusion 424 is weak, and it easily snaps at the neck. When the protrusion 424 has such shape that the neck of the protrusion 424 is made to be thicker and the protrusion 424 becomes gradually thinner in the leading end direction, the concentration of stress to the neck can be alleviated, and the protrusion 424 is advantageous in terms of mechanical strength. When the protrusion 424 is made through resin mold, warping and the like is likely to occur because of the effect of the change in the volume when the resin is cured. Such effect can be reduced. In order to measure the temperature of the measurement target gas 30 as accurately as possible, the protruding length is configured to be desirably longer. The heat transfer from the package main body 422 to the temperature detection element 518 provided in the temperature detecting portion 452 can be easily reduced by increasing the protruding length of the protrusion 424.

As shown in FIGS. 12(B) and 12(C), the neck of the protrusion 424 is made to be thick and the neck of the protrusion 424 is encircled by the housing 302, whereby the circuit package 400 is fixed to the housing 302. When the neck of the protrusion 424 is covered by the resin of the housing 302 in this manner, this can prevent the protrusion 424 from breaking because of a mechanical shock.

By providing a slope portion 463 at the neck of the protrusion 424, the neck portion of the protrusion 424 can have such shape that the neck of the protrusion 424 is made to be thicker and the protrusion 424 becomes gradually thinner in the leading end direction. When the circuit package 400 is formed through resin mold, such shape allows for the use of the method for flowing resin with a sheet applied to the inside of the die for the purpose of protection of the element, and the adhesiveness between the sheet and the surface in the die is improved, and in addition, the reliability is improved. The mechanical rigidity of the protrusion 424 is weak, and it easily snaps at the neck. When the protrusion 424 has such shape that the neck of the protrusion 424 is made to be thicker and the protrusion 424 becomes gradually thinner in the leading end direction, the concentration of stress to the neck can be alleviated, and the protrusion 424 is advantageous in terms of mechanical strength. When the protrusion 424 is made through resin mold, warping and the like is likely to occur because of the effect of the change in the volume when the resin is cured. Such effect can be reduced. In order to measure the temperature of the measurement target gas 30 as accurately as possible, the protruding length is configured to be desirably longer. The heat transfer from the package main body 422 to the temperature detection element 518 provided in the temperature detecting portion 452 can be easily reduced by increasing the protruding length of the protrusion 424.

In FIGS. 12(B) and 12(C) and 16(A) and 16(B), the neck of the protrusion 424 is made to be thick and the neck of the protrusion 424 is encircled by the fixing portion 3723 of the housing 302 so as to be covered with the resin of the housing 302 forming the bypass passage, thus having resistance against mechanical shock and preventing the protrusion 424 from breaking. In FIGS. 12(A) to 12(C), the hatching portion in the appearance of the circuit package 400 indicates a fixation surface 432, the fixing portion 3723, and a fixation surface 434 where the circuit package 400 is covered by the resin used in the second resin molding process when the housing 302 is formed through the second resin molding process after the circuit package 400 is manufactured through the first resin molding process. More specifically, with these fixation surfaces, the mechanical strength of the circuit package 400 increases, and in particular, the mechanical strength at the neck of the protrusion 424 can be improved by the fixation surface 432. In addition, various effects explained with reference to FIGS. 12(A) to 12(C) are achieved.

10. Shape of Cover for Measuring Temperature of Measurement Target Gas 30

10.1 Overview and Effects of Measuring of Temperature of Measurement Target Gas 30

As shown in FIGS. 2(A) and 2(B) to 3(A) and 3(B), the measurement target gas 30 is introduced from the inlet port 343 formed to be open at the upstream side, and the temperature of the measurement target gas 30 thus introduced is measured by the temperature detecting portion 452 provided at the leading end portion of the protrusion 424. The temperature detecting portion 452 is provided in the circuit package 400 for measuring the flow rate, and the thermal flow meter 300 is fixed to a measurement target, for example, an intake pipe, so that not only the flow rate but also the temperature of the measurement target gas 30 can be measured, and therefore, this is advantageous in workability. The protrusion 424 having the temperature detecting portion 452 is disposed in the inside of the inlet port 343 of which circumference is surrounded by the front cover 303, the rear cover 304, and the housing 302, and therefore, this is also advantageous in terms of safety.

In order to measure the temperature of the measurement target gas 30 with a high degree of accuracy, it is desired to bring as much measurement target gas 30 as possible to be in contact with the temperature detecting portion 452. It is desired to employ such structure that the heat is less likely to be transmitted from other heat sources to the temperature detecting portion 452. As explained with reference to FIGS. 5(A) and 5(B) and FIGS. 6(A) and 6(B), the temperature detecting portion 452 is provided at the leading end side of the protrusion 424. Therefore, the measurement target gas 30 introduced from the inlet port 343 formed to be open at the upstream side is likely to be in contact with the temperature detecting portion 452, and the heat is less likely to be transmitted to the leading end from the neck because the protrusion 424 is long. The measurement target gas 30 introduced from the inlet port 343 flows along the protrusion 424, and therefore, such structure is provided that the heat transmitted from the neck of the protrusion 424 to the leading end is cooled by the measurement target gas 30. Because of this structure, it is less likely to be affected by other heat sources. Because of such reasons, the temperature of the measurement target gas 30 can be measured with a high degree of accuracy.

Further, as explained above with reference to FIG. 13, the lead 548 for transmitting the electric signal of temperature detection element 518 for measuring the temperature provided in the temperature detecting portion 452 to the processing unit 604 which is the control circuit for measuring the temperature is disconnected from the lead 544 connected to the temperature detection element 518, and the electric signal of the temperature detection element 518 is configured to be transmitted to the lead 548 via a connection line 546 having a high thermal resistance. According to this configuration, the effect of the heat transmitted via the lead 548 can be reduced. This results in the improvement of the measurement accuracy.

On the other hand, since the temperature detection element 518 is connected to the lead 544 the temperature detection element 518 is securely held by the lead 544, and this ensures a high degree of reliability. The circuit as shown in FIG. 13 is thereafter transfer molded, and the protrusion 424 is formed. Since the temperature detection element 518 is fixed to the lead 544, it is less likely to be damaged by the transfer mold process. Therefore, this is also advantageous in productivity.

As shown in FIGS. 2(A) and 2(B) to 3(A) and 3(B), the front protection portion 322 or the rear protection portion 325 for protecting the leading end portion of the protrusion 424 is formed in the front or rear cover 303 or 304. Therefore, the protrusion 424 is mechanically protected. Further, the front side outlet port 344 and the backside outlet port 345 are provided at the neck portion of the protrusion 424. The surfaces outside of the front cover 303 and the rear cover 304 are flat, and the flow velocity of the measurement target gas 30 flowing outside of the front side outlet port 344 and the backside outlet port 345 is fast, and the pressure is lower than that of the inside of the front side outlet port 344 and the backside outlet port 345. Therefore, the measurement target gas 30 introduced from the inlet port 343 is discharged to the outside through the front side outlet port 344 and the backside outlet port 345. Since the inlet port 343 is open toward the upstream, the dynamic pressure of the measurement target gas 30 is applied to the inlet port 343. Accordingly, a sufficient amount of measurement target gas 30 is introduced from the inlet port 343, and the temperature thereof is measured while the protrusion 424 is cooled, and then, the measurement target gas 30 is discharged through the front side outlet port 344 and the backside outlet port 345 to the main passage 124. As described above, the temperature of the measurement target gas 30 is measured with a high degree of accuracy.

11. Another Embodiment Related to Reduction of Flow Rate Measurement Error of Backward Flow Caused by Vortex 11.1 Embodiment Using Wall 4217 of Inlet Port-Side Bypass Passage 4232

Figure 22:
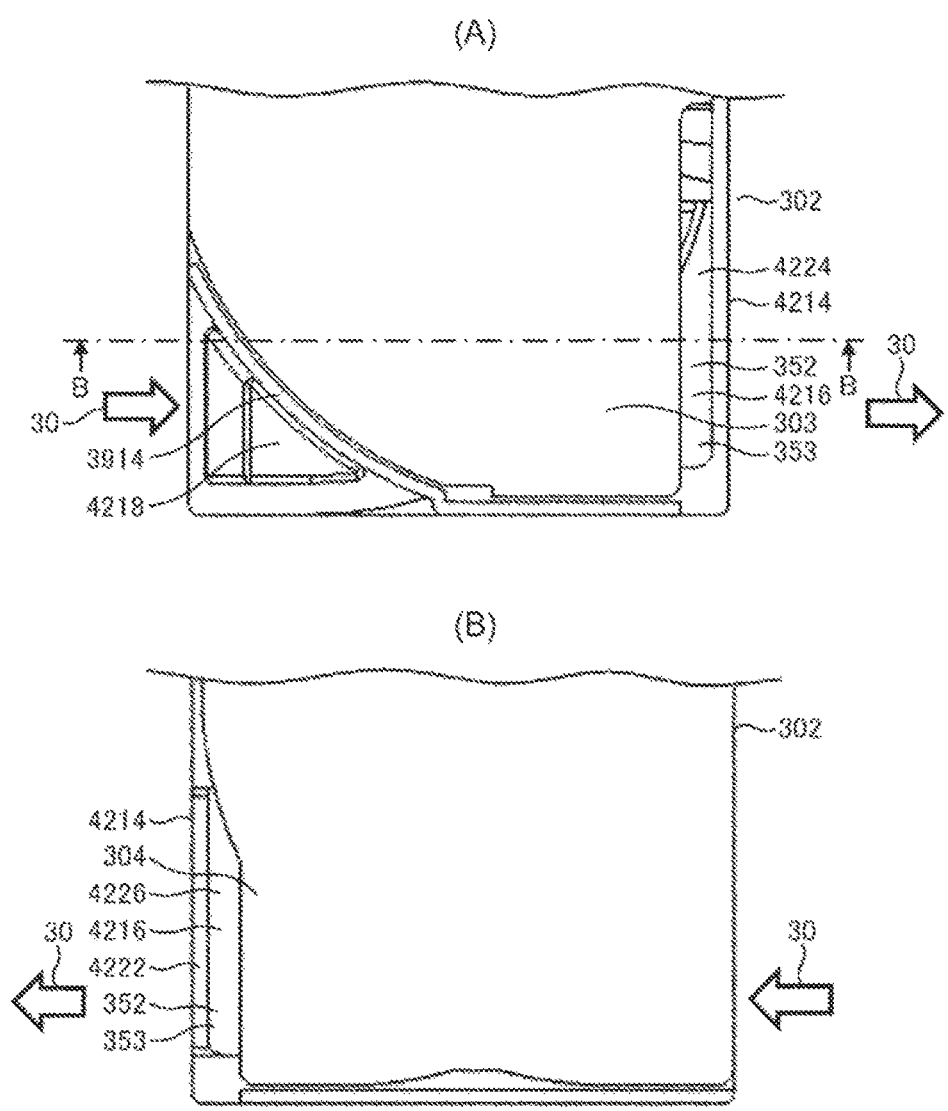
FIGS. 22(A) and 22(B) are another embodiment of a thermal flow meter.
Figure 23:
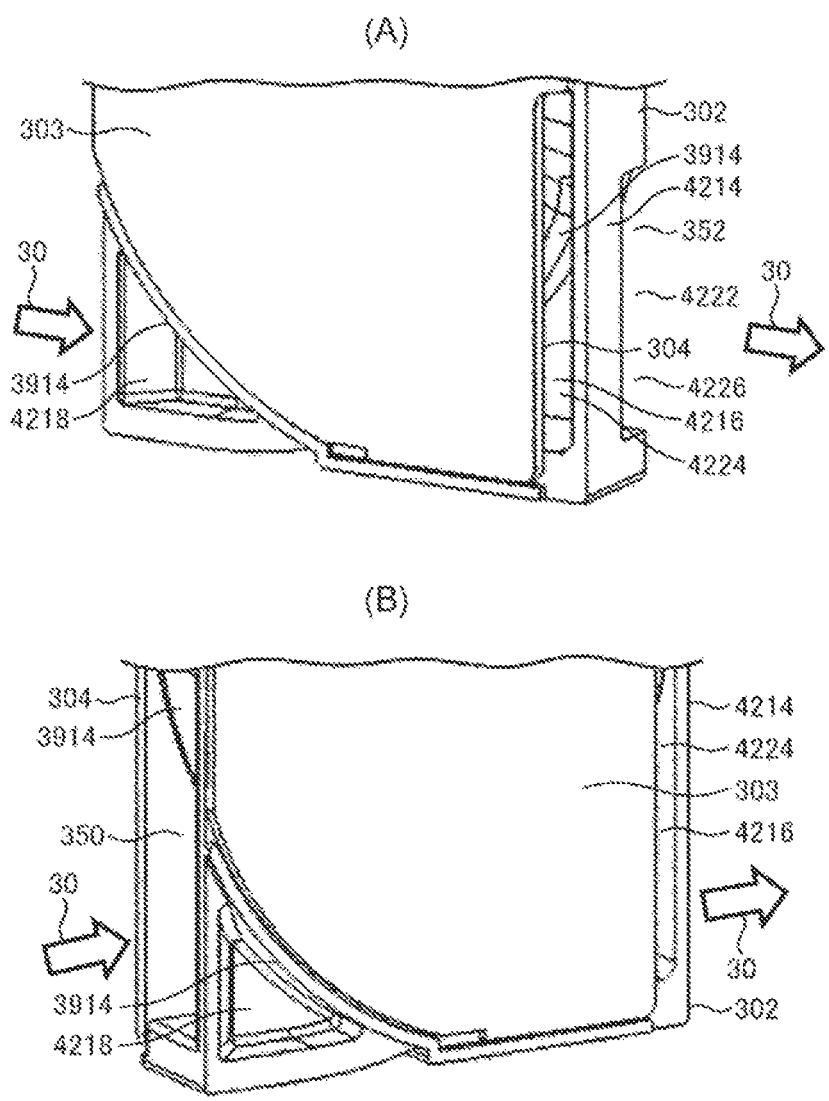
FIGS. 23(A) and 23(B) are perspective views of another embodiment shown in FIGS. 22(A) and 22(B)
Figure 24:
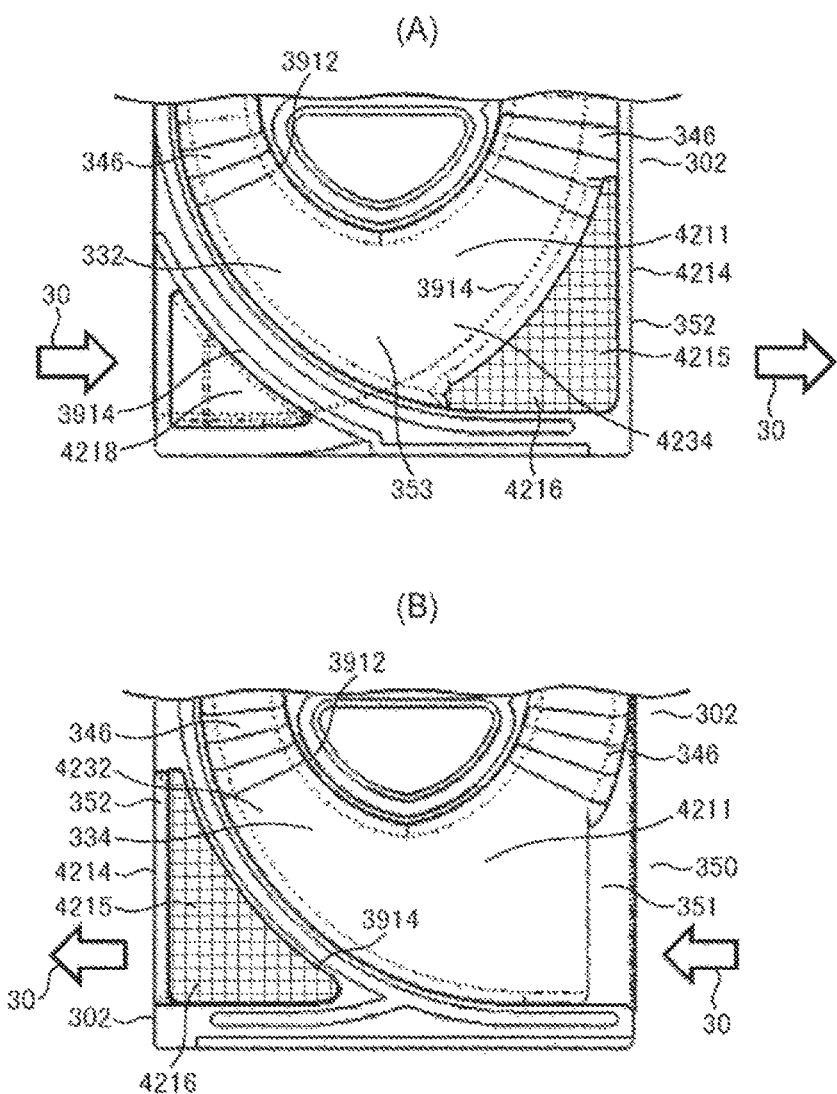
FIGS. 24(A) and 24(B) are figures explaining a structure of a housing of another embodiment shown in FIGS. 22(A) and 22(B)
Figure 25:
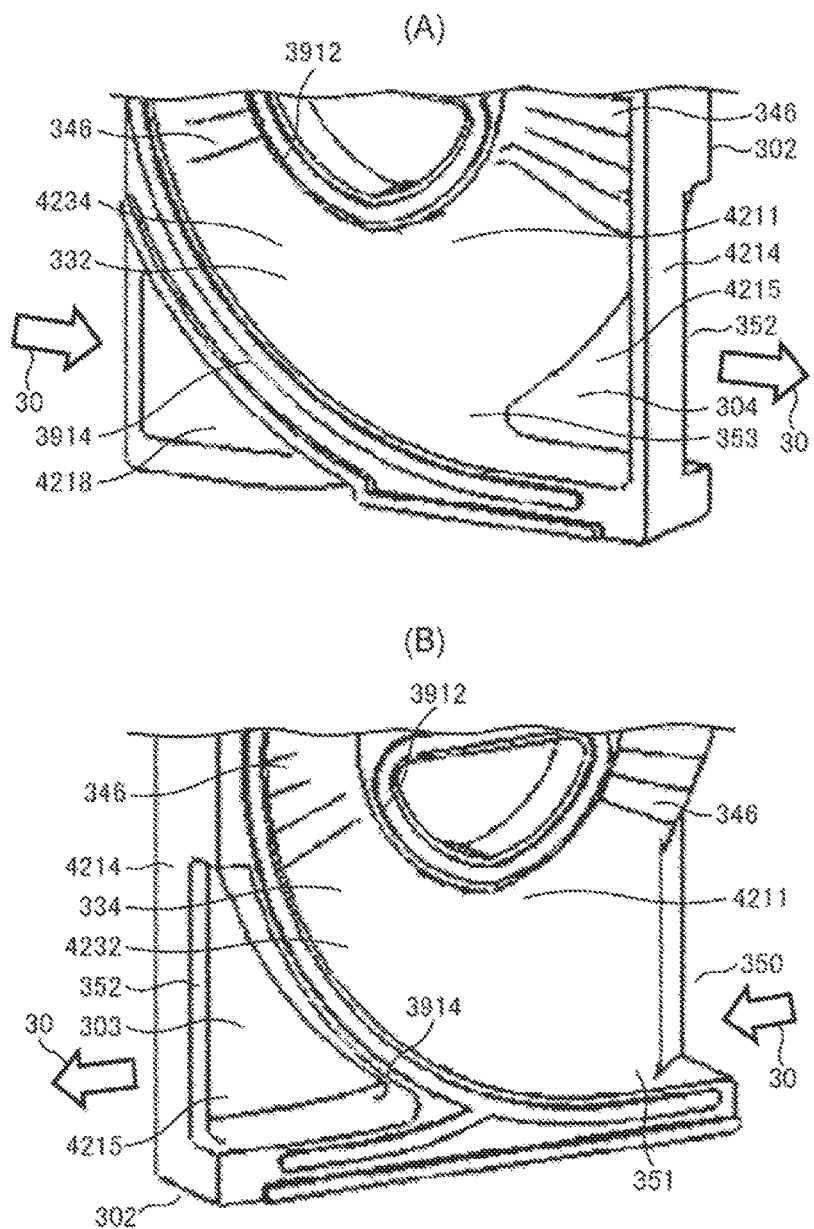
FIGS. 25(A) and 25(B) are perspective views illustrating a housing of another embodiment shown in FIG. 24.
Figure 26:
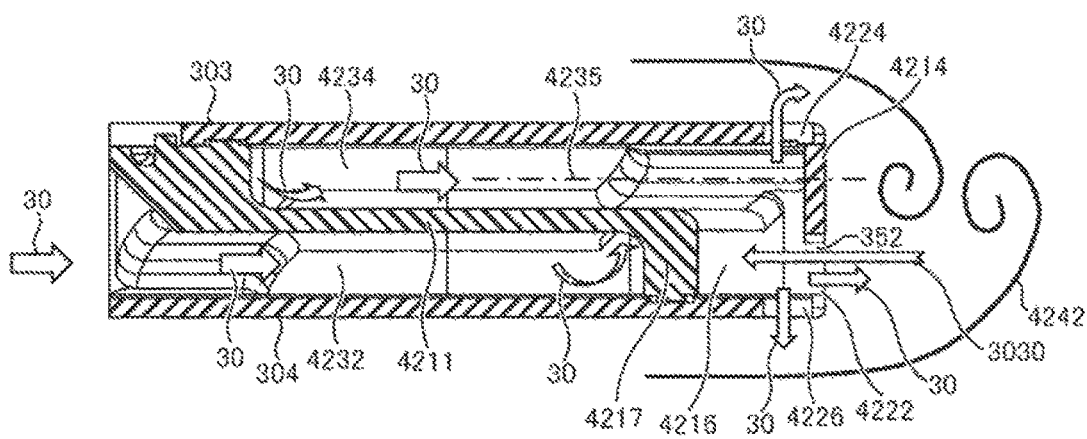

The cause of the measurement error in the flow rate measurement in the backward flow state of the measurement target gas 30 flowing in the main passage 124 has been explained with reference to FIGS. 10 and 11. Overview of countermeasure for solving the cause of the measurement error has been explained with reference to FIG. 10. Another embodiment of FIG. 10 will be explained with reference to FIGS. 22(A) and 22(B) to FIG. 26. FIG. 22(A) is a front view illustrating a portion of a thermal flow meter 300. FIG. 22(B) is a rear view illustrating a portion of the thermal flow meter 300. FIG. 23(A) and FIG. 23(B) are perspective views of FIG. 22(A). FIG. 23(A) and FIG. 23(B) are different in the angle of view point in the perspective views. More specifically, FIG. 23(A) is from the view point showing the outlet port 352, and FIG. 23(B) is from the view point showing the inlet port 350. FIG. 24(A) is a front view illustrating a portion of the housing 302. FIG. 24(B) is a rear view illustrating a portion of the housing 302. In the descriptions of FIG. 24(A) and FIG. 24(B), an outlet port side chamber hole 4215 is actually formed in portions particularly indicated by lattice. The portion indicated by the lattice is a space for constituting the outlet port side chamber 4216 for attenuating the vortex 4242 as shown in FIG. 10. In particular, the indicating using the lattice is shown to emphasize this space. FIG. 25(A) is a perspective view of FIG. 24(A). FIG. 25(B) is a perspective view of FIG. 24(B). FIG. 26 is a cross sectional view taken along line B-B of FIG. 22(A).

In FIGS. 22(A), 23(B), and 25(B), when the measurement target gas 30 flows in the forward direction in the main passage 124, a portion of the measurement target gas 30 is taken into the bypass passage from the inlet port 350 shown in FIG. 23(B). In the portion of the inlet port 350, the inlet trench 351 for forming the inlet port 350 is formed in the housing 302 shown in FIG. 24(B). The inlet port 350 is made of the inlet trench 351 and the rear cover 304, and a portion of the measurement target gas 30 flowing in the main passage 124 is retrieved from the inlet port 350. The measurement target gas 30 retrieved from the inlet port 350 flows along the inlet port-side bypass passage 4232 formed by the bypass passage trench on backside 334 shown in FIG. 24(B), and the flow velocity of the measurement target gas 30 thus retrieved is measured by the measurement surface 430 functioning as the flow rate measurement passage unit, not shown, and the flow rate of the measurement target gas 30 flowing in the main passage 124 is output on the basis of the data held in advance from the flow velocity thus measured.

After the measurement target gas 30 retrieved from the inlet port 350 is measured by the measurement surface 430 functioning as the flow rate measurement passage unit, the measurement target gas 30 retrieved from the inlet port 350 flows through the outlet port-side bypass passage 4234 formed by the bypass passage trench on frontside 332 shown in FIG. 24(A), and is guided to the space for forming the outlet port side chamber 4216 indicated by the lattice indication. The outlet port side chamber 4216 is formed by the front cover 303 and the rear cover 304 provided on both surfaces of the housing 302 and the outlet port side chamber hole 4215 penetrating through the front rear surface formed in the housing 302.

As shown in FIGS. 22(A) and 22(B), notches are respectively formed in the portion of the vicinity of the outlet port 352 of the front cover 303 and the rear cover 304, the shape is different from the shape in the vicinity of the inlet port 350 of the rear cover 304. In the vicinity of the inlet port 350, the rear cover 304 has a shape according to the side end of the housing 302 so as to cover the end of the rear surface of the housing 302. On the other hand, the notches are respectively formed in the portion of the vicinity of the outlet port 352 of the front cover 303 and the rear cover 304, and because of these notches, the end portion of the right side surface of the housing 302 and a portion of the outlet port side chamber 4216 protrude from the end portion in the vicinity of the outlet port 352 of the front cover 303 and the rear cover 304. Therefore, the measurement target gas 30 retrieved from the inlet port 350 flows through the inlet port-side bypass passage 4232, further flows through the outlet port-side bypass passage 4234, and is thereafter guided to the outlet port side chamber 4216. From the outlet port side chamber 4216, the measurement target gas 30 is guided to the main passage 124 through the outlet port openings formed by the notches of the front cover 303 and the rear cover 304 of both of the front and the rear of the thermal flow meter 300. Further, as shown in FIG. 23(A), the measurement target gas 30 is discharged to the downstream side of the thermal flow meter 300 from not only the outlet port openings at both of the front and rear sides of the thermal flow meter 300 but also the outlet port opening 4222 formed in the downstream direction of the outlet port side chamber 4216. As explained below, when the measurement target gas 30 flows backward in the main passage 124, the measurement target gas 30 directly flowing backward to the outlet port opening 4222 flows in, and the dynamic pressure of the measurement target gas 30 flowing backward is exerted on the inside of the outlet port side chamber 4216 via the outlet port opening 4222.

FIGS. 25(A) and 25(B) are perspective views illustrating a portion of the housing 302. In FIG. 25(A), the measurement target gas 30 flowing along the bypass passage trench on frontside 332 for constituting the outlet port-side bypass passage 4234 is guided to the outlet port side chamber hole 4215 penetrating to constitute the outlet port side chamber 4216. The measurement target gas 30 guided to the outlet port side chamber hole 4215 is discharged to the main passage 124 through the opening formed at the downstream side and the openings formed by the notches of both of the front and rear covers on both of the front and rear surfaces of the thermal flow meter 300.

The cross section taken along line B-B of FIG. 22(A) is shown in FIG. 26. A major different between the embodiment shown in FIG. 10 and the embodiment shown in FIG. 26 is as follows. In the embodiment as shown in FIG. 10, the wall 4217 functioning as the guide for attenuating the vortex 4242 entered together with the backward flow 3030 of the measurement target gas 30 from the outlet port opening 4222 is formed by the protrusion provided on the rear cover 304, but in the embodiment as shown in FIG. 26, the wall 4217 is formed using the wall separating the inlet port-side bypass passage 4232 and the outlet port side chamber 4216. The rear cover 304 need not be provided with any protrusion for guiding, and the embodiment as shown in FIG. 26 is advantageous in the resin formation property, and a cover can be formed with a high degree of dimension accuracy. Further, in the resin molding process for forming the housing 302 the shape can be determined by the die for forming the hole for the outlet port side chamber 4216, the bypass passage trench on frontside 332, and the bypass passage trench on backside 334, and therefore, the shape of the outlet port can be formed with an extremely high degree of accuracy. Therefore, the flow rate of the measurement target gas 30 flowing backward can be measured with an extremely high degree of accuracy. This has such structure that the vortex inflow suppression unit 4214 is provided on the axis of the flow of the outlet port-side bypass passage 4234, and the vortex 4242 cannot directly enter through the opening into the outlet port-side bypass passage 4234. Since such structure is made with the die by the formation of the housing 302, an extremely high degree of formation accuracy can be ensured. As described above, the flow rate of the measurement target gas 30 in the forward direction and the backward direction can be measured with an extremely high degree of accuracy.

As already explained with reference to FIGS. 10 and 11, the vortex inflow suppression unit 4214 is provided to block the flow axis 4235 which is the axis of flow of the outlet port-side bypass passage 4234 in FIG. 26, and therefore, the effect of the vortex 4242 which is the cause of the error indicated by the waveform 4916 of FIG. 11 can be reduced. Since the backward flow 3030 of the measurement target gas 30 is configured to be retrieved through the outlet port opening 4222, the dynamic pressure due to the backward flow 3030 is configured to be exerted on the outlet port side chamber 4216. This can reduce the error caused by the insufficient retrieval of the measurement target gas 30 flowing backward into the bypass passage, which is the cause of the error of the waveform 4912 in FIG. 11. As described above, the course of the backward flow 3030 of the measurement target gas 30 can be greatly changed in the outlet port side chamber 4216, and therefore, the vortex 4242 taken into the outlet port side chamber 4216 together with the backward flow 3030 can be attenuated, and the cause of the error indicated by the waveform 4916 of FIG. 11 due to this vortex can also be solved.

The opening surface of the outlet port opening 4222 for retrieving the backward flow 3030 is preferably perpendicular to the axis 4235 of the flow of the measurement target gas 30 in the main passage 124, but the embodiment is not limited thereto. Alternatively, it may be inclined. More specifically, it is important to sufficiently retrieve the measurement target gas 30 flowing backward, and even if the opening surface of the outlet port opening 4222 is somewhat inclined from the angle where it is perpendicular to the axis of the flow of the measurement target gas 30, the opening surface may be inclined as long as such structure is provided that the dynamic pressure flowing backward via the outlet port opening 4222 is exerted on the inside of the outlet port side chamber 4216.

The outlet port side chamber 4216 includes not only the outlet port opening 4222 but also an outlet port opening 4224 and an outlet port opening 4226. The outlet port opening 4224 and the outlet port opening 4226 performs action to reduce the fluid resistance of the measurement target gas 30 discharged from the outlet port side chamber 4216 to the main passage 124. Further, the outlet port opening 4224 and the outlet port opening 4226 performs action to reduce the fluid resistance of the measurement target gas 30 entering from the main passage 124 during the backward flow of the measurement target gas 30.

11.2 Explanation about Still Another Embodiment

Figure 27:
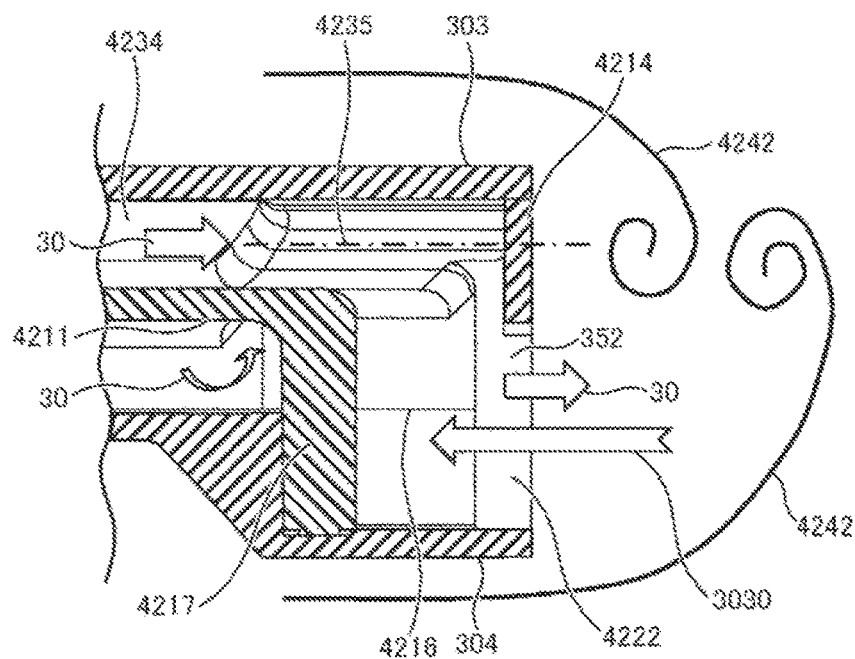
FIG. 27 is a partially enlarged view of a cross sectional view explaining still another embodiment.

FIG. 27 illustrates still another embodiment of the embodiment described in FIG. 10, FIGS. 22(A) and 22(B), or FIG. 26. In order to improve the measurement accuracy of the flow rate in the backward flow state of the measurement target gas 30 flowing in the main passage 124, it is desired to increase the amount of retrieval of the measurement target gas 30 flowing backward into the bypass passage. By increasing the size of the outlet port opening 4222, the amount of the backward flow 3030 of the measurement target gas 30 that can be retrieved through the outlet port opening 4222 can be increased. As compared with the another embodiment, the size of area of the outlet port opening 4222 formed to be open in the downstream direction is increased in FIG. 27.

The distance between the front cover 303 and the rear cover 304 is limited, and therefore, in order to increase the size of area of the outlet port opening 4222, the outlet port-side of the rear cover 304 is expanded in the embodiment as shown in FIG. 27. In this embodiment, the opening of the outlet port opening 4222 is made larger, and therefore, the fluid resistance of the outlet port 352 of the outlet port-side bypass passage 4234 can be decreased. In this case, the fluid resistance caused by the discharge from the outlet port side chamber 4216 to the main passage 124 can be reduced, or the amount of the measurement target gas 30 sucked from the outlet port side chamber 4216 to the main passage 124 because of a lower pressure at the downstream side of the thermal flow meter 300, and therefore, the measurement accuracy can be improved not only in the backward flow state of the measurement target gas 30 but also in the state in which the measurement target gas 30 lows in the forward direction. Since the size of area of the outlet port opening 4222 is increased, the size of area of the outlet port opening 4226 or the outlet port opening 4224 as shown in FIG. 26 can be reduced, or can be eliminated. Therefore, there is an effect that the shape in the vicinity of the outlet port 352 in a case where the housing 302 is formed through resin mold can be simplified.

When the outlet port opening 4222 is made to be larger, the retrieved vortex 4242 causes a greater effect, but the retrieved vortex 4242 can be sufficiently attenuated by providing the wall 4217.

Figure 28:
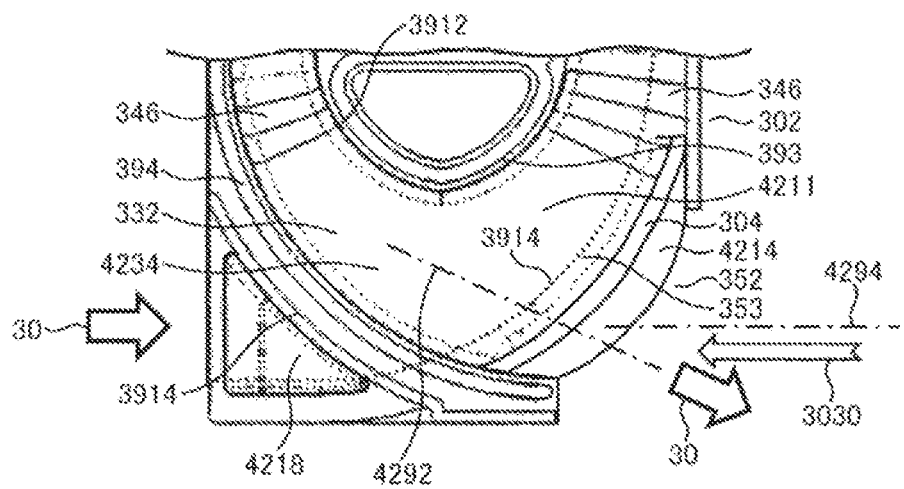
FIG. 28 is a partially enlarged view explaining still another embodiment.

Still another embodiment will be explained with reference to FIG. 28. FIG. 28 is a partially enlarged view illustrating the bypass passage trench on frontside 332 of the housing 302. The axis 4292 of the flow of the outlet port-side bypass passage 4234 formed by the bypass passage trench on frontside 332 and the front cover 303 has a slight angle with respect to the axis 4294 of the flow of the measurement target gas 30 of the main passage 124. More specifically, the direction in which the measurement target gas 30 is discharged from the outlet port-side bypass passage 4234 to the main passage 124 is along the axis 4292. On the other hand, a backward flow of the measurement target gas 30 occurs in the main passage 124, and the direction in which the backward flow 3030 flows is along the axis 4294. Even if the axis 4292 representing the direction in which the measurement target gas 30 is discharged from the outlet port-side bypass passage 4234 and the axis 4294 of the flow in the backward flow state of the measurement target gas 30 in the main passage 124 do not match each other, and more specifically, when the axis 4292 representing the direction in which the measurement target gas 30 is discharged from the outlet port-side bypass passage 4234 and the axis 4294 of the flow in the backward flow state of the measurement target gas 30 in the main passage 124 are deviated from each other, the error caused by the waveform 4912 as shown in FIG. 11 can be suppressed as long as the dynamic pressure of the measurement target gas 30 flowing backward from the outlet port 352 can be retrieved. The opening surface of FIGS. 26 and 27 need not be perpendicular to the axis of the flow that flows backward, and even if there is a slight angle, a sufficient effect can be obtained.

Figure 29:
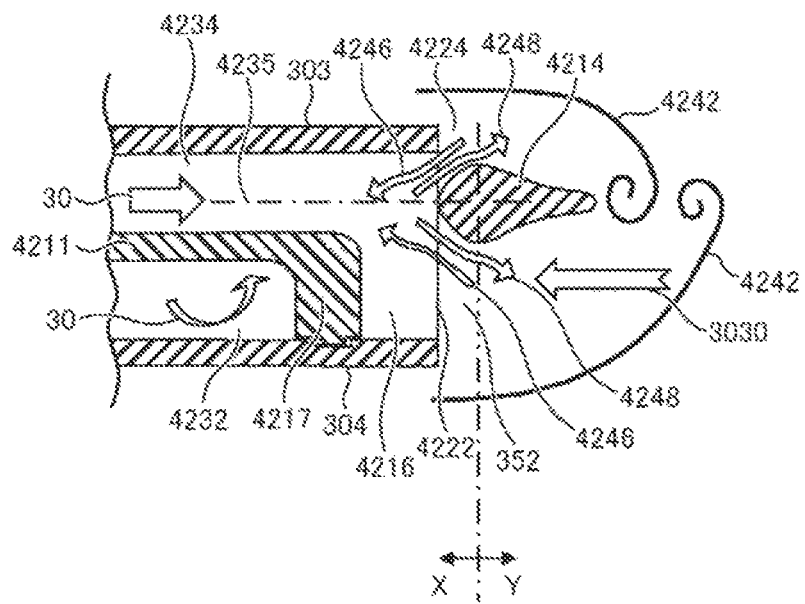
FIG. 29 is a partially enlarged view of a cross sectional view explaining still another embodiment.

FIG. 29 is still another embodiment. In FIGS. 10, 26, and 27, the vortex inflow suppression unit 4214 for stopping the entry of the vortex 4242 is in a plate shape. However, even if it is not be a plate shape, the entry of the vortex 4242 into the outlet port-side bypass passage 4234 can be blocked. In FIG. 29, a vortex inflow suppression unit 4214 having a different shape is arranged on the flow axis 4235 of the outlet port-side bypass passage 4234. The shape of the vortex inflow suppression unit 4214 is configured such that, in the shape at the downstream side of the vortex inflow suppression unit 4214 itself, the size of area in the cross section gradually decreases as shown in FIG. 29. In other words, the shape is in a streamline shape. When the vortex inflow suppression unit 4214 is in a plate shape, the vortex inflow suppression unit 4214 itself may encourage generation of the vortex 4242. In the shape as shown in FIG. 29, the downstream side of the vortex inflow suppression unit 4214 itself is in a stream line shape, and therefore, this can reduce the vortex generated at the downstream side of the thermal flow meter 300.

Further, the shape of the vortex inflow suppression unit 4214 itself is such that the size of area of the cross section gradually decreases at both of the upstream side and the downstream side. Therefore, the vortex inflow suppression unit 4214 serves as an orifice for the flow 4248 of the measurement target gas 30 in the forward direction passing at both sides thereof or the flow of the measurement target gas 30 in the backward direction passing at both sides of the vortex inflow suppression unit 4214. Since the vortex inflow suppression unit 4214 serves the orifice for the measurement target gas 30 flowing at both side portions of the vortex inflow suppression unit 4214, the entry of the vortex 4242 is blocked and the vortex 4242 that is going to enter is attenuated in both of the cases where the measurement target gas 30 flows in the forward direction or where the measurement target gas 30 flows in the backward direction. The measurement target gas 30 flows along the vortex inflow suppression unit 4214, and the vortex inflow suppression unit 4214 does not completely block entry/exit of the measurement target gas 30, and allows entry/exit of the measurement target gas 30, so that the fluid resistance at the outlet port 352 is reduced, and this results in the improvement of the measurement accuracy. More specifically, when the vortex inflow suppression unit 4214 is formed with an orifice shape, the vortex 4242 that is going to enter into the outlet port-side bypass passage 4234 can be attenuated by the orifice shape. In addition, the formed orifice shape allows the measurement target gas 30 to flow in both directions, and this reduces the fluid resistance, and in both of the forward direction and the backward direction of the flow of the measurement target gas 30, the measurement accuracy of the flow rate can be improved. When such structure is provided that the vortex inflow suppression unit 4214 is disposed on the housing 302 in FIG. 29, the housing 302 can be formed with a high degree of accuracy in the injection molding in the resin molding process for forming the housing 302. Therefore, the measurement accuracy can be improved.

Figure 30:
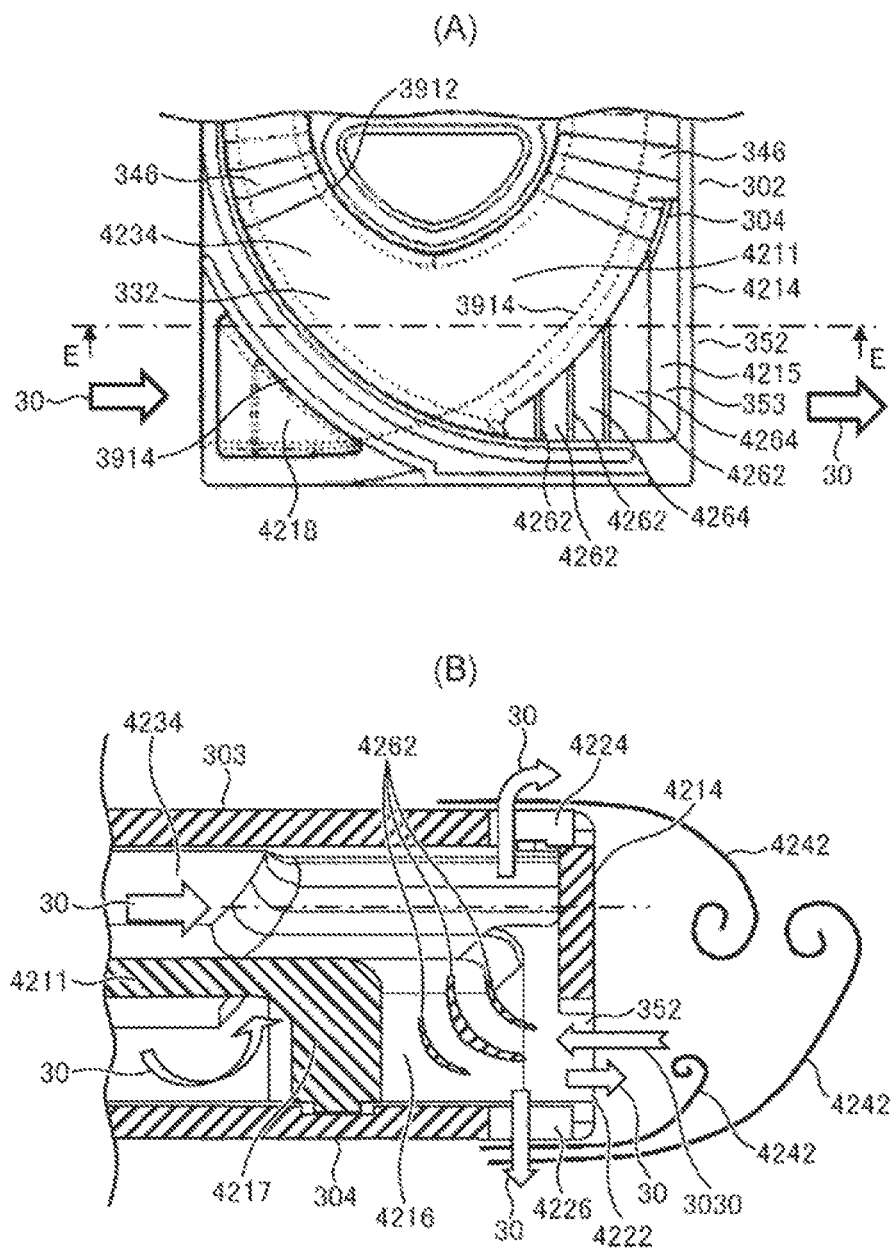
FIGS. 30(A) and 30(B) are figures explaining still another embodiment.

FIG. 30 is still another embodiment. FIG. 30(A) is a front view illustrating a portion of the housing 302. FIG. 30(B) is a cross sectional view taken along line E-E of FIG. 30(A). In order to attenuate the vortex 4242 entered in the outlet port side chamber 4216 as greatly as possible, the outlet port side chamber 4216 is formed with multiple blades 4262. The multiple blades 4262 changes the course of the backward flow 3030 of the measurement target gas 30 retrieved from the outlet port opening 4222, and in addition, the blades 4262 have orifice structure to further divide the flow path of the backward flow 3030 into many flows, and therefore, the blades 4262 reliably attenuate the entered vortex 4242 and guide the measurement target gas 30 in the backward flow to the outlet port-side bypass passage 4234 by attaining a state close to the laminar flow state.

The multiple blades 4262 are provided on the front cover 303 or the rear cover 304, so that the multiple blades 4262 can be easily disposed in the outlet port side chamber 4216 by fixing the front cover 303 or the rear cover 304 to the housing 302.

Figure 31:
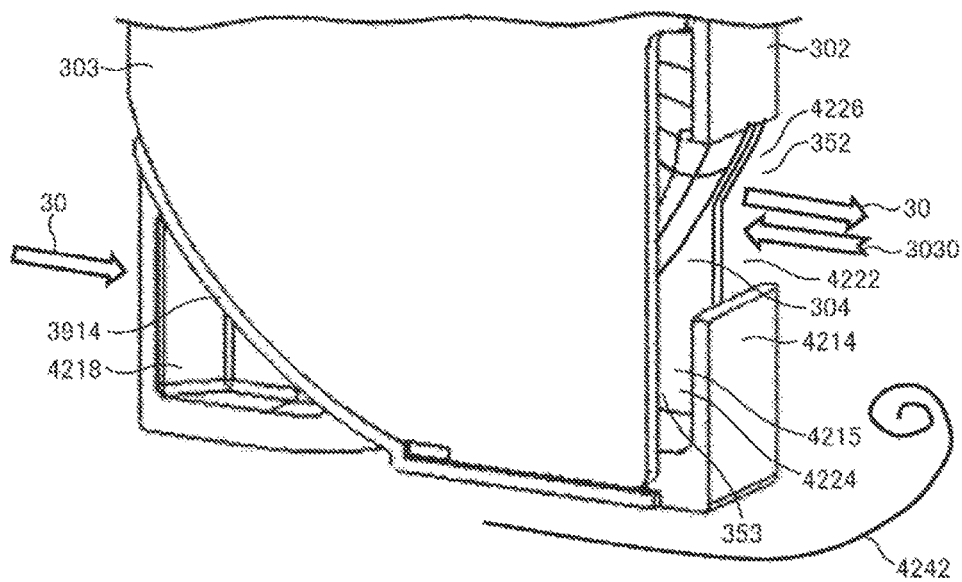
FIG. 31 is a partial perspective view explaining still another embodiment.

FIG. 31 is still another embodiment. In the embodiments of FIGS. 10, 26, 27, 29, and 30, the outlet port opening 4222 and the vortex inflow suppression unit 4214 are provided between the front surface and the rear surface of the thermal flow meter 300, which means that the outlet port opening 4222 and the vortex inflow suppression unit 4214 are provided in the thickness direction. In the embodiments of FIGS. 10, 26, 27, 29, and 30, there is an effect of forming the thermal flow meter 300 in a compact size, but in order to increase the size of area of the opening surface of the outlet port opening 4222 as described in FIG. 27, it is necessary to widen the space between the front surface and the rear surface of the thermal flow meter 300.

FIG. 31 is a structure in which the outlet port opening 4222 and the vortex inflow suppression unit 4214 are arranged not in the thickness direction of the thermal flow meter 300 but in the longitudinal direction of the thermal flow meter 300. FIG. 31 is different in the arrangement of the outlet port opening 4222 and the vortex inflow suppression unit 4214 but is the same in terms of the actions and the effects. In the longitudinal direction of the thermal flow meter 300, the arrangement of the outlet port opening 4222 and the vortex inflow suppression unit 4214 may be opposite, but the outlet port opening 4222 is arranged at the side of the flange 312 not shown in FIG. 31, and the vortex inflow suppression unit 4214 is arranged at the leading end side in the longitudinal direction of the thermal flow meter 300. Since the vortex inflow suppression unit 4214 is arranged at the leading end side in the longitudinal direction of the thermal flow meter 300 as described above, the wall 4217 which is the guide for attenuating the entered vortex 4242 as shown in FIGS. 26 and 29 can be easily formed. More specifically, when the wall 4217 is formed on the wall for separating the bypass passage trench on backside 334 and the bypass passage trench on frontside 332, the wall 4217 can be formed so as not to adversely affect the measurement target gas 30 flowing in the bypass passage trench on frontside 332. Further, this wall 4217 can be formed through the resin molding process for forming the housing 302. Therefore, the configuration of FIG. 31 is a structure that can be easily produced.

Figure 32:
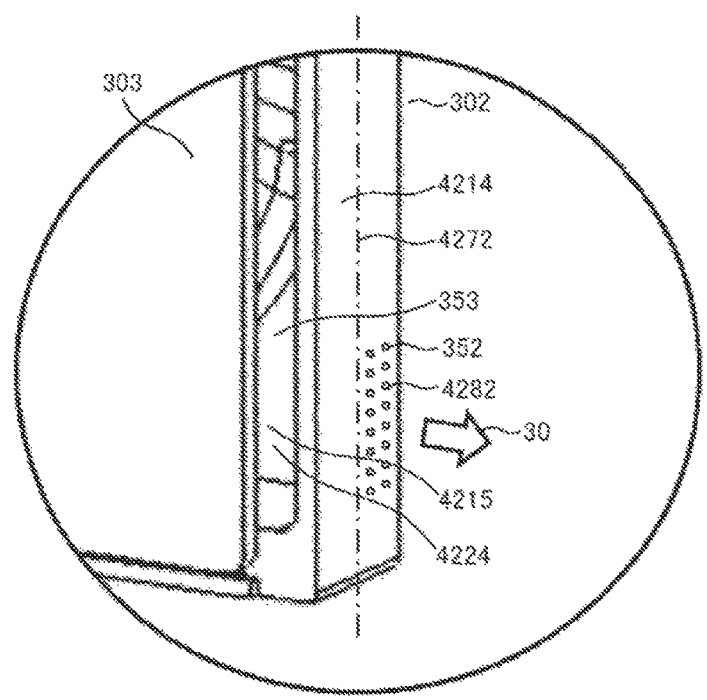
FIG. 32 is a partial perspective view explaining still another embodiment.
Figure 33:
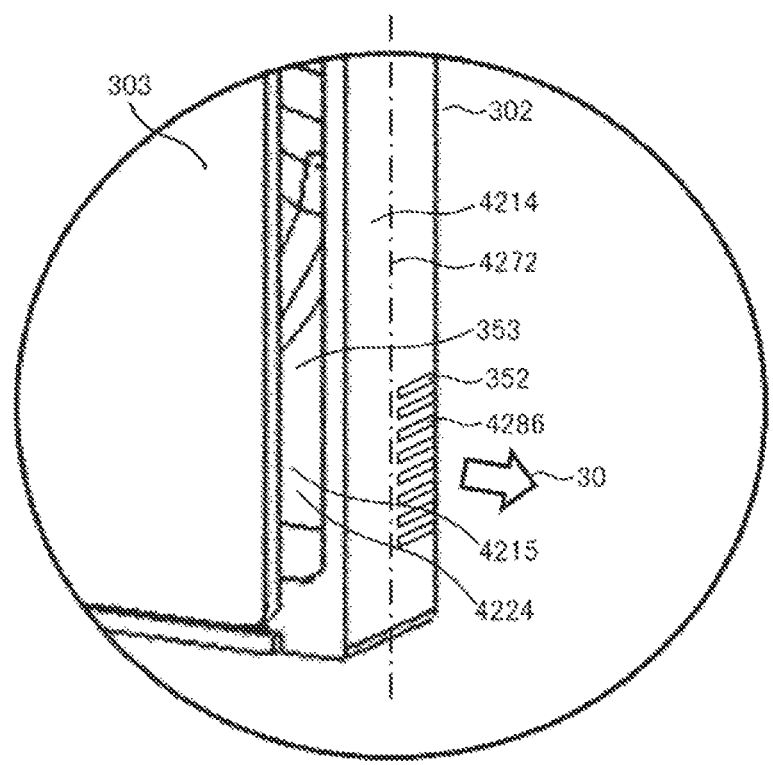
FIG. 33 is a partial perspective view explaining still another embodiment.

Still another embodiment is described in FIGS. 32 and 33. In the embodiments of FIGS. 10, 26, 27, 29, and 30, the outlet port opening 4222 is constituted by a single opening as an example. However, it may be constituted by multiple openings. The embodiments as shown in FIGS. 32 and 33 are examples where the outlet port opening 4222 is constituted by multiple openings. FIG. 32 is an example where many circular or elliptic holes, which are typical shapes, are provided. FIG. 33 is an example where the outlet port opening 4222 is formed by many rectangular holes 4282 or slits 4286. The outlet port opening 4222 is not limited to a single hole, and may be constituted by multiple holes. The shape of the hole is not limited. However, when the productivity is considered, it is preferably made of a large hole as described above.

The vortex inflow suppression unit 4214 as shown in FIG. 29 explained above can be applied to the embodiments in FIGS. 10, 26, 27, 28, 30, 31, 32, and 33. Likewise, the blade 4262 as shown in FIG. 30 can be applied to the embodiments in FIGS. 10, 26, 27, 28, 30, 31, 32, and 33.

INDUSTRIAL AVAILABILITY

The present invention is applicable to a measurement apparatus for measuring a gas flow rate as described above.

REFERENCE SIGNS LIST

30 measurement target gas
124 main passage
300 thermal flow meter 302 housing
303 front cover
304 rear cover
305 external connector
306 external terminal
307 calibration terminal
310 measuring portion
320 terminal connector
350 inlet port
352 outlet port
356, 358 protrusion
361 inner socket of external terminal
365 link portion
400 circuit package
412 connection terminal
414 terminal
422 circuit package main body
424 protrusion
430 flow rate measurement passage unit (measurement surface)
432, 434 fixation surface
436 heat transfer surface exposing portion
438 opening
452 temperature detecting portion
590 pressed fitting hole
594, 596 slope portion
601 flow rate measurement circuit
602 air flow sensing portion
604 processing unit
608 heat generator
640 heating control bridge
650 bridge circuit of air flow sensing
672 diaphragm
4215 outlet port side chamber hole
4216 outlet port side chamber
4217 wall
4222, 4226 outlet port opening
4232 inlet port-side bypass passage
4234 outlet port-side bypass passage
4262 guiding blade
4282 hole
4286 slit

The invention claimed is:

1. A thermal flow meter comprising:
a bypass passage configured to retrieve and flow a measurement target gas received from a main passage; and
a flow rate measurement circuit configured to measure a flow rate by performing heat transfer with the measurement target gas flowing in the bypass passage,
wherein the bypass passage includes:
an inlet port which is formed to be open at an upstream side of the main passage;
an outlet port opening configured to discharge the measurement target gas retrieved from the inlet port of the bypass passage to the main passage;
a flow rate measurement passage unit provided between the inlet port and the outlet port opening and configured to measure a flow rate of the flow rate measurement circuit; and
an outlet port side chamber provided upstream with respect to the outlet port opening, wherein
the measurement target gas retrieved from the inlet port of the bypass passage is measured by the flow rate measurement circuit at the flow rate measurement passage unit, and is thereafter guided to the outlet port side chamber, and is discharged to the main passage from the outlet port side chamber via the outlet port opening,
in the outlet port side chamber, the outlet port opening is provided to be open in a downstream direction of a flow direction of the measurement target gas in the main passage, and a guide is provided to oppose the outlet port opening to change a direction of a flow of the measurement target gas flowing backward from the outlet port opening to an upstream side of the outlet port opening,
the opening surface of the outlet port opening is perpendicular or inclined to the axis of the flow direction of the measurement target gas flowing in the main passage,
part of the outlet opening is formed by a wall perpendicular to the flow direction of the measurement target gas flowing in the main passage when viewed in a cross section which includes the outlet port opening and is perpendicular to a cover covering the bypass passage, and
along a width direction of the thermal flow meter, the bypass passage is offset relative to the outlet port opening.

2. The thermal flow meter according to claim 1, wherein the flow rate measurement circuit provided in the flow rate measurement passage unit includes:
a heating body configured to heat the measurement target gas;
an upstream-side temperature sensing element; and
a downstream side temperature sensing element,
wherein the upstream-side temperature sensing element and the downstream side temperature sensing element are disposed with the heating body interposed therebetween,
further, along a flow in a forward direction of the measurement target gas in the flow rate measurement passage unit, the upstream-side temperature sensing element is disposed at an upstream side of the heating body, and the downstream side temperature sensing element is disposed at a downstream side of the heating body,
the flow rate measurement circuit generates an output corresponding to both of a flow rate of the measurement target gas flowing in the forward direction and a flow rate of the measurement target gas flowing in the backward direction, thus measuring a flow rate flowing in the forward direction in the main passage and a flow rate flowing in the backward direction in the main passage.

3. The thermal flow meter according to claim 1, wherein the guide is arranged in the outlet port side chamber, and a surface of the outlet port-side of the guide is arranged in a direction crossing the measurement target gas flowing in the main passage.

4. The thermal flow meter according to claim 3, wherein a housing and a cover are provided to form the bypass passage and the outlet port side chamber,
in the housing, a bypass passage trench for forming the bypass passage and an outlet port side chamber space for forming the outlet port side chamber are provided, and the bypass passage and the outlet port side chamber are formed by covering the housing with the cover.

5. The thermal flow meter according to claim 1, wherein the outlet port side chamber includes the outlet port opening formed to be open at a downstream side of the flow of the measurement target gas in the main passage and a second outlet port opening formed to be open in a direction crossing the flow of the measurement target gas of the main passage.

6. The thermal flow meter according to claim 5, wherein the outlet port side chamber is formed by covering the outlet port side chamber space with the cover, and
the second outlet port opening is formed by providing a notch in the cover.

7. The thermal flow meter according to claim 5, wherein the thermal flow meter has a separating wall separating, in a direction along the flow of the measurement target gas in the main passage, an inlet port-side bypass passage for guiding the measurement target gas introduced from the inlet port to the flow rate measurement passage unit and an outlet port-side bypass passage for guiding the measurement target gas from the flow rate measurement passage unit to the outlet port side chamber,
a first surface is provided at one side of the separating wall, and a second surface is provided at an opposite side to the one side, and
the inlet port-side bypass passage is disposed at a side of the first surface, and the outlet port-side bypass passage is disposed at a side of the second surface.

8. The thermal flow meter according to claim 7, wherein the inlet port-side bypass passage is provided at the side of the first surface, and
the guide of the outlet port side chamber for changing and flowing the course of the measurement target gas is located between the outlet port side chamber space and the inlet port-side bypass passage.

9. The thermal flow meter according to claim 7, wherein the thermal flow meter includes the housing, a first surface side cover provided at the side of the first surface, and a second surface side cover provided at the side of the second surface,
an inlet port-side bypass passage trench is formed to form the inlet port-side bypass passage at the side of the first surface side cover,
an outlet port-side bypass passage trench is formed to form the outlet port-side bypass passage at the side of the second surface side cover,
an outlet port side chamber hole penetrating through the first surface and a second surface for forming the outlet port side chamber space is formed in a downstream side direction in the main passage of the housing,
the first surface side cover is provided at the side of the first surface of the housing, and the second surface side cover is provided at the side of the second surface of the housing, so that the inlet port-side bypass passage, the outlet port-side bypass passage, and the outlet port side chamber are formed.

10. The thermal flow meter according to claim 9, wherein the outlet port side chamber hole formed in the housing is disposed at a position of a downstream side with respect to the inlet port-side bypass passage trench in a flow in the forward direction of the measurement target gas in the main passage,
the wall is configured to suppress inflow of a vortex, caused by a backward flow of the measurement target gas in the main passage, into the outlet port side chamber hole is provided between the outlet port side chamber hole and the main passage located at a downstream side with respect to the outlet port side chamber hole in the flow in the forward direction of the measurement target gas in the main passage, and further at the side of the second surface thereof.

11. The thermal flow meter according to claim 10, wherein the wall is formed such that a downstream side in the flow in the forward direction of the measurement target gas in the main passage is in a streamline shape.

12. The thermal flow meter according to claim 10, wherein the outlet port opening is formed by a set of a plurality of openings.

13. The thermal flow meter according to claim 1, wherein the outlet port side chamber is provided with a plurality of guiding blades for guiding the bypass passage by changing a flow direction of the measurement target gas entered from an outlet port and flowing backward.

14. A thermal flow meter comprising:
a bypass passage configured to retrieve and flow a measurement target gas received from a main passage; and
a flow rate measurement circuit configured to measure a flow rate by performing heat transfer with the measurement target gas flowing in the bypass passage,
wherein the bypass passage includes:
an inlet port which is formed to be open at an upstream side of the main passage;
an outlet port opening configured to discharge the measurement target gas retrieved from the inlet port of the bypass passage to the main passage;
a flow rate measurement passage unit provided between the inlet port and the outlet port opening and configured to measure a flow rate of the flow rate measurement circuit; and
an outlet port side chamber provided upstream with respect to the outlet port opening, wherein
the measurement target gas retrieved from the inlet port of the bypass passage is measured by the flow rate measurement circuit at the flow rate measurement passage unit, and is thereafter guided to the outlet port side chamber, and is discharged to the main passage from the outlet port side chamber via the outlet port opening,
in the outlet port side chamber, the outlet port opening is provided to be open in a downstream direction of a flow direction of the measurement target gas in the main passage, and a guide is provided to oppose the outlet port opening to change a direction of a flow of the measurement target gas flowing backward from the outlet port opening to an upstream side of the outlet port opening,
the opening surface of the outlet port opening is perpendicular or inclined to the axis of the flow direction of the measurement target gas flowing in the main passage,
part of the outlet opening is formed by a wall perpendicular to the flow direction of the measurement target gas flowing in the main passage when viewed in a cross section which includes the outlet port opening and is perpendicular to a cover covering the bypass passage,
the outlet port side chamber includes the outlet port opening formed to be open at a downstream side of the flow of the measurement target gas in the main passage and a second outlet port opening formed to be open in a direction crossing the flow of the measurement target gas of the main passage,
the thermal flow meter has a separating wall separating, in a direction along the flow of the measurement target gas in the main passage, an inlet port-side bypass passage for guiding the measurement target gas introduced from the inlet port to the flow rate measurement passage unit and an outlet port-side bypass passage for guiding the measurement target gas from the flow rate measurement passage unit to the outlet port side chamber, a first surface is provided at one side of the separating wall, and a second surface is provided at an opposite side to the one side, the inlet port-side bypass passage is disposed at a side of the first surface, and the outlet port-side bypass passage is disposed at a side of the second surface, the thermal flow meter includes the housing, a first surface side cover provided at the side of the first surface, and a second surface side cover provided at the side of the second surface, an inlet port-side bypass passage trench is formed to form the inlet port-side bypass passage at the side of the first surface side cover, an outlet port-side bypass passage trench is formed to form the outlet port-side bypass passage at the side of the second surface side cover, an outlet port side chamber hole penetrating through the first surface and a second surface for forming the outlet port side chamber space is formed in a downstream side direction in the main passage of the housing, the first surface side cover is provided at the side of the first surface of the housing, and the second surface side cover is provided at the side of the second surface of the housing, so that the inlet port-side bypass passage, the outlet port-side bypass passage, and the outlet port side chamber are formed, the outlet port side chamber hole formed in the housing is disposed at a position of a downstream side with respect to the inlet port-side bypass passage trench in a flow in the forward direction of the measurement target gas in the main passage, the wall is configured to suppress inflow of a vortex, caused by a backward flow of the measurement target gas in the main passage, into the outlet port side chamber hole is provided between the outlet port side chamber hole and the main passage located at a downstream side with respect to the outlet port side chamber hole in the flow in the forward direction of the measurement target gas in the main passage, and further at the side of the second surface thereof.

15. The thermal flow meter according to claim 14, wherein the flow rate measurement circuit provided in the flow rate measurement passage unit includes:
a heating body configured to heat the measurement target gas;
an upstream-side temperature sensing element; and
a downstream side temperature sensing element,
wherein the upstream-side temperature sensing element and the downstream side temperature sensing element are disposed with the heating body interposed therebetween,
further, along a flow in a forward direction of the measurement target gas in the flow rate measurement passage unit, the upstream-side temperature sensing element is disposed at an upstream side of the heating body, and the downstream side temperature sensing element is disposed at a downstream side of the heating body,
the flow rate measurement circuit generates an output corresponding to both of a flow rate of the measurement target gas flowing in the forward direction and a flow rate of the measurement target gas flowing in the backward direction, thus measuring a flow rate flowing in the forward direction in the main passage and a flow rate flowing in the backward direction in the main passage.

16. The thermal flow meter according to claim 14, wherein the guide is arranged in the outlet port side chamber, and a surface of the outlet port-side of the guide is arranged in a direction crossing the measurement target gas flowing in the main passage.

17. The thermal flow meter according to claim 16, wherein a housing and a cover are provided to form the bypass passage and the outlet port side chamber,
in the housing, a bypass passage trench for forming the bypass passage and an outlet port side chamber space for forming the outlet port side chamber are provided, and the bypass passage and the outlet port side chamber are formed by covering the housing with the cover.

18. The thermal flow meter according to claim 14, wherein the outlet port side chamber is formed by covering the outlet port side chamber space with the cover, and
the second outlet port opening is formed by providing a notch in the cover.

19. The thermal flow meter according to claim 14 wherein the inlet port-side bypass passage is provided at the side of the first surface, and
the guide of the outlet port side chamber for changing and flowing the course of the measurement target gas is located between the outlet port side chamber space and the inlet port-side bypass passage.

20. A thermal flow meter comprising:
a bypass passage configured to retrieve and flow a measurement target gas received from a main passage; and
a flow rate measurement circuit configured to measure a flow rate by performing heat transfer with the measurement target gas flowing in the bypass passage,
wherein the bypass passage includes:
an inlet port which is formed to be open at an upstream side of the main passage;
an outlet port opening configured to discharge the measurement target gas retrieved from the inlet port of the bypass passage to the main passage;
a flow rate measurement passage unit provided between the inlet port and the outlet port opening and configured to measure a flow rate of the flow rate measurement circuit; and
an outlet port side chamber provided upstream with respect to the outlet port opening, wherein
the measurement target gas retrieved from the inlet port of the bypass passage is measured by the flow rate measurement circuit at the flow rate measurement passage unit, and is thereafter guided to the outlet port side chamber, and is discharged to the main passage from the outlet port side chamber via the outlet port opening,
in the outlet port side chamber, the outlet port opening is provided to be open in a downstream direction of a flow direction of the measurement target gas in the main passage, and a guide is provided to oppose the outlet port opening to change a direction of a flow of the measurement target gas flowing backward from the outlet port opening to an upstream side of the outlet port opening,
the opening surface of the outlet port opening is perpendicular or inclined to the axis of the flow direction of the measurement target gas flowing in the main passage,
part of the outlet opening is formed by a wall perpendicular to the flow direction of the measurement target gas flowing in the main passage when viewed in a cross section which includes the outlet port opening and is perpendicular to a cover covering the bypass passage, and the outlet port side chamber is provided with a plurality of guiding blades for guiding the bypass passage by changing a flow direction of the measurement target gas entered from an outlet port and flowing backward.

* * * * *